(12) United States Patent
Amano et al.

(10) Patent No.: US 9,743,079 B2
(45) Date of Patent: Aug. 22, 2017

(54) IMAGE PROCESSING APPARATUS AND IMAGE PROCESSING METHOD FOR THE COLLECTIVE TRANSFER OF PREDICTION PARAMETERS BETWEEN STORAGE UNITS

(71) Applicant: PANASONIC CORPORATION, Osaka (JP)

(72) Inventors: Hiroshi Amano, Osaka (JP); Takeshi Tanaka, Osaka (JP); Kenji Oga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 951 days.

(21) Appl. No.: 13/822,570

(22) PCT Filed: Nov. 22, 2012

(86) PCT No.: PCT/JP2012/007544
§ 371 (c)(1),
(2) Date: Mar. 12, 2013

(87) PCT Pub. No.: WO2013/118216
PCT Pub. Date: Aug. 15, 2013

(65) Prior Publication Data
US 2014/0064370 A1 Mar. 6, 2014

(30) Foreign Application Priority Data
Feb. 7, 2012 (JP) .................... 2012-024464

(51) Int. Cl.
*H04N 19/00* (2014.01)
*H04N 19/50* (2014.01)
(Continued)

(52) U.S. Cl.
CPC ..... *H04N 19/00569* (2013.01); *H04N 19/433* (2014.11); *H04N 19/46* (2014.11); *H04N 19/52* (2014.11)

(58) Field of Classification Search
CPC ...... H04N 7/50; H04N 7/26244; H04N 5/145; H04N 7/26765; H04N 7/26015;
(Continued)

(56) References Cited

U.S. PATENT DOCUMENTS

| 5,649,030 | A | * | 7/1997 | Normile | ............. | G06T 9/008 |
| | | | | | | 348/417.1 |
| 6,735,340 | B1 | | 5/2004 | Ohno | | |

(Continued)

FOREIGN PATENT DOCUMENTS

| JP | 10-215457 | 8/1998 |
| JP | 11-298903 | 10/1999 |

(Continued)

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1 (version 2: Sep. 8, 2011), 6th Meeting: Torino, IT, Jul. 14-22, 2011, http://phenix.itsudparis.eu/jct/doc_end_user/documents/6_Torino/wg11/JCTVC-F803-v3.zip.

*Primary Examiner* — Frank Huang
(74) *Attorney, Agent, or Firm* — Wenderoth, Lind & Ponack, L.L.P.

(57) ABSTRACT

An image processing apparatus includes: a first storing unit for storing a plurality of prediction parameters used in predictive image generation for a plurality of prediction units corresponding in size to at least one picture; a second storing unit for storing two or more prediction parameters used in predictive image generation for two or more prediction units among the plurality of prediction units; and a transferring unit configured to collectively transfer, for predictive image generation, (i) two or more of the prediction parameters from the first storing unit to the second storing unit or collectively transfer (ii) the two or more prediction (Continued)

parameters used in the predictive image generation for the two or more prediction units from the second storing unit to the first storing unit.

16 Claims, 33 Drawing Sheets

(51) Int. Cl.
*H04N 19/52* (2014.01)
*H04N 19/46* (2014.01)
*H04N 19/433* (2014.01)

(58) Field of Classification Search
CPC    H04N 7/188; H04N 5/14; H04N 7/00; H04N 7/01; H04N 7/12; H04N 7/26; H04N 7/32; H04N 7/014; H04N 7/0122; H04N 7/18; G06T 7/20; G06T 7/2033; G06T 5/50; G06T 7/2053; G06T 2207/10016; G08B 13/19608; G06K 9/00771
See application file for complete search history.

(56) References Cited

U.S. PATENT DOCUMENTS

| | | | |
|---|---|---|---|
| 8,090,025 B2* | 1/2012 | Sakazume | H04N 19/176 348/384.1 |
| 8,165,219 B2 | 4/2012 | Cismas | |
| 2004/0190632 A1 | 9/2004 | Cismas | |
| 2005/0232357 A1* | 10/2005 | Hubrich | H04N 5/145 375/240.16 |
| 2005/0254581 A1 | 11/2005 | Iguchi et al. | |
| 2008/0008244 A1 | 1/2008 | Chikamura et al. | |
| 2009/0237503 A1* | 9/2009 | Adiletta | G08B 13/19608 348/143 |
| 2010/0086053 A1 | 4/2010 | Okada et al. | |
| 2011/0116548 A1* | 5/2011 | Amano | H04N 19/52 375/240.16 |
| 2011/0211108 A1* | 9/2011 | Pollard | G02B 7/36 348/349 |
| 2011/0211642 A1* | 9/2011 | Cho | H04N 19/102 375/240.16 |
| 2013/0034164 A1 | 2/2013 | Shibahara et al. | |

FOREIGN PATENT DOCUMENTS

| | | |
|---|---|---|
| JP | 2006-520551 | 9/2006 |
| JP | 4106070 | 6/2008 |
| JP | 4436782 | 3/2010 |
| JP | 4625096 | 2/2011 |
| WO | 2004/079916 | 9/2004 |
| WO | 2008/117440 | 10/2008 |
| WO | 2008/136178 | 11/2008 |
| WO | 2010/131422 | 11/2010 |
| WO | 2011/129067 | 10/2011 |

* cited by examiner

SC: Start code
SH: Slice header

Current picture

Each number shows PU number.

Each bold square shows LCU area.

⇩

Map of corresponding picture

| 0  | 0  | 0  | 0  | 1  | 1  | 2  | 3  | 8  | 12 | 15 | 19 |
|----|----|----|----|----|----|----|----|----|----|----|----|
| 0  | 0  | 0  | 0  | 1  | 1  | 4  | 5  | 13 | 14 | 20 | 21 |
| 0  | 0  | 0  | 0  | 6  | 6  | 7  | 7  | 22 | 22 | 23 | 23 |
| 0  | 0  | 0  | 0  | 6  | 6  | 7  | 7  | 22 | 22 | 23 | 23 |
| 24 | 28 | 31 | 35 | 40 | 40 | 41 | 42 | 47 | 47 | 47 | 47 |
| 29 | 30 | 36 | 37 | 40 | 40 | 43 | 44 | 47 | 47 | 47 | 47 |
| 38 | 38 | 39 | 39 | 45 | 45 | 46 | 46 | 47 | 47 | 47 | 47 |
| 38 | 38 | 39 | 39 | 45 | 45 | 46 | 46 | 47 | 47 | 47 | 47 |

⇙  ⇘

Transfer area corresponding to prediction unit of first LCU

| 0 | 0 | 0 | 0 | 1 |
|---|---|---|---|---|
| 0 | 0 | 0 | 0 | 1 |
| 0 | 0 | 0 | 0 | 6 |
| 0 | 0 | 0 | 0 | 6 |
| 24| 28| 31| 35| 40|

Transfer area corresponding to prediction unit of second LCU

| 1 | 1 | 2 | 3 | 8 |
|---|---|---|---|---|
| 1 | 1 | 4 | 5 | 13|
| 6 | 6 | 7 | 7 | 22|
| 6 | 6 | 7 | 7 | 22|
| 40| 40| 41| 42| 47|

FIG. 24
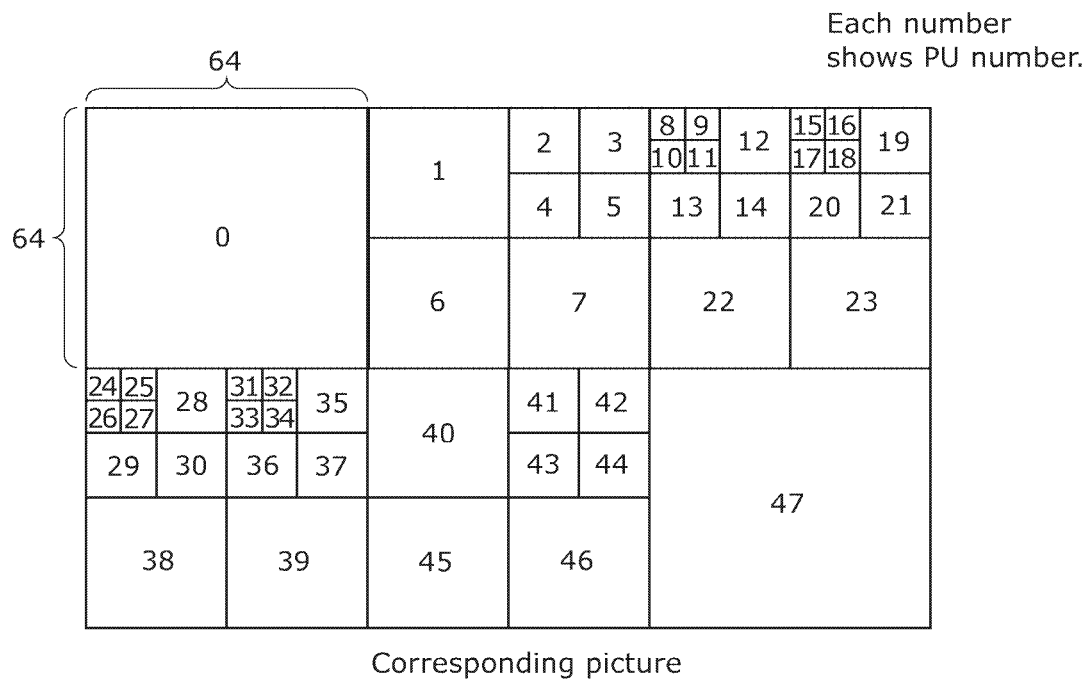
Corresponding picture
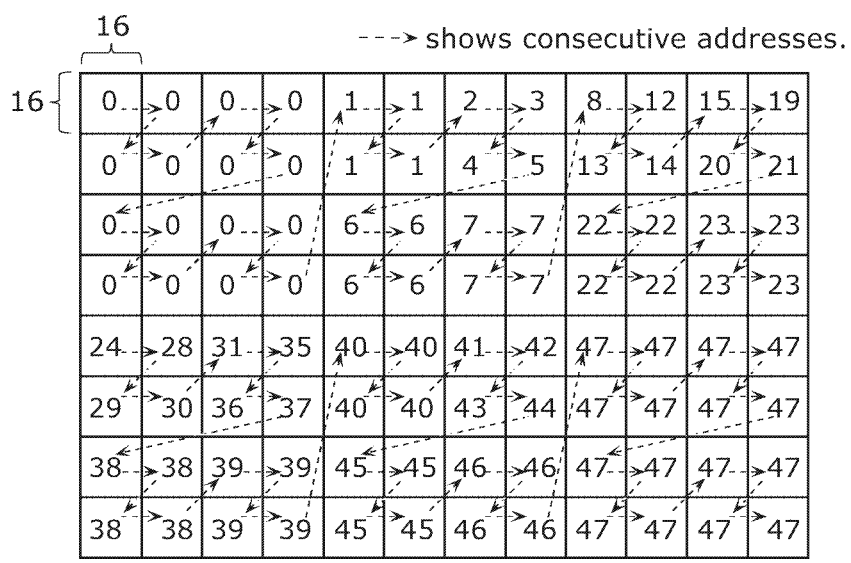
Map of corresponding picture

FIG. 25

IMAGE PROCESSING APPARATUS AND IMAGE PROCESSING METHOD FOR THE COLLECTIVE TRANSFER OF PREDICTION PARAMETERS BETWEEN STORAGE UNITS

TECHNICAL FIELD

The present invention relates to an image processing apparatus which performs predictive image generation for prediction units included in a picture different from a picture using prediction parameters used in predictive image generation for prediction units included in the latter picture.

BACKGROUND ART

Examples of techniques relating to the image processing apparatus which performs predictive image generation includes techniques disclosed in Patent Literature 1, Patent Literature 2, and Non-patent literature 1.

CITATION LIST

Patent Literature

[PTL 1]
   Japanese Patent Publication No. 4625096
[PTL 2]
   International Publication No. 2010/131422

Non Patent Literature

[NPL 1]
   "Working Draft 3 of High-Efficiency Video Coding", [online], Joint Collaborative Team on Video Coding (JCT-VC), Sep. 8, 2011, [searched on Sep. 22, 2011], Internet <URL: http://phenix.it-sudparis.eu/jct/doc_end_user/documents/6_Torino/wg11/JCTVC-F803-v3.zip>

SUMMARY OF INVENTION

However, the image processing apparatus may transfer information of prediction units when performs predictive image generation. This transfer may require a large amount of processing load or may cause a large processing delay.

In view of this, the present invention provides an image processing apparatus which is capable of reducing such a processing load and processing delay involved in the transfer of information of prediction units.

An image processing apparatus according to an aspect of the present invention is an image processing apparatus which performs, using a prediction parameter used in predictive image generation for a prediction unit included in a picture, predictive image generation for a prediction unit included in another picture, the image processing apparatus including: a first storing unit for storing a plurality of prediction parameters used in predictive image generation for a plurality of prediction units corresponding in size to at least one picture; a second storing unit for storing two or more prediction parameters used in predictive image generation for two or more prediction units among the plurality of prediction units; and a transferring unit configured to collectively transfer, for predictive image generation, (i) two or more of the prediction parameters from the first storing unit to the second storing unit or collectively transfer (ii) the two or more prediction parameters used in the predictive image generation for the two or more prediction units from the second storing unit to the first storing unit.

These general and specific aspects may be implemented using a system, a method, an integrated circuit, a computer program, or a non-transitory recording medium such as a computer-readable CD-ROM, or any combination of systems, apparatuses, methods, integrated circuits, computer programs, or computer-readable recording media.

The present invention reduces the number of transfers. This reduces the processing load and processing delay involved in the transfer of information of prediction units.

BRIEF DESCRIPTION OF DRAWINGS

FIG. 16 is a diagram showing an example of a transfer area according to Embodiment 2.

FIG. 19 is a diagram showing an example of a transfer area according to Embodiment 3.

FIG. 24 is a diagram showing an example of transfer of prediction parameters according to Embodiment 5.

FIG. 25 is a diagram showing a first example of transfer of a transfer area according to Embodiment 5.

DETAILED DESCRIPTION

Figure 1:
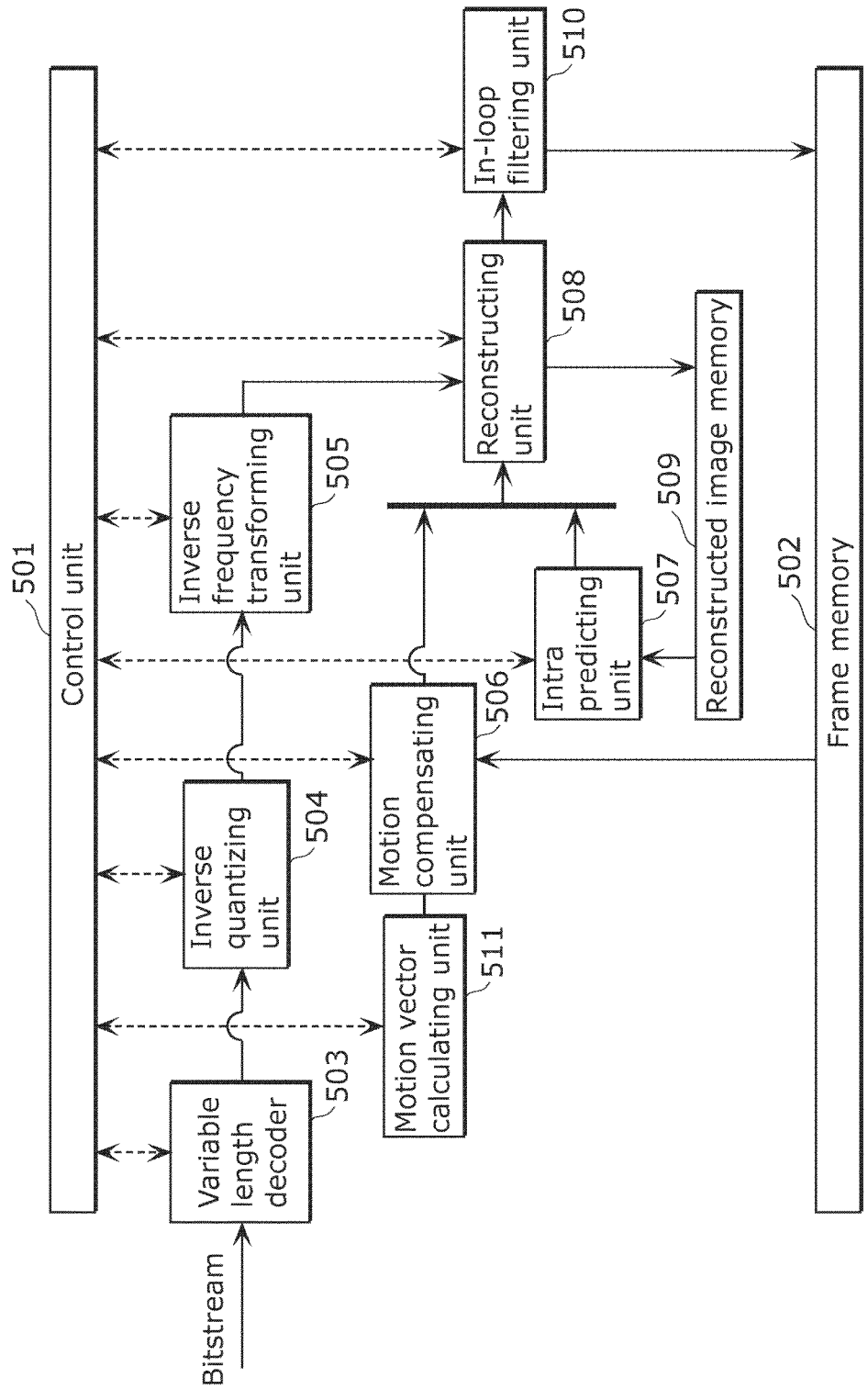
FIG. 1 is a diagram showing a structure of an image processing apparatus according to Embodiment 1.

The inventors founded a problem relating to the image processing apparatus which performs predictive image generation disclosed in the section of the "Background Art". The problem is described in detail below.

The image coding apparatus which codes a video divides each of pictures constituting the video into a plurality of macroblocks (which may be abbreviated as MB) each composed of 16×16 pixels. Next, the image coding apparatus codes the macroblocks in a raster scan order. The image coding apparatus compression-codes the pictures to generate a bitstream.

An image processing apparatus which decodes a video decodes the bitstream on a macroblock-by-macroblock basis in a raster scan order, and thereby reproduces each of the pictures in the original video. For example, Patent Literature 1 and Patent Literature 2 show apparatuses which decode videos on a macroblock-by-macroblock basis.

Here, one of the conventional image coding schemes is the ITU-T H.264 standard. An image processing apparatus which decodes a video coded using the H.264 standard firstly reads a bitstream. Next, the image processing apparatus decodes various kinds of header information, and then performs variable length decoding on the bitstream. The image processing apparatus performs inverse quantization on coefficient information obtained through the variable length decoding and performs inverse frequency transform on the inversely-quantized coefficient information. In this way, residual images are generated.

Next, the image processing apparatus performs intra prediction or motion compensation according to the type of each macroblock obtained through the variable length decoding. Here, motion compensation is performed on 16×16 pixels at maximum. In this way, the image processing apparatus generates predictive images. Next, the image processing apparatus adds each of the residual images to a corresponding one of the predictive images to reconstruct an image. Next, the image processing apparatus performs in-loop filtering on the reconstructed image to generate a decoding-target image.

The in-loop filter is a filter which is applied to the reconstructed image before the reconstructed image is stored in a frame memory as a reference image. The in-loop filter for use here is a deblocking filter, a sample adaptive offset filter, an active group filter, or the like. On the other hand, a filter which is applied at the time of display is referred to as an out-loop filter.

An image processing apparatus conforming to the H.264 standard codes an image for each macroblock composed of 16×16 pixels as described earlier. However, such 16×16 pixels are not always optimum as a coding unit. In general, a higher image resolution produces a higher correlation between adjacent blocks. For this reason, with a high image resolution, the image coding apparatus can increase the compression efficiency more significantly by using a larger coding unit.

Recently, displays having an ultra high resolution represented as 4K2K (3840×2160 pixels) have been developed. Accordingly, it is expected that image resolutions will be increasingly higher. It is increasingly difficult for image processing apparatus conforming to the H.264 standard to efficiently code high resolution images as image resolutions become higher.

On the other hand, some of the techniques proposed as the next-generation image coding standards can solve such a problem (Non-patent Literature 1). This technique employs variable coding unit block sizes as coding block sizes conforming to the conventional H.264 standard. The image coding apparatus according to this technique is capable of coding an image of a block composed of pixels larger in number than the conventional 16×16 pixels, and thus is capable of coding a high resolution image properly.

More specifically, in Non-patent Literature 1, a coding unit (CU) is defined as a coding data unit. This coding unit is a data unit in which intra prediction for performing prediction within a frame and inter prediction for performing motion compensation are switchable as in the case of a macroblock in the conventional coding standards. This coding unit is defined as the most basic block in coding.

The size of this coding unit is any one of 8×8 pixels, 16×16 pixels, 32×32 pixels, and 64×64 pixels. The largest coding unit is referred to as a Largest Coding Unit (LCU).

Furthermore, a Transform Unit (TU, also referred to as a frequency transform unit) is defined as a data unit in frequency transform. This transform unit is set to any one of various square or rectangular sizes corresponding to 4×4 pixels or more, such as 4×4 pixels, 8×8 pixels, 16×16 pixels, 16×12 pixels, 32×32 pixels, and 64×64 pixels.

In addition, a Prediction Unit (PU) is defined as a data unit in intra prediction or inter prediction. This prediction unit is set to any one of various square or rectangular sizes corresponding to 4×4 pixels or more, such as 64×64 pixels, 64×32 pixels, 32×64 pixels, 32×32 pixels, 32×16 pixels, 16×32 pixels, and 16×12 pixels. The largest prediction unit is 64×64 pixels. Next, such prediction is performed for each prediction unit.

The image processing apparatus may refer to information of another prediction unit when performing prediction of an image for a prediction unit. For this reason, the image processing apparatus needs to transfer the information of the prediction unit. This transfer increases the processing load and processing delay. This is described in detail below.

Motion compensation is performed on a prediction unit. For example, the image processing apparatus performs motion compensation on a current prediction unit which is a decoding-target prediction unit. At this time, the image processing apparatus calculates a motion vector necessary for motion compensation for the current prediction unit. In the calculation of the motion vector for the current prediction unit, certain information may be used which is of a corresponding prediction unit which is a prediction unit temporally adjacent to the current prediction unit.

In this case, the image processing apparatus calculates the motion vector for the current prediction unit with reference to a prediction parameter of the corresponding prediction unit included in a picture different from a picture including the current prediction unit. The prediction parameter is a parameter used in predictive image generation, and includes, as information, a prediction mode which indicates which one of the intra-frame prediction (intra prediction) or motion compensation (inter prediction) is used, a motion vector, a reference picture number, and the like.

In addition, the prediction parameter may be referred to as motion vector information or colPU information. The picture including a current prediction unit may be referred to as a current picture. A picture different from the current picture may be referred to as a co-located picture, a colPic, or a corresponding picture. A corresponding prediction unit included in the corresponding picture may be referred to as a co-located macroblock, or a colPU.

In Non-patent Literature 1, the image processing apparatus refers to a first prediction parameter which is a prediction parameter of a first corresponding unit. The first corresponding prediction unit is a corresponding prediction unit included in a corresponding picture and is located at a lower right position with respect to a current prediction unit.

When such a first prediction parameter is not available, the image processing apparatus refers to a second prediction parameter which is a prediction parameter of a second corresponding prediction unit. The second corresponding prediction unit is a corresponding prediction unit included in the corresponding picture and corresponds in position to the current prediction unit. Examples of cases where a first prediction parameter is not available include a case where a first corresponding prediction unit is an intra-prediction coded prediction unit, and a case where a first corresponding prediction unit is outside a corresponding picture.

When the first prediction parameter is available, the image processing apparatus calculates a motion vector by performing a calculation shown in Non-patent Literature 1 using the first prediction parameter. When the first prediction parameter is not available but a second prediction parameter is available, the image processing apparatus calculates a motion vector by performing a calculation shown in Non-patent Literature 1 using the second prediction parameter.

When each of the first prediction parameter and the second prediction parameter is not available, the image processing apparatus does not use any prediction parameter in the corresponding prediction unit for motion vector calculation.

As described above, in Non-patent Literature 1, the first prediction parameter is referred to firstly in the predictive image generation for the current prediction unit. When the first prediction parameter is not available, the second prediction parameter is referred to. In other words, the first prediction parameter is preferentially used. In this way, the lower right information is effectively used, resulting in an increase in the coding efficiency.

However, in the process of determining whether the second prediction parameter is necessary based on the first prediction parameter, access to a storing unit which stores these prediction parameters is frequently made. For this reason, the load and delay involved in the motion vector calculation process is large.

The decoding apparatus according to Patent Literature 1 obtains in advance information to be used to decode macroblocks that follow a currently being decoded macroblock. In this way, transfer time for obtaining the information is sealed. However, in Non-patent Literature 1, information to be used for predictive image generation is selectively switched to either the first prediction parameter or the second predictive parameter. Accordingly, it is difficult to obtain in advance such information to be used for predictive image generation.

In Patent Literature 2, whether or not information of a co-located macroblock is necessary is determined in advance based on a macroblock type. When the information of the co-located macroblock is not necessary, the information of the co-located macroblock is not transferred. In this way, the amount of data to be transferred is reduced.

However, in Non-patent Literature 1, the first prediction parameter needs to be transferred in order to determine whether or not the second prediction parameter is necessary. As a result of the determination, the second prediction parameter needs to be transferred additionally. In this case, the use of the technique of Patent Literature 2 does not reduce the processing load in the transfer process.

In other words, even when the technique of Patent Literature 1 or Patent Literature 2 is used, access to a storing unit which stores these prediction parameters is frequently made. This transfer increases the processing load and processing delay.

In order to solve the aforementioned problems, an image processing apparatus according to an aspect of the present invention is an image processing apparatus which performs, using a prediction parameter used in predictive image generation for a prediction unit included in a picture, predictive image generation for a prediction unit included in another picture, the image processing apparatus including: a first storing unit for storing a plurality of prediction parameters used in predictive image generation for a plurality of prediction units corresponding in size to at least one picture; a second storing unit for storing two or more prediction parameters used in predictive image generation for two or more prediction units among the plurality of prediction units; and a transferring unit configured to collectively transfer, for predictive image generation, (i) two or more of the prediction parameters from the first storing unit to the second storing unit or collectively transfer (ii) the two or more prediction parameters used in the predictive image generation for the two or more prediction units from the second storing unit to the first storing unit.

This reduces the number of transfers of information of prediction units. This reduces the processing load and processing delay involved in the transfer of information of prediction units.

For example, the transferring unit may be configured to collectively transfer (i) the two or more of the prediction parameters or collectively transfer (ii) the two or more prediction parameters, the prediction parameters of (i) and (ii) each including motion vector information.

In this way, the motion vector information is efficiently transferred. This reduces the processing load and processing delay in the case where the motion vector of another prediction unit is used.

For example, the transferring unit may be configured to collectively transfer (i) the two or more of the prediction parameters for predictive image generation from the first storing unit to the second storing unit.

In this way, the prediction parameters for predictive image generation are efficiently transferred. Accordingly, this reduces the processing load and processing delay in the transfer of the prediction parameters for predictive image generation.

For example, the transferring unit may be configured to collectively transfer (i) the two or more of the prediction parameters, the two or more of the prediction parameters each having a possibility of being used for predictive image generation for a prediction unit.

In this way, the number of iterations of transferring the prediction parameters is reduced. This reduces the processing load and processing delay.

For example, the transferring unit may be configured to collectively transfer (i) the two or more of the prediction parameters, the two or more of the prediction parameters including: (i) a prediction parameter used in predictive image generation for a second prediction unit included in a second picture different from a first picture including a first prediction unit, the second prediction unit being located at a lower right position with respect to the first prediction unit for which predictive image generation is performed; and (ii) a prediction parameter used in predictive image generation for a third prediction unit included in the second picture, the third prediction unit corresponding in position to the first prediction unit.

In this way, the prediction parameter corresponding to the lower right position and the prediction parameter corresponding to the corresponding position are collectively transferred at the same time. This reduces the number of transfers.

For example, the transferring unit may be configured to collectively transfer (i) the two or more of the prediction parameters, the two or more of the prediction parameters including a prediction parameter having a possibility of being used for predictive image generation for a prediction unit and a prediction parameter not having a possibility of being used for predictive image generation for the prediction unit.

In this way, a larger number of prediction parameters are transferred at one time of transfer. This reduces the number of iterations of transferring prediction parameters. This reduces the processing load and processing delay.

For example, the transferring unit may be configured to collectively transfer two or more of the prediction parameters for predictive image generation for each of all prediction units included in a predetermined largest coding unit.

In this way, the number of iterations of transfer is reduced in the predictive image generation for the plurality of prediction units included in the largest coding unit. This reduces the processing load and processing delay.

For example, the transferring unit may be configured to collectively transfer (ii) the two or more prediction parameters used in the predictive image generation from the second storing unit to the first storing unit.

In this way, prediction parameters used in the predictive image generation are efficiently transferred. This reduces the processing load and processing delay in the transfer of the prediction parameters used in the predictive image generation.

For example, the transferring unit may be configured to collectively transfer (ii) the two or more prediction parameters used in the prediction image generation for the two or more prediction units from the second storing unit to consecutive addresses in the first storing unit, the two or more prediction units being spatially adjacent to each other.

In this way, the plurality of prediction parameters are transferred collectively to the consecutive addresses. The plurality of prediction parameters transferred collectively correspond to the plurality of prediction units spatially adjacent to each other. Accordingly, this makes it easier to transfer collectively the plurality of prediction parameters corresponding to the plurality of prediction units spatially adjacent to each other as the plurality of prediction parameters for predictive image generation.

For example, the transferring unit may be configured to collectively transfer (ii) the two or more prediction parameters used in the prediction image generation for the two or more prediction units from the second storing unit to consecutive addresses in the first storing unit, the two or more prediction units being spatially adjacent to each other in a horizontal direction.

Accordingly, this makes it easier to transfer collectively the plurality of prediction parameters corresponding to the plurality of prediction units spatially adjacent to each other in the horizontal direction as the plurality of prediction parameters for predictive image generation.

For example, the transferring unit may be configured to collectively transfer (ii) the two or more prediction parameters used in the prediction image generation for the two or more prediction units from the second storing unit to consecutive addresses in the first storing unit, the two or more prediction units being spatially adjacent to each other in a vertical direction.

Accordingly, this makes it easier to transfer collectively the plurality of prediction parameters corresponding to the plurality of prediction units spatially adjacent to each other in the vertical direction as the plurality of prediction parameters for predictive image generation.

For example, the transferring unit may be configured to collectively transfer two or more prediction parameters, the two or more prediction parameters being used in predictive image generation for each of all prediction units included in a predetermined largest coding unit.

In this way, the number of iterations of transfer is reduced in the predictive image generation for the plurality of prediction units included in the largest coding unit. This reduces the processing load and processing delay.

For example, the transferring unit may be configured to collectively transfer (ii) the two or more prediction parameters used in the prediction image generation for the two or more prediction units from the second storing unit to consecutive addresses in the first storing unit, the two or more prediction units being continuous in a processing order.

In this way, it becomes easy to transfer collectively later the plurality of prediction parameters corresponding to the plurality of prediction units which are consecutive in a processing order as the plurality of prediction parameters for predictive image generation.

For example, the transfer unit may be configured to: generate a plurality of prediction parameters corresponding to a plurality of sets of coordinates arranged at equal intervals in a prediction unit by copying a prediction parameter used in prediction image generation for the prediction unit; and collectively transfer the generated prediction parameters as (ii) the two or more prediction parameters from the second storing unit to the first storing unit.

In this way, it becomes easier to transfer later the prediction parameters located at coordinate positions included in prediction units as prediction parameters for predictive image generation.

For example, the image processing apparatus may include a predictive image generating unit configured to perform predictive image generation for a prediction unit using a prediction parameter transferred from the first storing unit to the second storing unit.

In this way, the prediction is properly performed using the transferred prediction parameter that is the input prediction parameter.

For example, the image processing apparatus may include a predictive image generating unit configured to perform predictive image generation for a prediction unit using a prediction parameter among (i) the two or more of the prediction parameters, the two or more of the prediction parameters being collectively transferred from the first storing unit to the second storing unit.

In this way, the number of iterations of transfer is reduced by transferring collectively the plurality of prediction parameters even when the one of the plurality of prediction parameters is selectively used. This reduces the processing load and processing delay.

It is to be noted that these general and specific aspects may be implemented using a system, a method, an integrated circuit, a computer program, or a non-transitory recording medium such as a computer-readable recording CD-ROM, or any combination of systems, apparatuses, methods, integrated circuits, computer programs, or computer-readable recording media.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the present invention. Therefore, among the structural elements in the following exemplary embodiments, structural elements not recited in any one of the independent claims which define the most generic concept are described as arbitrary structural elements.

In addition, the expressions such as 64×64 pixels and 32×32 pixels mean a 64×64 pixel size and a 32×32 pixel size, respectively.

In addition, each of the expressions such as a block, a data unit, a coding unit, or the like means a continuous area. Each of the expressions may mean an image area. Alternatively, each of the expressions may mean a data area in a bitstream.

In addition, an image may be (i) a still image or (ii) a plurality of pictures, a single picture, or a part of a picture each in a video.

[Embodiment 1]
(1-1 Outline)

First, the outline of an image processing apparatus according to this embodiment is described. The image processing apparatus according to this embodiment calculates a motion vector for a current prediction unit with reference to a prediction parameter of a corresponding prediction unit. At this time, the image processing apparatus speculatively obtains all the prediction parameters each having a possibility of being used for predictive image generation for a current prediction unit. This reduces the number of times of memory access for obtaining the prediction parameters of the corresponding prediction units. Accordingly, the whole decoding is accelerated.

(1-2 Structure)

Next, the structure of the image processing apparatus according to this embodiment is described.

FIG. 1 is a structural diagram of the image processing apparatus according to this embodiment. The image processing apparatus according to this embodiment includes: a control unit 501, a frame memory 502, a reconstructed image memory 509, a variable length decoder 503, an inverse quantizing unit 504, an inverse frequency transforming unit 505, a motion compensating unit 506, an intra predicting unit 507, a reconstructing unit 508, an in-loop filtering unit 510, and a motion vector calculating unit 511.

The control unit 501 controls the whole image processing apparatus. The frame memory 502 is a memory for storing decoded image data. The reconstructed image memory 509 is a memory for storing a part of reconstructed images. The variable length decoder 503 reads a bitstream and decodes variable length codes. The inverse quantizing unit 504 performs inverse quantization on the decoded data. The inverse frequency transforming unit 505 performs inverse frequency transform on the inverse-quantized data.

The motion vector calculating unit 511 calculates a motion vector based on a prediction motion vector and a differential motion vector etc. The motion vector calculating unit 511 may calculate a motion vector based on information of a corresponding prediction unit. Next, the motion vector calculating unit 511 outputs the motion vector to the motion compensating unit 506. The motion compensating unit 506 reads a reference image from a frame memory 502, and performs motion compensation to generate a predictive image. The intra predicting unit 507 reads a reference image from the reconstructed image memory 509, and performs intra prediction to generate a predictive image.

The reconstructing unit 508 adds differential images and respective predictive images to generate reconstructed images, and stores the part of the reconstructed images in the reconstructed image memory 509. The in-loop filtering unit 510 removes block noise from the reconstructed images to enhance the image quality of the reconstructed images.

Figure 2:
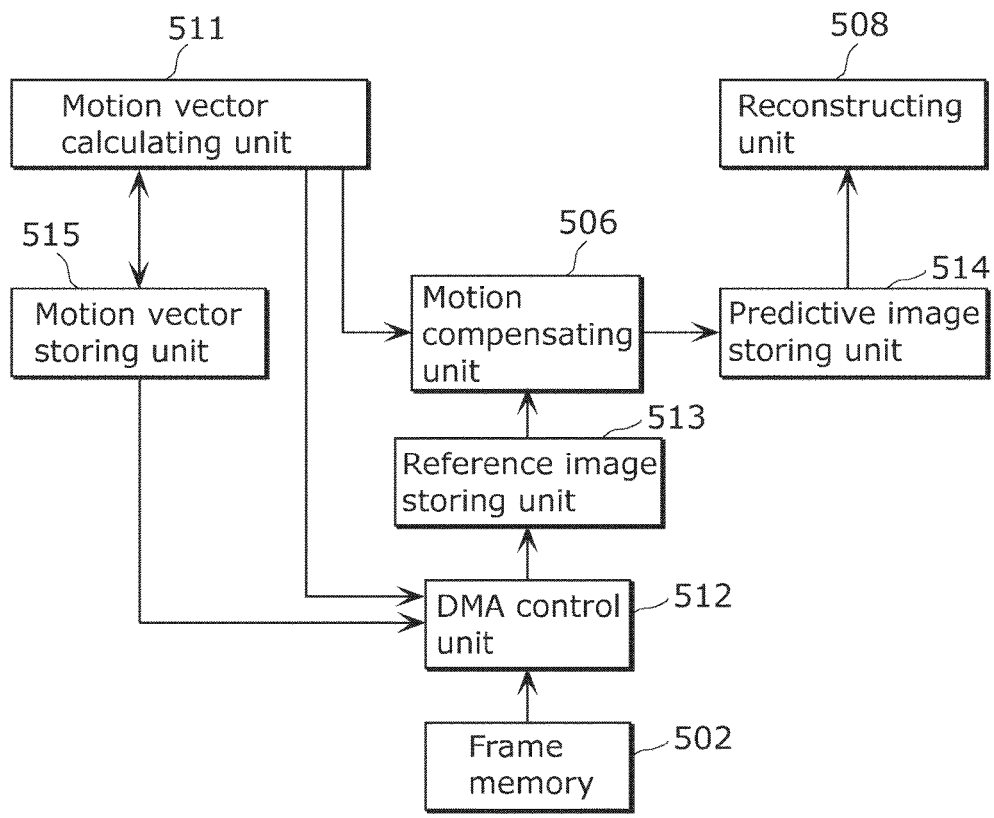
FIG. 2 is a diagram showing a motion compensating unit and structural elements related thereto according to Embodiment 1.

FIG. 2 is a structural diagram of the motion compensating unit 506 and neighboring units according to this embodiment. The same structural elements as in FIG. 1 are assigned with the same reference signs, and the same descriptions are not repeated. FIG. 2 shows a Direct Memory Access (DMA) control unit 512, a reference image storing unit 513, a predictive image storing unit 514, and a motion vector storing unit 515, in addition to the structural elements shown in FIG. 1. These elements may be included in the motion compensating unit 506. In addition, the motion vector storing unit 515 may be included in the motion vector calculating unit 511.

The DMA control unit 512 transfers, based on the coordinates and size of the current prediction unit, the prediction parameter of the corresponding prediction unit from the frame memory 502 to the motion vector storing unit 515. The motion vector storing unit 515 stores prediction parameters transferred by the DMA control unit 512. The DMA control unit 512 transfers the prediction parameters including the motion vector calculated by the motion vector calculating unit 511 from the motion vector storing unit 515 to the frame memory 502.

In addition, the DMA control unit 512 transfers, based on the motion vector calculated by the motion vector calculating unit 511, a reference image from the frame memory 502 to the reference image storing unit 513. The reference image storing unit 513 stores reference images transferred by the DMA control unit 512. In addition, the predictive image storing unit 514 stores predicted images generated by the motion compensating unit 506.

(1-3 Operations)

Next, operations by the image processing apparatus according to this embodiment are described. A bitstream decoded by the image processing apparatus according to this embodiment is composed of coding units, transform units, and prediction units.

The coding units each are set to have a size in the range from 64×64 pixels to 8×8 pixels, and in any of which a switch between intra prediction and inter prediction can be made. The transform units each are set to have a size in the range from 64×64 pixels to 4×4 pixels in the coding units. The prediction units each are set to have a size in the range from 64×64 pixels to 4×4 pixels in the areas inside the coding units. Each of the prediction unit has either a prediction mode for intra prediction or a motion vector for inter prediction. Hereinafter, the structures of bitstreams are described with reference to FIG. 3A to FIG. 5B.

Figure 3A:
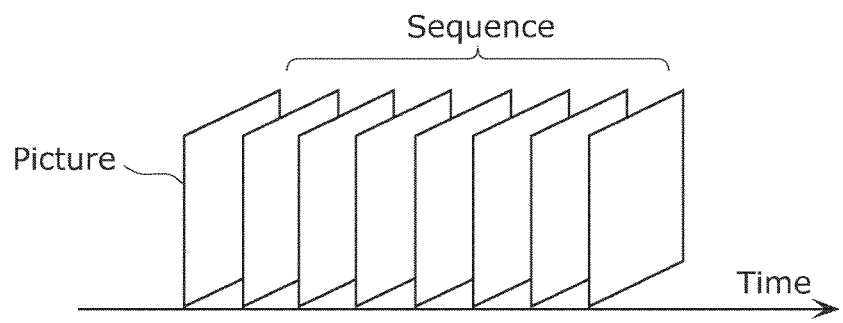
FIG. 3A is a diagram showing an example of a sequence according to Embodiment 1.
Figure 3B:
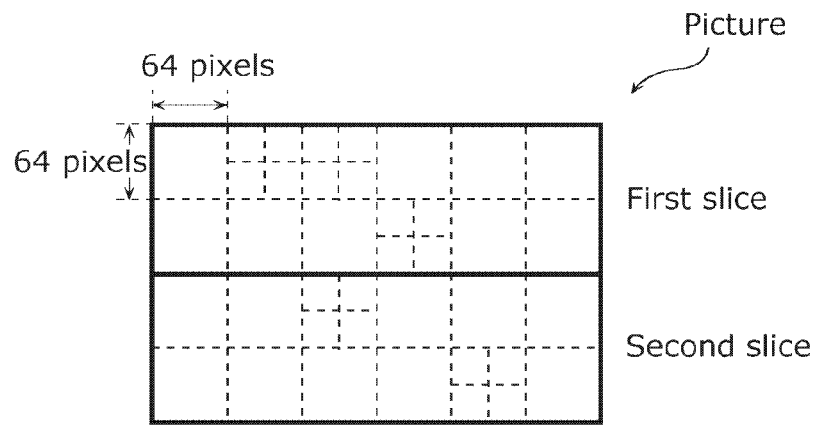
FIG. 3B is a diagram showing an example of a picture according to Embodiment 1.

Each of FIG. 3A and FIG. 3B shows a hierarchical structure of an image which is decoded by the image processing apparatus according to this embodiment. As shown in FIG. 3A, a plurality of pictures is referred to as a sequence. As shown in FIG. 3B, each of the pictures is divided into slices, and each slice is further divided into coding units. Some pictures may be retained without being divided into slices. In this embodiment, the largest coding unit size is 64×64 pixels.

Figure 3C:
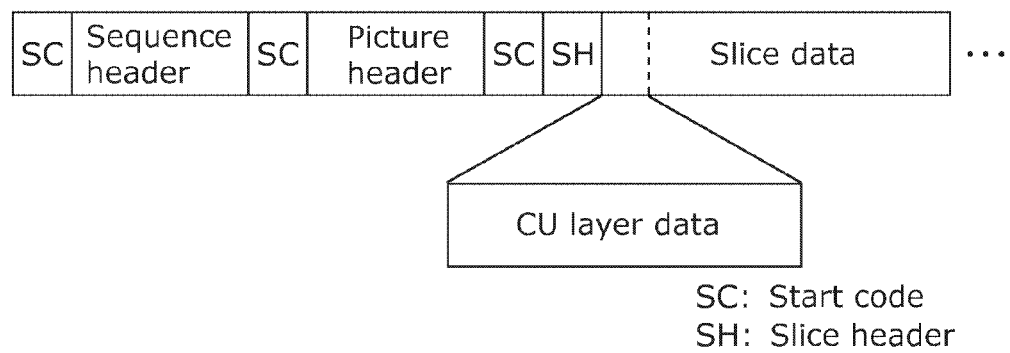
FIG. 3C is a diagram showing an example of a bitstream according to Embodiment 1.

FIG. 3C is a diagram showing a bitstream according to this embodiment. The bitstream shown in FIG. 3C is obtained by hierarchically coding the data shown in FIG. 3A and FIG. 3B.

The bitstream shown in FIG. 3C is composed of a sequence header for controlling the sequence, picture headers for controlling the pictures, slice headers for controlling the slices, and coding unit layer data (CU layer data). In the H.264 standard, a sequence header is also referred to as a Sequence Parameter Set (SPS), and a picture header is also referred to as a Picture Parameter Set (PPS).

Figure 4A:
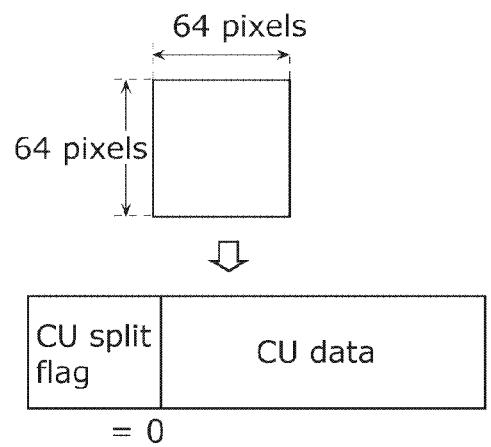
FIG. 4A is a diagram showing a coding unit and an example of a structure of coding unit layer data according to Embodiment 1.

FIG. 4A is a diagram showing a coding unit and an example of a structure of coding unit layer data according to this embodiment. The coding unit layer data corresponding to the coding units is composed of CU split flags and CU data (coding unit data). A CU split flag shows dividing a coding unit by four when the flag has a value of "1", and a CU split flag shows not dividing a coding unit by four when the flag has a value of "0". In FIG. 4A, the coding unit of 64×64 pixels is not divided. In other words, the CU split flag shows "0".

Figure 4B:
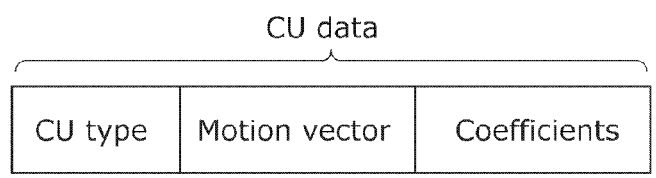
FIG. 4B is a diagram showing an example of a structure of a coding unit data according to Embodiment 1.

FIG. 4B is a diagram showing an example of a structure of CU data according to this embodiment. The CU data includes a CU type, a motion vector or an intra prediction mode, and coefficients. The sizes of prediction units are determined based on the CU type.

Figure 5A:
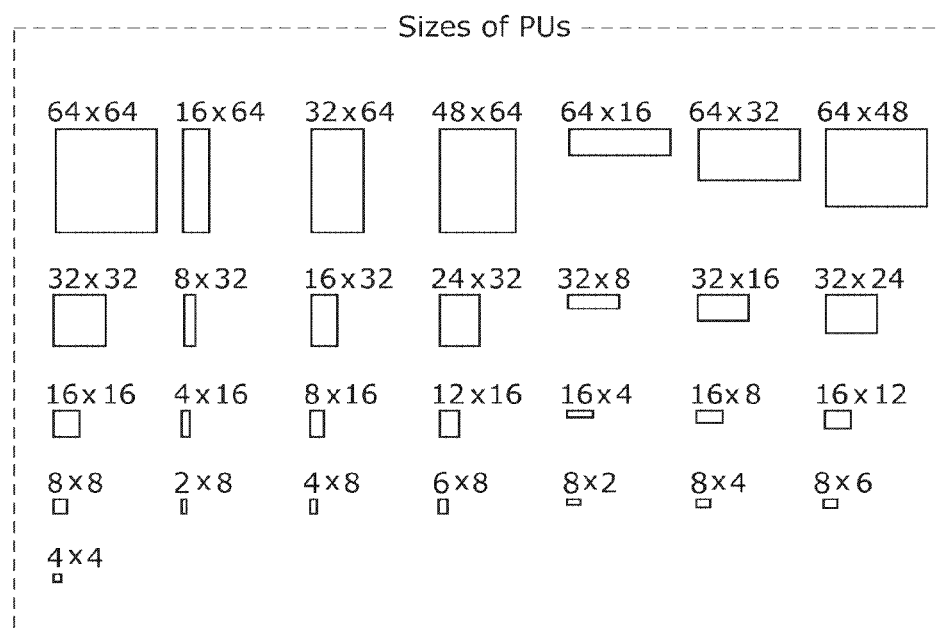
FIG. 5A is a diagram showing examples of sizes of prediction units according to Embodiment 1.

FIG. 5A is a diagram showing examples of sizes selectable as the sizes of prediction units. More specifically, FIG. 5A shows 64×64 pixels, 32×64 pixels, 64×32 pixels, 32×32 pixels, 16×32 pixels, 32×16 pixels, 16×16 pixels, 16×8 pixels, 8×16 pixels, 8×8 pixels, 8×4 pixels, 4×8 pixels, and 4×4 pixels. The sizes of prediction units can be selected from among sizes of 4×4 pixels or more. In addition, the shapes of prediction units may be rectangular.

Next, a motion vector or an intra prediction mode is specified for each prediction unit. In this embodiment, only motion vectors are used, and thus only motion vectors are shown in FIG. 4B. In addition, as shown in FIG. 5A, a prediction unit of 16×64 pixels and a prediction unit of 48×64 pixels obtained by dividing a square at a ratio of 1:3 may be selected.

Figure 5B:
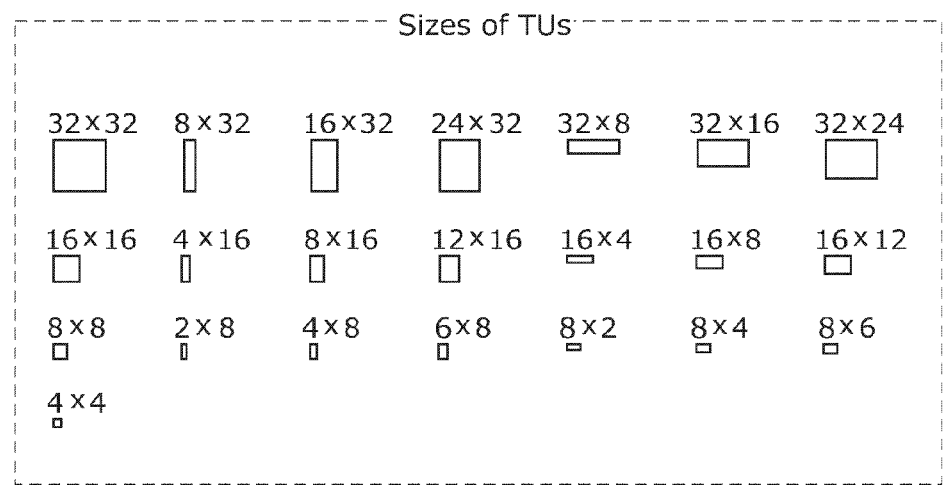
FIG. 5B is a diagram showing examples of sizes of prediction units according to Embodiment 1.

FIG. 5B is a diagram showing examples of sizes selectable as the sizes of transform units. More specifically, FIG. 5B shows 32×32 pixels, 16×32 pixels, 32×16 pixels, 16×16 pixels, 16×8 pixels, 8×16 pixels, 8×8 pixels, 8×4 pixels, 4×8 pixels, and 4×4 pixels. As shown in FIG. 5B, a transform unit of 8×32 pixels and a transform unit of 24×32 pixels obtained by dividing a square at a ratio of 1:3 may be selected.

Figure 6:
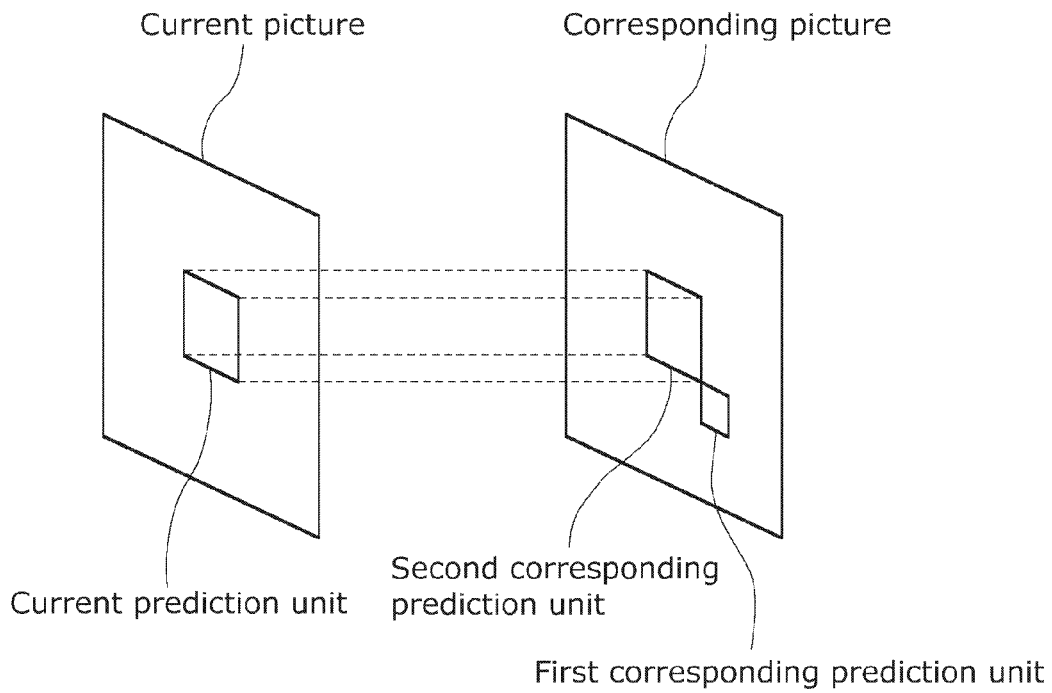
FIG. 6 is a diagram showing a relationship between a current prediction unit and corresponding prediction units according to Embodiment 1.

FIG. 6 is a diagram showing a relationship between a current prediction unit and corresponding prediction units according to this embodiment. The current prediction unit is a coding-target (prediction-target) prediction unit. The current prediction unit is included in a current picture. Each of the corresponding pictures is a picture different from the current picture. A first corresponding prediction unit is a corresponding prediction unit included in one of the corresponding pictures and is located at a lower right position with respect to the current prediction unit. A second corresponding prediction unit is a corresponding prediction unit included in the one of the corresponding pictures and corresponds in position to the current prediction unit.

For predictive image generation for the current prediction unit, a prediction parameter used in predictive image generation for the first corresponding prediction unit is used preferentially over a prediction parameter used in predictive image generation for the second corresponding prediction unit. When the prediction parameter used in the predictive image generation for the first corresponding prediction unit is not available, the prediction parameter used in the predictive image generation for the second corresponding prediction unit is used for the predictive image generation for the current prediction unit.

Figure 7:
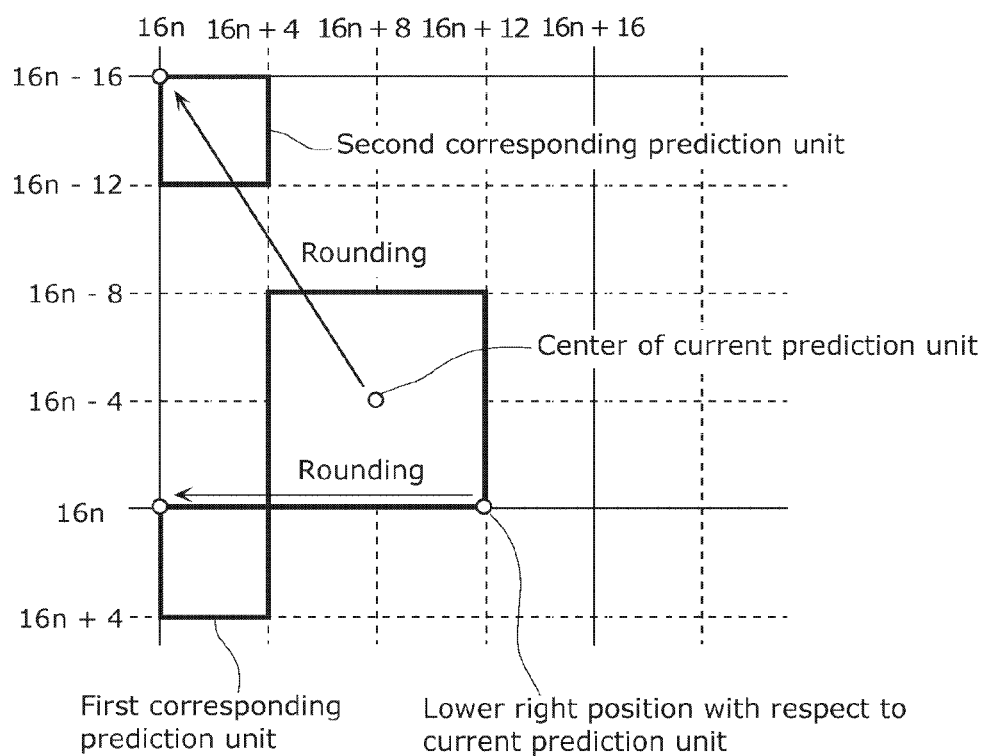
FIG. 7 is a diagram showing the positions of corresponding prediction units according to Embodiment 1.

FIG. 7 is a diagram showing the positions of the corresponding prediction units according to this embodiment. The first corresponding prediction unit is located at a lower right position with respect to the current prediction unit. The second corresponding prediction unit corresponds in position to the current prediction unit. More specifically, the first corresponding prediction unit is a prediction unit including a position obtained by rounding, at 16 pixels, the values indicating the coordinate position in a lower right direction with respect to the current prediction unit. The second corresponding prediction unit is a prediction unit including a position obtained by rounding, at 16 pixels, the values indicating the coordinate position at the center of the current prediction unit.

It is to be noted that the positions of the corresponding prediction units are not limited to the positions determined according to the aforementioned criteria. The positions of the corresponding prediction units may be determined according to other criteria.

Figure 8:
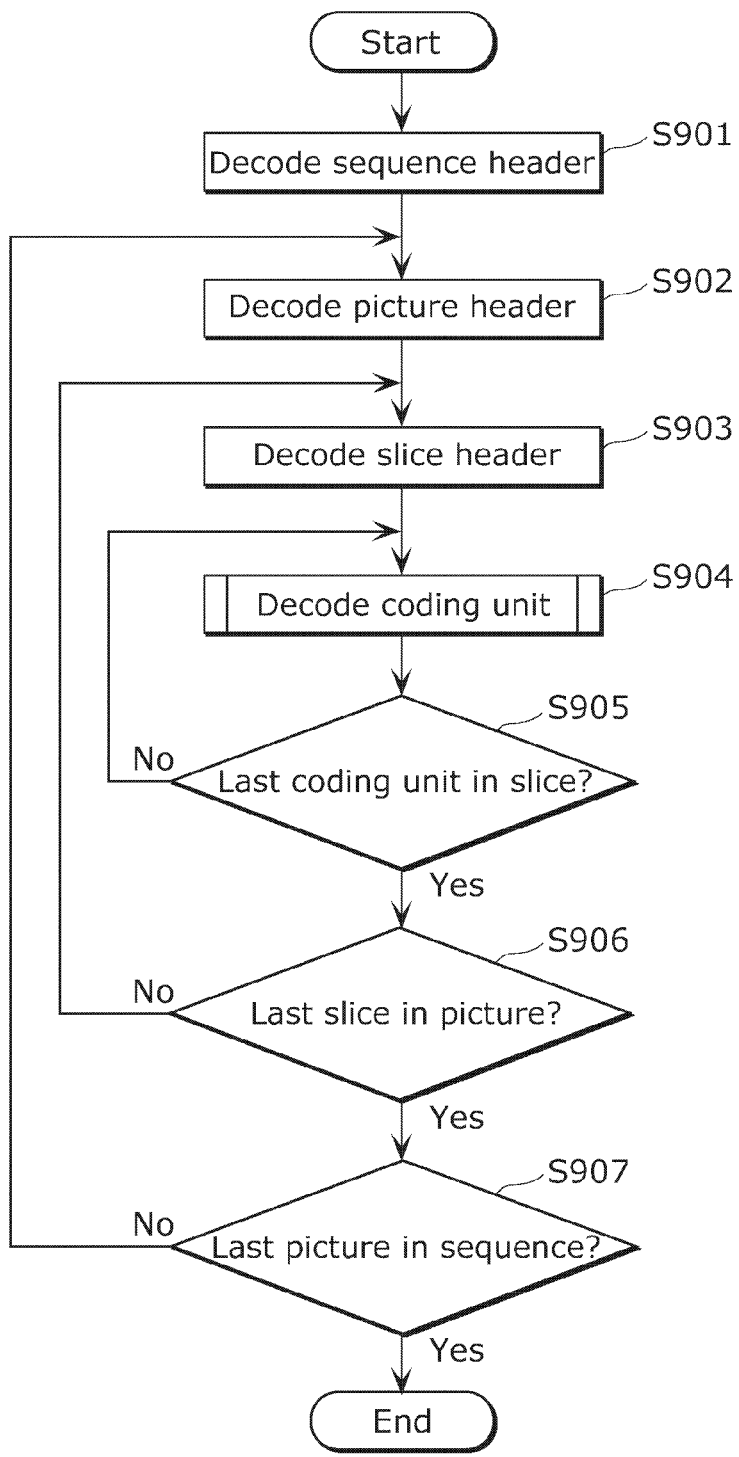
FIG. 8 is a flowchart of operations performed by the image processing apparatus according to Embodiment 1.

FIG. 8 is a flowchart of decoding performed on a sequence included in a bitstream. With reference to the flowchart shown in FIG. 8, operations by the image processing apparatus shown in FIG. 1 are described. The image processing apparatus decodes a sequence header first (S901). At this time, the variable length decoder 503 decodes the bitstream under control of the control unit 501. Next, the image processing apparatus decodes picture headers (S902), and decodes slice headers (S903).

Next, the image processing apparatus decodes coding units (S904). Decoding of coding units is described in detail later. Each time the image processing apparatus decodes a coding unit, it determines whether or not the decoded coding unit is the last coding unit in a slice (S905). When the decoded coding unit is not the last coding unit in the slice (No in S905), the image processing apparatus decodes a next current coding unit (S904).

Furthermore, the image processing apparatus determines whether or not a slice including the decoded coding unit is the last slice in a picture (S906). When the slice is not the last slice in the picture (No in S906), the image processing apparatus decodes a slice header (S903).

Furthermore, the image processing apparatus determines whether or not the picture including the decoded coding unit is the last picture in the sequence (S907). When the picture is not the last picture in the sequence (No in S907), the image processing apparatus decodes a picture header again (S902). The image processing apparatus decodes all the pictures of the sequence, and ends the series of decoding operations.

Figure 9:
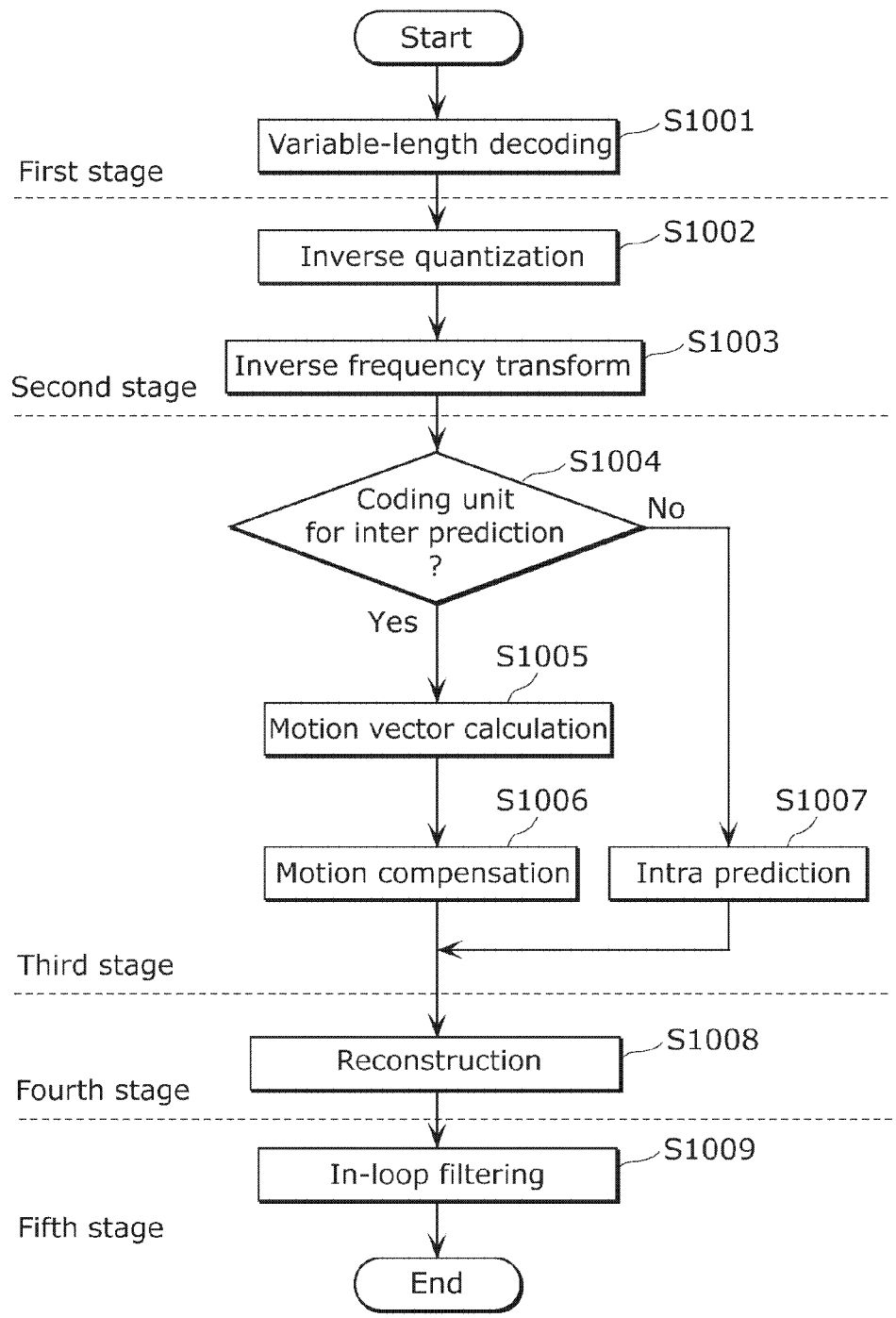
FIG. 9 is a flowchart of decoding of a coding unit according to Embodiment 1.

FIG. 9 is a flowchart of decoding operations on a coding unit. With reference to FIG. 9, the decoding operation (S904) on the coding unit in FIG. 8 is described.

First, the variable length decoder 503 performs variable length decoding on a processing-target coding unit included in an input bitstream (S1001).

In the variable length decoding process (S1001), the variable length decoder 503 outputs coding information such as a coding unit type, an intra-frame prediction (intra prediction) mode, a motion vector, and a quantization parameter. In this embodiment, the coding information to be output includes the size of a coding unit, the processing order of the coding unit, the sizes of prediction units, the sizes of transform units, and the processing order of the transform units. In addition, the variable length decoder 503 outputs coefficient information corresponding to pixel data.

The coding information is output to the control unit 501, and then is input to each of predetermined processing units. The coefficient information is next output to the inverse quantizing unit 504. Next, the inverse quantizing unit 504 performs an inverse quantization process (S1002). Next, the inverse frequency transforming unit 505 performs an inverse frequency transform to generate a differential image (S1003).

Next, the control unit 501 determines which one of the inter prediction and intra prediction is used for the processing-target coding unit (S1004).

When the inter prediction is used (Yes in S1004), the control unit 501 starts up the motion vector calculating unit 511. The motion vector calculating unit 511 calculates a motion vector (S1005). Next, the motion vector calculating unit 511 transfers a reference image specified by the motion vector from the frame memory 502. Next, the control unit 501 starts up the motion compensating unit 506. Next, the motion compensating unit 506 generates a predictive image with a ½ pixel accuracy or a ¼ pixel accuracy (S1006).

On the other hand, when inter prediction is not used (No in S1004), in other words, when intra prediction is used, the control unit 501 starts up the intra predicting unit 507. The intra predicting unit 507 performs intra prediction to generate a predictive image (S1007).

The reconstructing unit 508 adds the predictive image output by the motion compensating unit 506 or the intra predicting unit 507 and the differential image output by the inverse frequency transforming unit 505 to generate a reconstructed image (S1008).

The reconstructed image is input to the in-loop filtering unit 510. At the same time, the images used in intra prediction are stored in the reconstructed image memory 509. Lastly, the in-loop filtering unit 510 performs in-loop filtering for reducing noise onto the input reconstructed image. Next, the in-loop filtering unit 510 stores the result onto the frame memory 502 (S1009). As described above, the image processing apparatus ends the decoding operations on the coding unit.

In the example of FIG. 9, each of the above-described processes are divided into a plurality of stages. These processes constitute pipeline processing.

Figure 10:
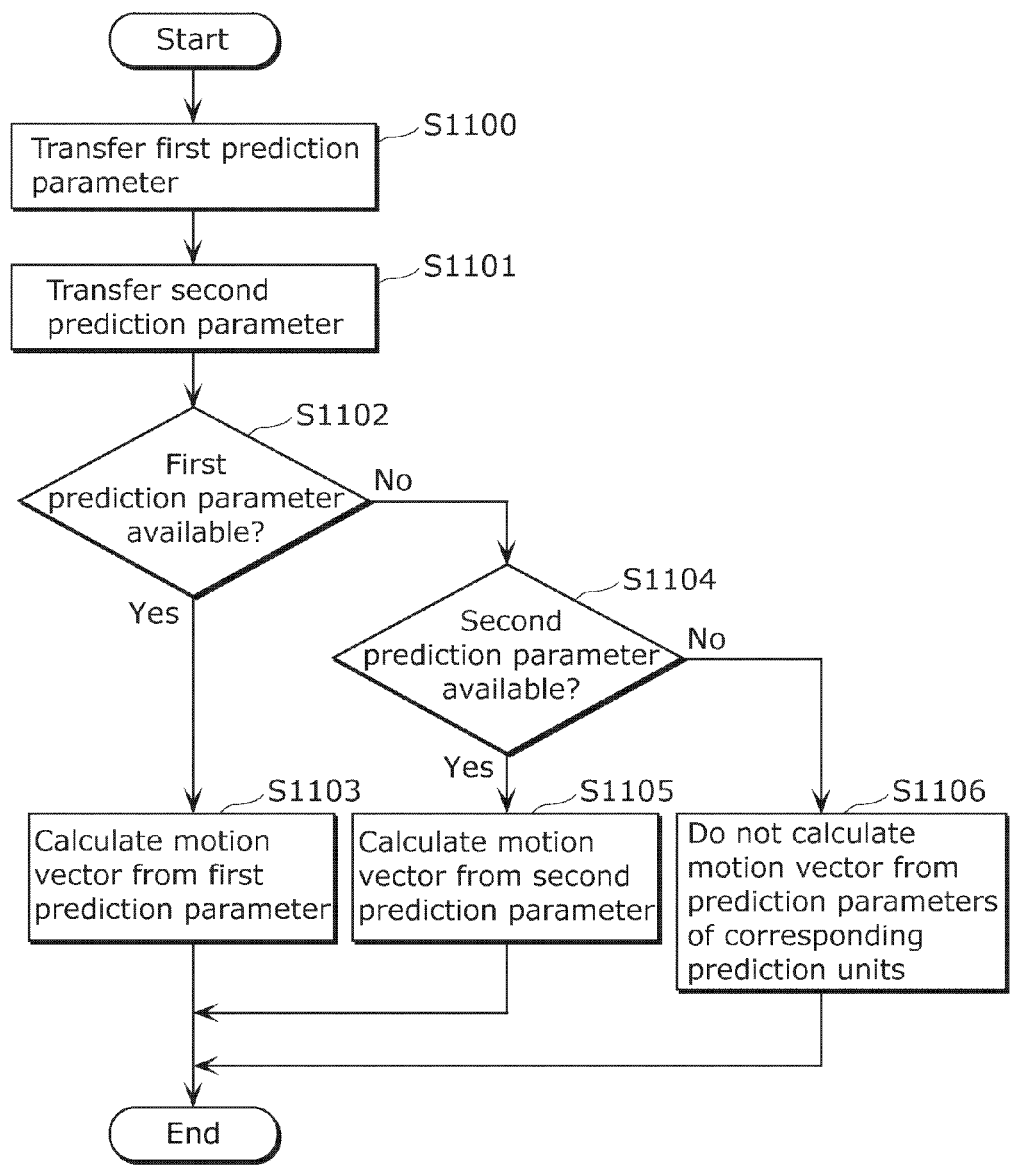
FIG. 10 is a flowchart of motion vector calculation according to Embodiment 1.

FIG. 10 is a flowchart of motion vector calculation according to this embodiment. FIG. 10 shows that the motion vector calculating unit 511 calculates a motion vector for a current prediction unit using a motion vector of a corresponding prediction unit.

First, the motion vector calculating unit 511 calculates the position of a first corresponding prediction unit based on the coordinates and size of the current prediction unit. The DMA control unit 512 transfers, based on the position of the first corresponding prediction unit, the first prediction parameter that is a prediction parameter of the first corresponding prediction unit from the frame memory 502 to the motion vector storing unit 515 (S1100). In this way, the motion vector calculating unit 511 can obtain the first prediction parameter.

Likewise, the motion vector calculating unit 511 calculates the position of a second corresponding prediction unit based on the coordinates and size of the current prediction unit. The DMA control unit 512 transfers, based on the position of the second corresponding prediction unit, the second prediction parameter that is a prediction parameter of the second corresponding prediction unit from the frame memory 502 to the motion vector storing unit 515 (S1101). In this way, the motion vector calculating unit 511 can obtain the second prediction parameter.

Next, the motion vector calculating unit 511 determines whether or not the first prediction parameter transferred to the motion vector storing unit 515 is available (S1102). For example, the motion vector calculating unit 511 determines whether or not the prediction mode specified by the first prediction parameter is inter prediction, and thereby determines whether or not the first prediction parameter is available.

When the first prediction parameter is available (Yes in S1102), the motion vector calculating unit 511 calculates a motion vector using the first prediction parameter (S1103).

When the first prediction parameter is not available (No in S1102), the motion vector calculating unit 511 determines whether or not the second prediction parameter transferred to the motion vector storing unit 515 is available (S1104). For example, the motion vector calculating unit 511 determines whether or not the prediction mode specified by the second prediction parameter is inter prediction, and thereby determines whether or not the second prediction parameter is available.

When the second prediction parameter is available (Yes in S1104), the motion vector calculating unit 511 calculates a motion vector using the second prediction parameter (S1105). When the second prediction parameter is not available (No in S1104), the motion vector calculating unit 511 does not calculate any motion vector from the prediction parameters of the corresponding prediction units (S1106).

Figure 11:
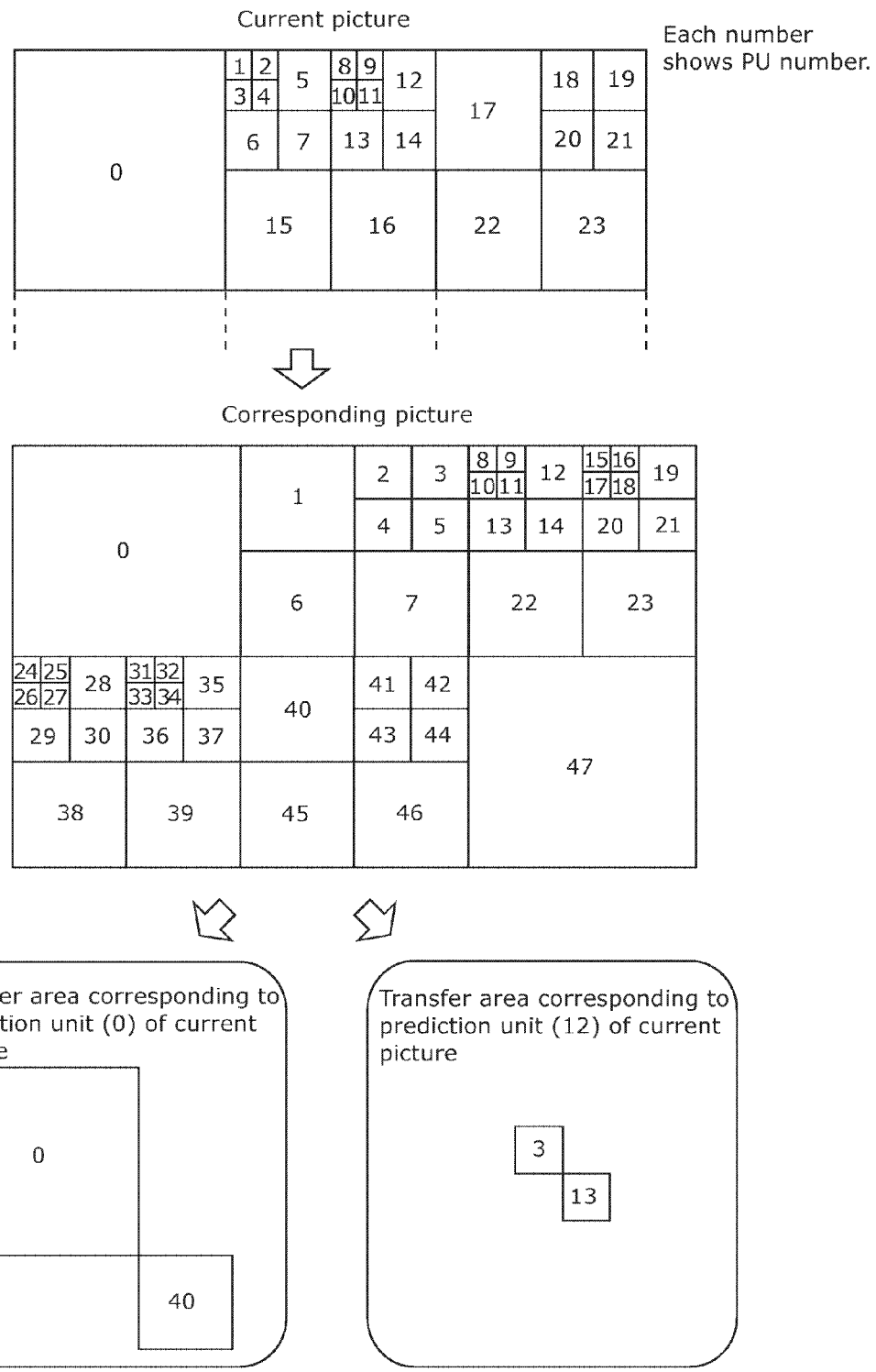
FIG. 11 is a diagram showing an example of a transfer area according to Embodiment 1.

FIG. 11 is a diagram showing examples of transfer areas whose prediction parameters are transferred through the processing shown in FIG. 10. The uppermost illustration of FIG. 11 shows a plurality of prediction units 0 to 23 included in a current picture. The center illustration of FIG. 11 shows a plurality of prediction units 0 to 47 included in a corresponding picture.

In this example, the first corresponding prediction unit corresponding to the prediction unit 0 of the current picture is the prediction unit 40 of the corresponding picture. In addition, the second corresponding prediction unit corresponding to the prediction unit 0 of the current picture is the prediction unit 0 of the corresponding picture. However, when the prediction unit 0 of the current picture is predicted, the prediction parameter of the prediction unit 40 of the corresponding picture and the prediction parameter of the prediction unit 0 of the corresponding picture are transferred collectively.

In addition, the first corresponding prediction unit corresponding to the prediction unit 12 of the current picture is the prediction unit 13 of the corresponding picture. In addition, the second corresponding prediction unit corresponding to the prediction unit 12 of the current picture is the prediction unit 3 of the corresponding picture. However, when the prediction unit 12 of the current picture is predicted, the prediction parameter of the prediction unit 13 of the corresponding picture and the prediction parameter of the prediction unit 3 of the corresponding picture are transferred collectively.

Through these processes, the image processing apparatus speculatively transfers the second prediction parameter irrespective of whether or not the first prediction parameter is available. In this way, the number of times of access to the frame memory 502 is reduced. This reduces processing delay due to memory access latency.

Figure 12:
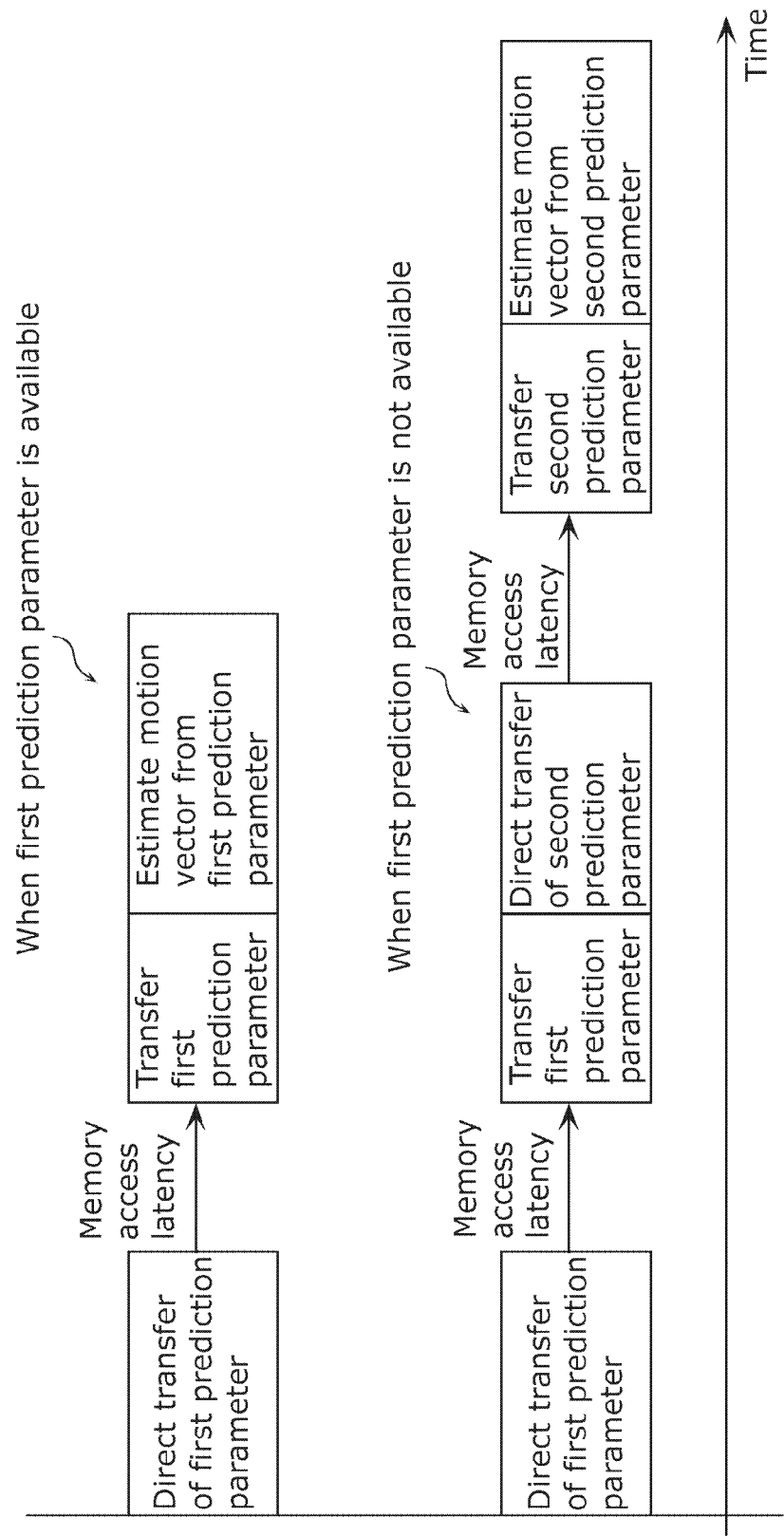
FIG. 12 is a diagram showing temporal sequences of motion vector calculations performed without using the technique according to Embodiment 1.

FIG. 12 shows an example case where no prediction parameter is speculatively obtained. In the case of the uppermost illustration of FIG. 12, the first prediction parameter is available, and thus the number of times of access to the frame memory 502 is not increased. However, in the lowermost illustration of FIG. 12, the first prediction parameter is not available, and thus the second prediction parameter needs to be transferred according to a separate direction. Accordingly, the number of times of access to the frame memory 502 is increased.

Figure 13:
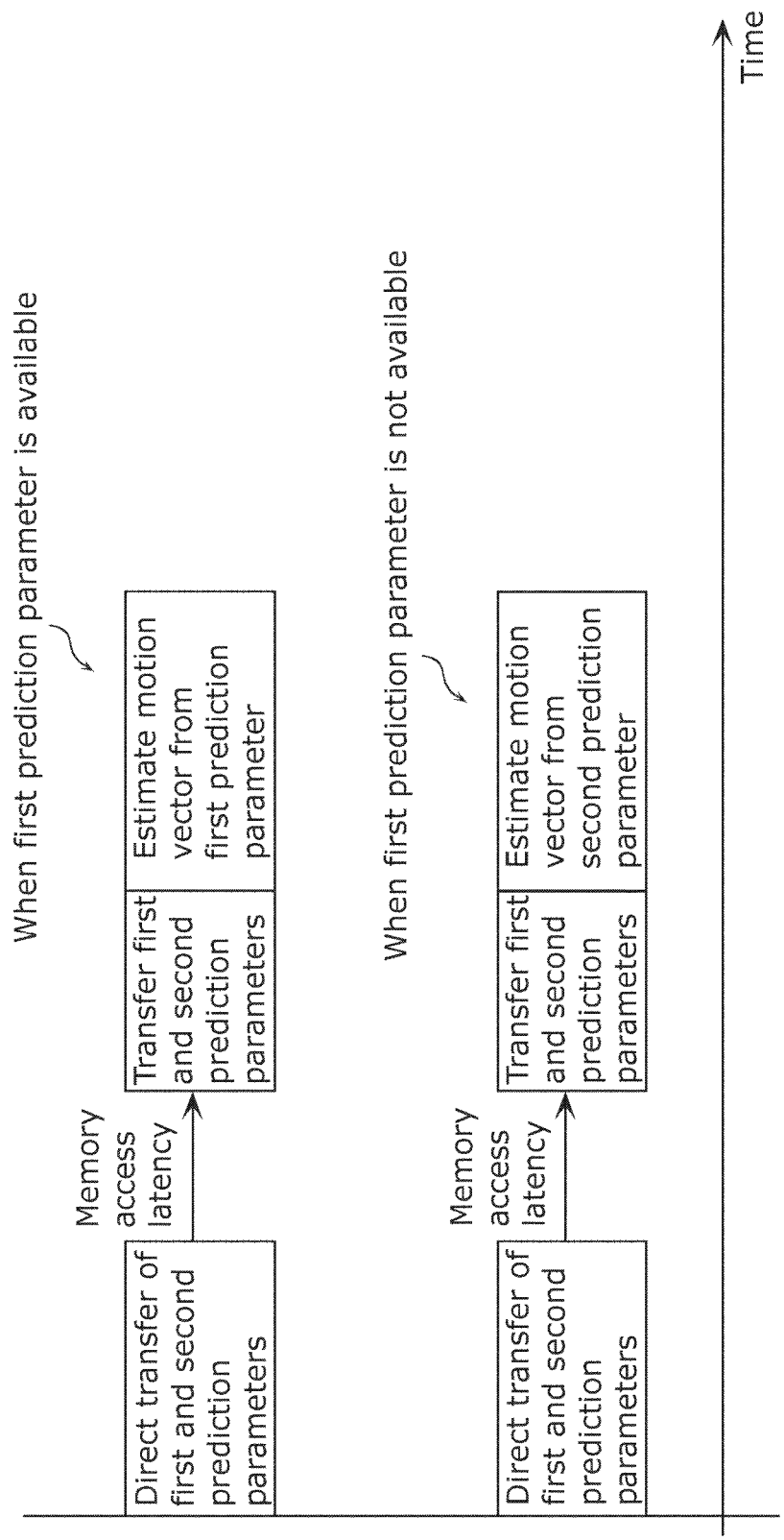
FIG. 13 is a diagram showing temporal sequences of motion vector calculations performed using the technique according to Embodiment 1.

FIG. 13 shows an example case where no prediction parameter is speculatively obtained. In FIG. 13, the first prediction parameter and the second prediction parameter are transferred collectively according to a one-time direction. In the uppermost illustration of FIG. 13, the first prediction parameter is available. Thus, the first prediction parameter is used among the transferred first and second prediction parameters. In this case, the number of times of access to the frame memory 502 is not increased.

In addition, in the lowermost illustration of FIG. 13, the first prediction parameter is not available. Thus, the second prediction parameter is used among the transferred first and second prediction parameters. In this case, the number of times of access to the frame memory 502 is not increased.

As shown in FIG. 13, when the prediction parameters are speculatively obtained, the number of times of access to the frame memory 502 is reduced. For this reason, the amount of delay time due to memory access latency is small. Compared to the case of the lowermost illustration of FIG. 12, the time required for motion vector calculation is reduced.

It is to be noted that the amount of data to be transferred at one time in the example of FIG. 13 is larger than the amount in the example of FIG. 12. Accordingly, it is estimated that the time for transfer of the data is not decreased. However, the reduction in the number of transfers leads to reduction in the total transfer time including overhead involved in transfer directions. The reduction in the number of transfers is especially effective for the reduction in the time for transfer of prediction parameters having comparatively small amount of data.

(1-4 Advantageous Effects)

In this way, the image processing apparatus according to this embodiment calculates the motion vector for the current prediction unit included in the current picture, with reference to the plurality of prediction parameters corresponding to the plurality of corresponding prediction units included in the corresponding pictures. At this time, the plurality of prediction parameters are speculatively transferred. In this way, the number of times of access to the memory is reduced, and the whole decoding processing is accelerated.

(1-5 Notes)

It is to be noted that, in this embodiment, the number of prediction parameters referred to in motion vector calculation is two. However, the number of prediction parameters referred to in the motion vector calculation may be three or more.

In addition, in this embodiment, the position of the first corresponding prediction unit in the corresponding picture corresponds to the position in a lower right direction with respect to the current prediction unit. In addition, the position of the second corresponding prediction unit in the corresponding picture corresponds in position to the current prediction unit. However, the position of each corresponding prediction unit does not always need to be the position. The position of the corresponding prediction unit may be any other position, and may be, for example, a position in a lower left direction with respect to the current prediction unit, a position below the current prediction unit, or the like.

In addition, each of the structural elements may be partly or fully configured in the form of an exclusive hardware circuit, or may be realized by means of a program being executed by a processor.

In this embodiment, each of the frame memory 502, the motion vector storing unit 515, the reference image storing unit 513, and the predictive image storing unit 514 is shown as a memory or a storing unit. Each of these may be configured as any data recording device, for example, as a memory, a flip-flop, or a register. Furthermore, a part of the memory area in a processor, or a part of a cache memory may be used as any one of the frame memory 502, the motion vector storing unit 515, the reference image storing unit 513, and the predictive image storing unit 514.

In addition, in this embodiment, the image processing apparatus is an image decoding apparatus. However, the image processing apparatus is not limited to the image decoding apparatus. An image coding apparatus which executes processing according to a procedure inverse to the decoding is also capable of transferring prediction parameters.

In addition, in this embodiment, motion compensation is described as an example. However, even in the case of intra prediction, the image processing apparatus can also provide similar advantageous effects by executing similar processing. It is to be noted that, in this case, an intra prediction mode may be used instead of a motion vector. Other information used in predictive image generation may naturally be used. In this case, a spatially different picture such as a picture having a different view point may be used as a corresponding picture. Another picture may also be used as a corresponding picture.

The sizes and shapes of the coding units, prediction units, and transform units shown in this embodiment are examples. Thus, these sizes and shapes may be replaced by other possible sizes and shapes.

[Embodiment 2]

(2-1 Outline)

First, the outline of an image processing apparatus according to this embodiment is described. The image processing apparatus according to this embodiment calculates a motion vector for a current prediction unit with reference to a prediction parameter of a corresponding prediction unit. At this time, the image processing apparatus speculatively obtains the plurality of prediction parameters including prediction parameters each do not have a possibility of being used to generate a predictive image for the current prediction unit. This reduces the number of times of memory access for obtaining the prediction parameters of the corresponding prediction units. Accordingly, the whole decoding is accelerated.

In addition, the image processing apparatus speculatively obtains a larger number of prediction parameters than in Embodiment 1. For this reason, the number of times of memory access is further reduced. Accordingly, decoding is accelerated more significantly than in Embodiment 1.

Figure 14:
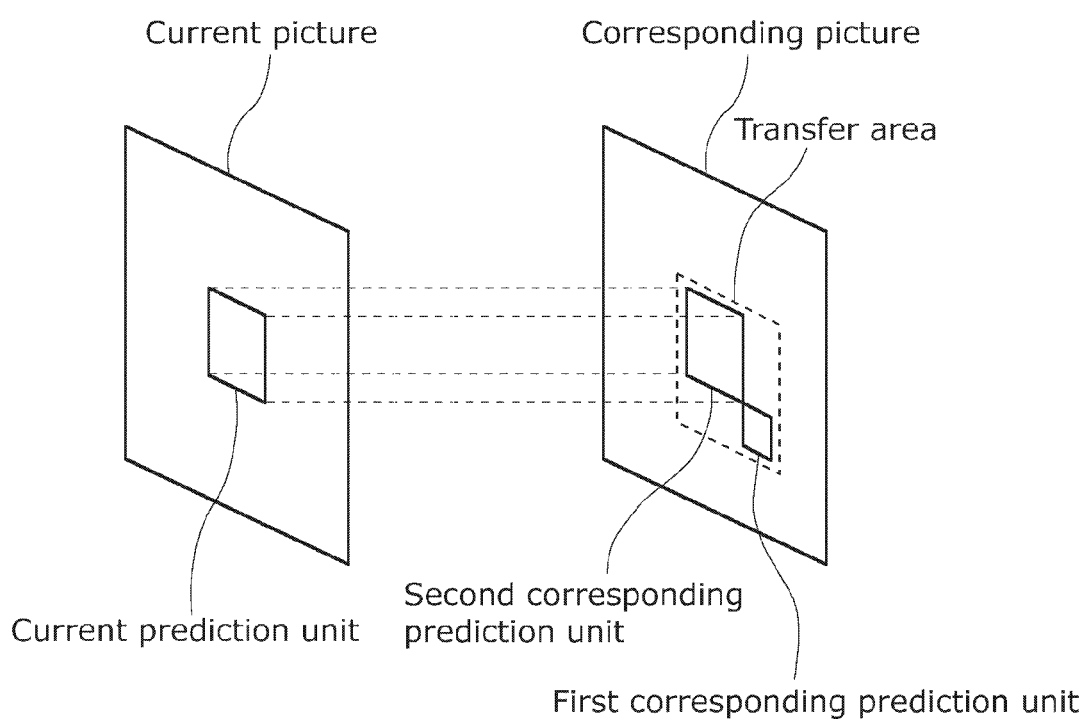
FIG. 14 is a diagram showing an example of a transfer area according to Embodiment 2.

FIG. 14 shows a transfer area whose prediction parameters are to be transferred by the image processing apparatus according to this embodiment. In this embodiment, the transfer area includes the first corresponding prediction unit and the second corresponding prediction unit. Furthermore, other areas are also included in the transfer area. In other words, other prediction parameters are also collectively transferred, in addition to the first prediction parameter of the first corresponding unit and the second prediction parameter of the second corresponding unit.

(2-2 Structure)

FIG. 1 is a structural diagram of the image processing apparatus according to this embodiment. FIG. 2 is a structural diagram of a motion compensating unit 506 and neighboring units according to this embodiment. The image processing apparatus according to this embodiment is configured to have the same structure as in Embodiment 1, and thus the same descriptions are not repeated.

(2-3 Operations)

In this embodiment, bitstreams having the structures shown in FIG. 3A and FIG. 5B are used as in Embodiment 1. The flow of operations by the image processing apparatus according to this embodiment are similar to the flow of the operations in Embodiment 1 shown in FIG. 8 and FIG. 9, and thus the similar descriptions are not repeated.

Figure 15:
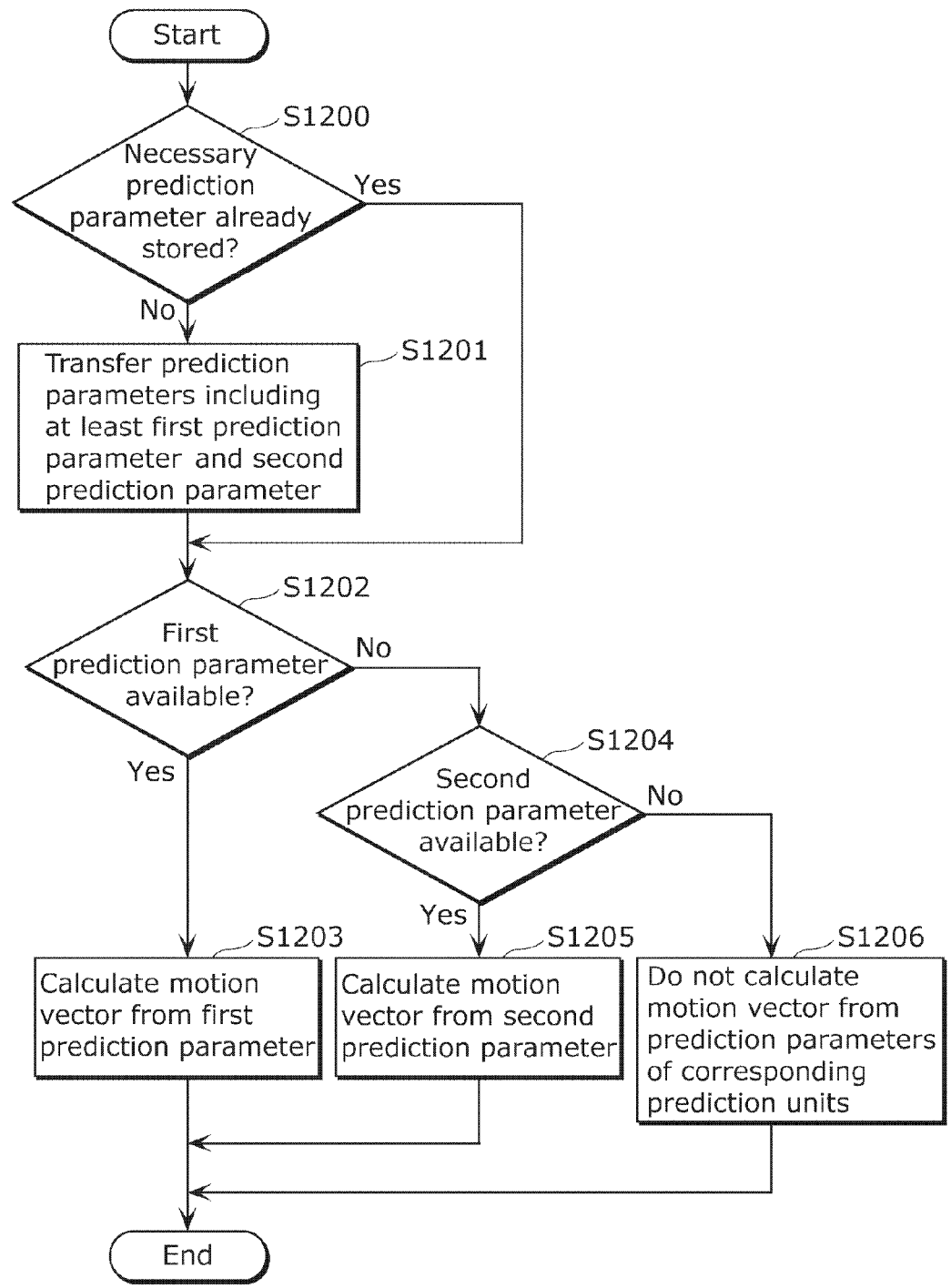
FIG. 15 is a flowchart of motion vector calculation according to Embodiment 2.

FIG. 15 is a flowchart of operations by a motion vector calculating unit 511 according to this embodiment. Hereinafter, operations by the motion vector calculating unit 511 according to this embodiment are described with reference to FIG. 15.

First, the motion vector calculating unit 511 calculates the position of a first corresponding prediction unit based on the coordinates and size of the current prediction unit. Likewise, the motion vector calculating unit 511 calculates the position of a second corresponding prediction unit. The motion vector calculating unit 511 determines whether or not a motion vector storing unit 515 stores the first and second prediction parameters (S1200).

When the motion vector storing unit 515 does not store any necessary prediction parameter (No in S1200), the motion vector calculating unit 511 obtains two or more prediction parameters including at least the first and second prediction parameters. At this time, a DMA control unit 512 transfers the two or more prediction parameters from a frame memory 502 to the motion vector storing unit 515 (S1201). When the motion vector storing unit 515 already stored the necessary prediction parameter (Yes in S1200), no such transfer process (S1201) is performed.

It is to be noted that the motion vector calculating unit 511 may transfer two or more prediction parameters other than the prediction parameters stored in the motion vector storing unit 515. For example, when the motion vector storing unit 515 stores the second prediction parameter, the motion vector calculating unit 511 may transfer two or more prediction parameters including the first prediction parameter.

Next, the motion vector calculating unit 511 determines whether or not the first parameter in the motion vector storing unit 515 shows intra prediction, and thereby determines whether or not the first prediction parameter is available (S1202). When the first prediction parameter is available (Yes in S1202), the motion vector calculating unit 511 calculates a motion vector using the first prediction parameter (S1203).

When the first prediction parameter is not available (No in S1202), the motion vector calculating unit 511 determines whether or not the second prediction parameter in the motion vector storing unit 515 indicates intra prediction, and thereby determines whether or not the second prediction parameter is available (S1204). When the second prediction parameter is available (Yes in S1204), the motion vector calculating unit 511 calculates a motion vector using the second prediction parameter (S1205).

When the second prediction parameter is not available (No in S1204), the motion vector calculating unit 511 does not calculate any motion vector from the prediction parameters of the corresponding prediction units (S1206).

By performing the aforementioned processes, the motion vector calculating unit 511 obtains the second prediction parameter irrespective of whether or not the first prediction parameter is speculatively available. Furthermore, the motion vector calculating unit 511 also obtains speculatively the aforementioned other prediction parameters. In this way, the number of times of access to the frame memory 502 is reduced. In addition, the processing delay due to memory access latency is reduced.

Figure 16:
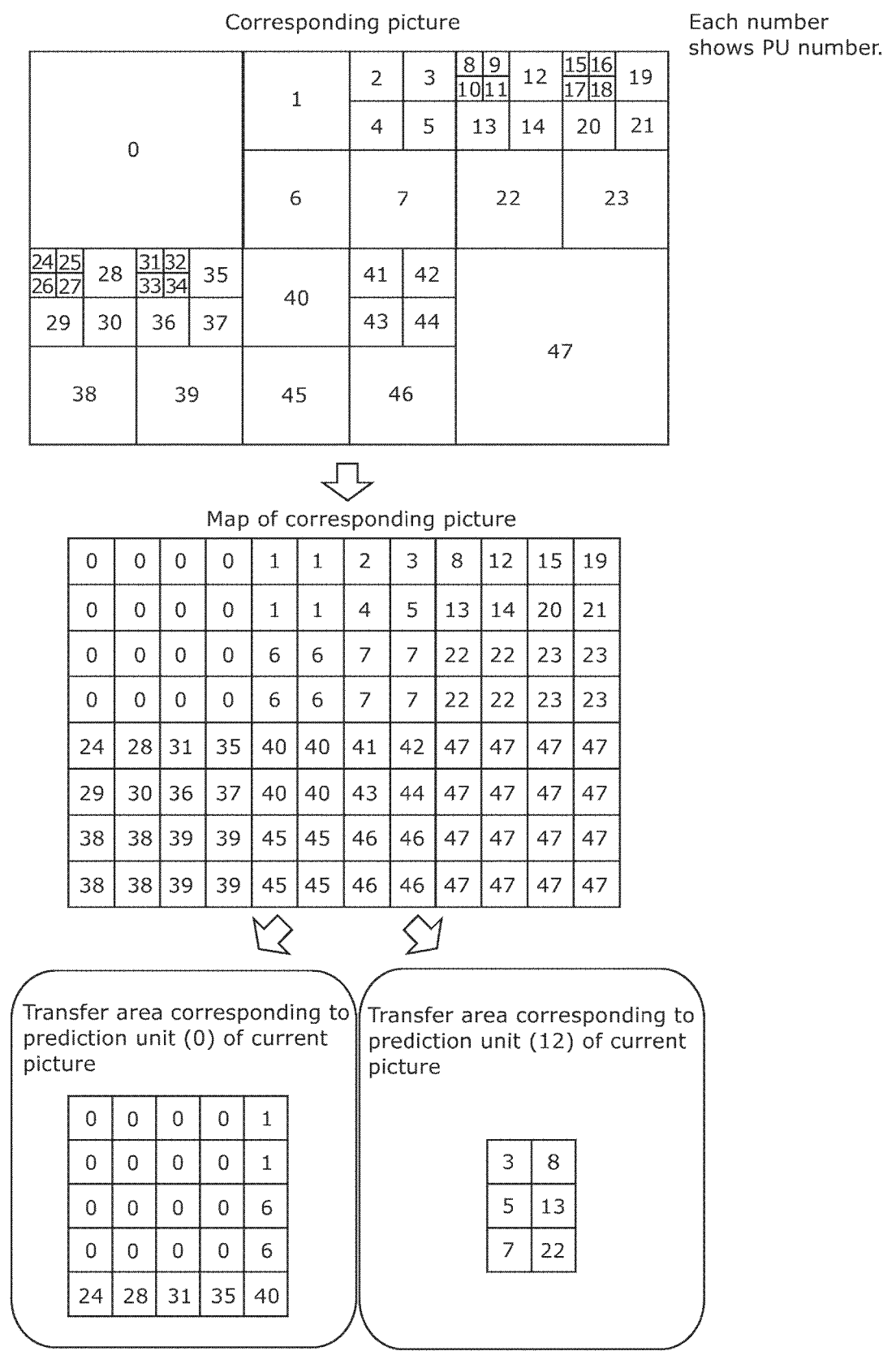

FIG. 16 shows transfer areas whose prediction parameters are speculatively transferred in this embodiment. Although not shown in FIG. 16, a plurality of prediction units in a current picture have a structure similar to those in FIG. 11. In addition, a plurality of prediction units in a corresponding picture in FIG. 16 are similar to those in FIG. 11.

The map of the corresponding picture shown in FIG. 16 shows a correspondence between the coordinate positions and prediction units (the prediction parameters thereof). For example, in the frame memory 502, the coordinate positions and the prediction units (the prediction parameters thereof) are associated with each other as in the map of the corresponding picture.

When the image processing apparatus processes a prediction unit 12 (see FIG. 11) in the current picture, it transfers, as the first prediction parameter, the prediction parameter of a prediction unit 13 of the corresponding picture. In addition, at this time, the image processing apparatus transfers, as the second prediction parameter, the prediction parameter of a prediction unit 3 of the corresponding picture speculatively all together.

Furthermore, the image processing apparatus also transfers the prediction parameters (see FIG. 16) of the prediction units 5, 7, 8, and 22 of the corresponding picture speculatively all together. In this way, as the first prediction parameter and the second prediction parameter both required to calculate the motion vector of a prediction unit 14 of the current picture, the prediction parameter of the prediction unit 22 of the corresponding picture and the prediction parameter of the prediction unit 5 of the corresponding picture are also transferred collectively.

Accordingly, the number of times of access to the frame memory 502 is increased. In this way, the delay time due to memory access latency is reduced. Accordingly, the time required for motion vector calculation is reduced.

(2-4 Advantageous Effects)

In this way, when the image processing apparatus calculates a motion vector using a prediction parameter of a corresponding prediction unit, it speculatively transfers a plurality of prediction parameters including prediction parameters each not having a possibility of being used for predictive image generation for a current prediction unit. In this way, the number of times of access to the memory is reduced, and the whole decoding processing is accelerated.

(2-5 Notes)

It is to be noted that, in this embodiment, the number of prediction parameters referred to in motion vector calculation is two. However, the number of prediction parameters referred to in the motion vector calculation may be three or more.

In addition, in this embodiment, the position of the first corresponding prediction unit in the corresponding picture corresponds to the lower right position with respect to the current prediction unit. In addition, the position of the second corresponding prediction unit in the corresponding picture corresponds in position to the current prediction unit. However, the position of each corresponding prediction unit does not always need to be such a position. The position of the corresponding prediction unit may be any other position, and may be, for example, a lower left position with respect to the current prediction unit, or a position below the current prediction unit.

In addition, each of the structural elements may be partly or fully configured in the form of an exclusive hardware circuit, or may be realized by means of a program being executed by a processor.

In this embodiment, each of the frame memory 502, the motion vector storing unit 515, a reference image storing unit 513 and a predictive image storing unit 514 is indicated as a memory or a storing unit. Each of these may be configured as any data recording device, for example, as a memory, a flip-flop, or a register. Furthermore, a part of the memory area in a processor, or a part of a cache memory may be used as any one of the frame memory 502, the motion vector storing unit 515, the reference image storing unit 513, and the predictive image storing unit 514.

In addition, in this embodiment, the image processing apparatus is an image decoding apparatus. However, the image processing apparatus is not limited to the image decoding apparatus. An image coding apparatus which executes processing according to a procedure inverse to the decoding is also capable of transferring prediction parameters.

In this embodiment, motion compensation is described as an example. In the case of intra prediction, the image processing apparatus can also provide similar advantageous effects by executing similar processing. It is to be noted that, in this case, an intra prediction mode may be used instead of a motion vector. Other information used in predictive image generation may naturally be used. In this case, a spatially different picture such as a picture having a different view point may be used as a corresponding picture. Another picture may also be used as a corresponding picture.

The sizes and shapes of the coding units, prediction units, and transform units shown in this embodiment are examples. Thus, these sizes and shapes may be replaced by other possible sizes and shapes.

[Embodiment 3]

(3-1 Outline)

First, the outline of an image processing apparatus according to this embodiment is described. The image processing apparatus according to this embodiment calculates a motion vector for a current prediction unit with reference to a prediction parameter of a corresponding prediction unit. At this time, the image processing apparatus obtains all the prediction parameters needed for predictive image generation for all the prediction units included in a largest coding unit including the current prediction unit. This reduces the number of times of memory access for obtaining the prediction parameters of the corresponding prediction units. Accordingly, the whole decoding is accelerated.

In addition, the image processing apparatus speculatively obtains a larger number of prediction parameters than in Embodiment 1. For this reason, the number of times of memory access is further reduced. Accordingly, decoding is accelerated more significantly than in Embodiment 1.

Figure 17:
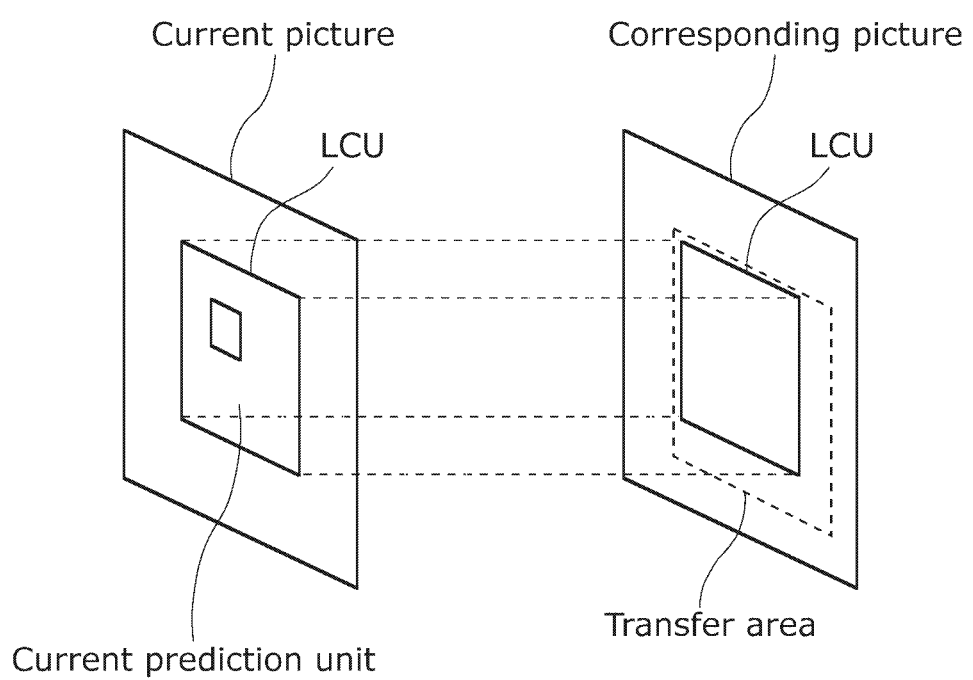
FIG. 17 is a diagram showing an example of a transfer area according to Embodiment 3.

FIG. 17 shows a transfer area whose prediction parameters are to be transferred by the image processing apparatus according to this embodiment. In this embodiment, a transfer area includes a first corresponding prediction unit and a second corresponding prediction unit. Furthermore, the remaining area in the largest coding unit are also included in the transfer area. In other words, the other prediction parameters corresponding to the largest coding unit are also collectively transferred, in addition to the first prediction parameter of the first corresponding unit and the second prediction parameter of the second corresponding unit.

(3-2 Structure)

FIG. 1 is a structural diagram of the image processing apparatus according to this embodiment. FIG. 2 is a structural diagram of a motion compensating unit 506 and neighboring units according to this embodiment. The image processing apparatus according to this embodiment is configured to have the same structure as in Embodiment 1, and thus the same descriptions are not repeated.

(3-3 Operations)

In this embodiment, bitstreams having the structures shown in FIG. 3A and FIG. 5B are used as in Embodiments 1 and 2. The flow of operations by the image processing apparatus according to this embodiment are similar to the flow of operations in Embodiment 1 shown in FIG. 8 and FIG. 9, and thus the similar descriptions are not repeated.

Figure 18:
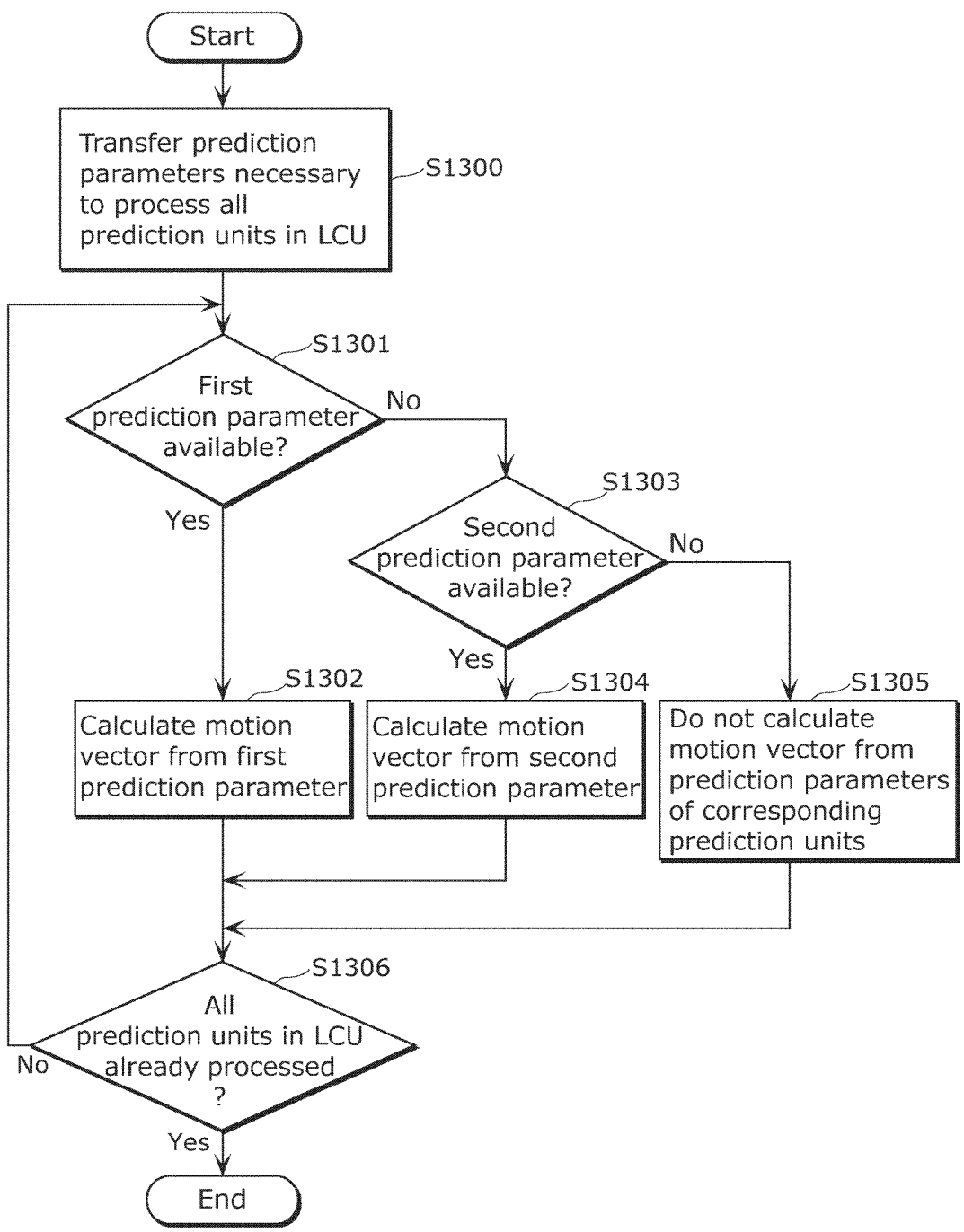
FIG. 18 is a flowchart of motion vector calculation according to Embodiment 3.

FIG. 18 is a flowchart of operations by a motion vector calculating unit 511 according to this embodiment. Hereinafter, operations by the motion vector calculating unit 511 according to this embodiment are described with reference to FIG. 18.

First, the motion vector calculating unit 511 calculates, for each of the prediction units included in the largest coding unit, the positions of the first and second corresponding prediction units, based on the coordinates and size of the largest coding unit including the current prediction unit. A DMA control unit 512 transfers all the first and second prediction parameters corresponding to all the prediction units included in the largest coding unit from a frame memory 502 to a motion vector storing unit 515 (S1300).

Next, the motion vector calculating unit 511 determines, for the current prediction unit, whether or not the first parameter in the motion vector storing unit 515 shows intra prediction, and thereby determines whether or not the first prediction parameter is available (S1301). When the second prediction parameter is available (Yes in S1301), the motion vector calculating unit 511 calculates a motion vector using the first prediction parameter (S1302).

When the second prediction parameter is not available (No in S1301), the motion vector calculating unit 511 determines whether or not the second prediction parameter in the motion vector storing unit 515 indicates intra prediction, and thereby determines whether or not the second prediction parameter is available (S1303). When the second prediction parameter is available (Yes in S1303), the motion vector calculating unit 511 calculates a motion vector using the second prediction parameter (S1304).

When the second prediction parameter is not available (No in S1303), the motion vector calculating unit 511 does not calculate any motion vector from the prediction parameters of the corresponding prediction units (S1305).

After the motion vector calculating unit 511 finishes the aforementioned series of processes (S1301 to S1305), it determines whether or not all the prediction units included in the largest coding unit including the current prediction unit are already processed (S1306).

Next, when the motion vector calculating unit 511 does not yet finish processing all the prediction units (No in S1306), the series of processes (S1301 to S1305) are performed again. When the motion vector calculating unit 511 already finished processing all the prediction units (Yes in S1306), it ends the motion vector calculation for all the prediction units included in the largest coding unit.

By performing the aforementioned processes, the motion vector calculating unit 511 speculatively obtains all the prediction parameters each having a possibility of being used for predictive image generation for all the prediction units included in the largest coding unit including the current prediction unit. In this way, the number of times of access to the frame memory 502 is reduced. In addition, the processing delay due to memory access latency is reduced.

FIG. 19 shows transfer areas whose prediction parameters are transferred speculatively. It is to be noted that a plurality of prediction units in a current picture have a structure similar to those in FIG. 11. In FIG. 19, each of the bold frames shows a largest coding unit. Although not shown in FIG. 19, a plurality of prediction units in a corresponding picture have a structure similar to those in FIG. 16. For example, as in FIG. 16, the coordinate positions and the prediction units (the prediction parameters thereof) are associated with each other as in the map of the corresponding picture.

The image processing apparatus according to this embodiment transfers all the prediction parameters each having a possibility of being used for predictive image generation for the prediction units included in the largest coding unit including the current prediction unit. As shown in FIG. 19, in the case of processing the prediction unit 1 of the current picture, the image processing apparatus speculatively transfers prediction parameters corresponding to the prediction units 1 to 8, 13, 22, 40 to 42, and 47 of the corresponding picture.

In this way, all the prediction parameters each having a possibility of being referred to in motion vector calculation for the prediction units 1 to 16 included in the largest coding unit including the prediction unit 1 of the current picture are stored in the motion vector storing unit 515. Accordingly, the number of times of access to the frame memory 502 is increased. In this way, the delay time due to memory access latency is reduced. Accordingly, the time required for motion vector calculation is reduced.

(3-4 Advantageous Effects)

In this way, when the image processing apparatus calculates a motion vector using a prediction parameter of a corresponding prediction unit, it speculatively transfers all the prediction parameters each having a possibility of being used in reference image generation for the prediction units included in a largest coding unit including a current prediction unit. In this way, the number of times of access to the memory is reduced, and the whole decoding processing is accelerated.

(3-5 Notes)

It is to be noted that, in this embodiment, the number of prediction parameters referred to in motion vector calculation is two. However, the number of prediction parameters referred to in motion vector calculation may be three or more.

In addition, in this embodiment, the position of the first corresponding prediction unit in the corresponding picture corresponds to a lower right position with respect to the current prediction unit. In addition, the position of the second corresponding prediction unit in the corresponding picture corresponds in position to the current prediction unit. However, the position of each corresponding prediction unit does not always need to be such a position. The position of the corresponding prediction unit may be any other position, and may be, for example, a lower left position with respect to the current prediction unit, or a position below the current prediction unit.

In addition, each of the structural elements may be partly or fully configured in the form of an exclusive hardware circuit, or may be realized by means of a program being executed by a processor.

In this embodiment, each of the frame memory 502, the motion vector storing unit 515, a reference image storing unit 513 and a predictive image storing unit 514 is indicated as a memory or a storing unit. Each of these may be configured as any data recording device, for example, as a memory, a flip-flop, or a register. Furthermore, a part of the memory area in a processor, or a part of a cache memory may be used as any one of the frame memory 502, the motion vector storing unit 515, the reference image storing unit 513, and the predictive image storing unit 514.

In addition, in this embodiment, the image processing apparatus is an image decoding apparatus. However, the image processing apparatus is not limited to the image decoding apparatus. An image coding apparatus which executes processing according to a procedure inverse to the decoding is also capable of transferring prediction parameters.

In this embodiment, motion compensation is described as an example. In the case of intra prediction, the image processing apparatus can also provide similar advantageous effects by executing similar processing. It is to be noted that, in this case, an intra prediction mode may be used instead of a motion vector. Other information used in predictive image generation may naturally be used. In this case, a spatially different picture such as a picture having a different view point may be used as a corresponding picture. Another picture may also be used as a corresponding picture.

The sizes and shapes of the coding units, prediction units, and transform units shown in this embodiment are examples. Thus, these sizes and shapes may be replaced by other possible sizes and shapes.

[Embodiment 4]

(4-1 Outline)

First, the outline of an image processing apparatus according to this embodiment is described. The image processing apparatus according to this embodiment calculates a motion vector for a current prediction unit with reference to a prediction parameter of a corresponding prediction unit. At this time, the image processing apparatus collectively transfers (stores) a plurality of prediction parameters used in predictive image generation for a plurality of prediction units spatially adjacent to each other. In this way, the number of times of memory access is reduced. Accordingly, the whole decoding is accelerated.

In Embodiment 4, the number of times of memory access in the case where prediction parameters are stored is reduced, unlike the cases in Embodiments 1, 2, and 3. In this way, the whole decoding is accelerated. In addition, the image processing apparatus stores the prediction parameters corresponding to prediction units spatially adjacent to each other in consecutive addresses. In this way, the image processing apparatus is capable of obtaining prediction parameters without using information related to a corresponding processing order. Accordingly, the amount of calculation for referring to the prediction parameters is reduced.

Figure 20:
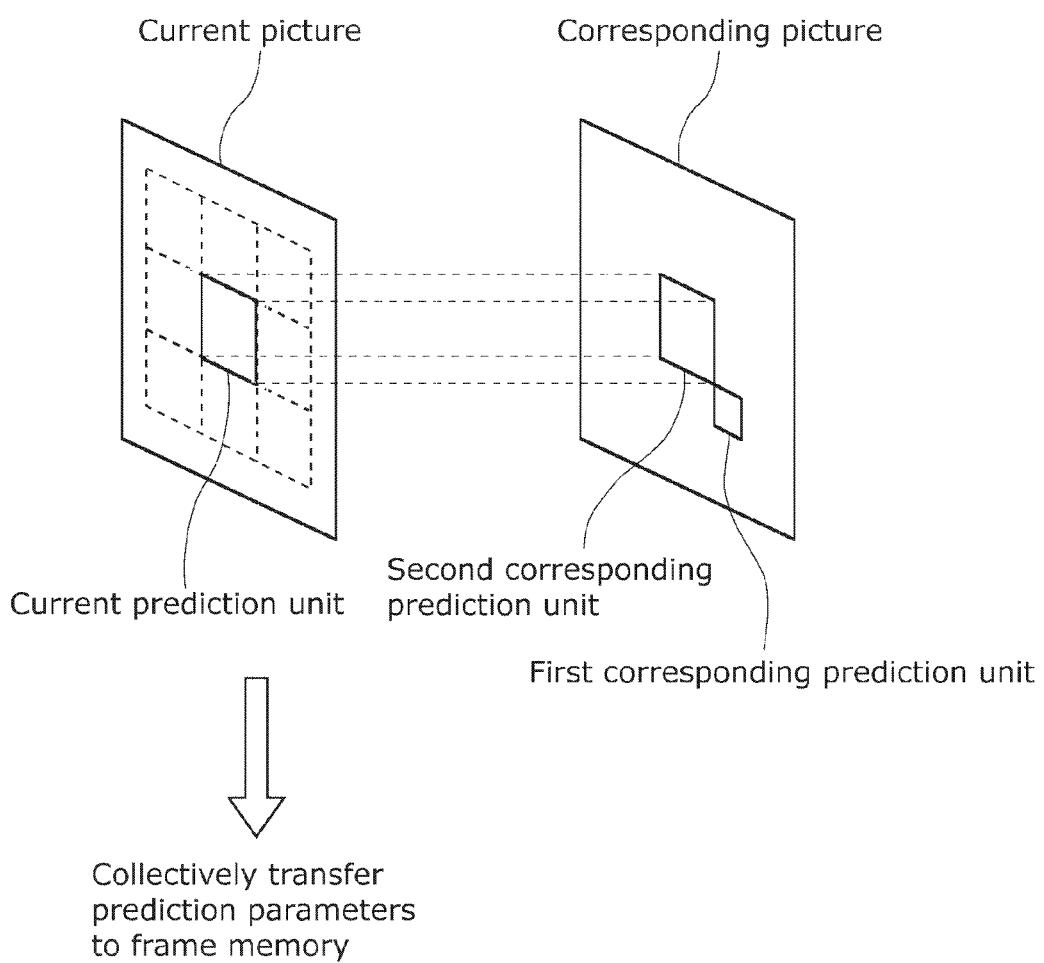
FIG. 20 is a conceptual diagram showing transfer of prediction parameters according to Embodiment 4.

FIG. 20 shows a transfer area whose prediction parameters are to be transferred by the image processing apparatus according to this embodiment. In this way, the prediction parameters used in predictive image generation for a current prediction unit are transferred to a frame memory. At this time, the image processing apparatus collectively transfers, to a frame memory, the prediction parameters used in the predictive image generation for the current prediction unit and prediction parameters used in predictive image generation for another prediction unit.

(4-2 Structure)

FIG. 1 is a structural diagram of the image processing apparatus according to this embodiment. FIG. 2 is a structural diagram of a motion compensating unit 506 and neighboring units according to this embodiment. The image processing apparatus according to this embodiment is configured to have the same structure as in Embodiment 1, and thus the same descriptions are not repeated.

(4-3 Operations)

In this embodiment, bitstreams having the structures shown in FIG. 3A and FIG. 5B are used as in Embodiments 1 and 2. The flow of operations by the image processing apparatus according to this embodiment are similar to the flow of operations in Embodiment 1 shown in FIG. 8 and FIG. 9, and thus the similar descriptions are not repeated.

Figure 21:
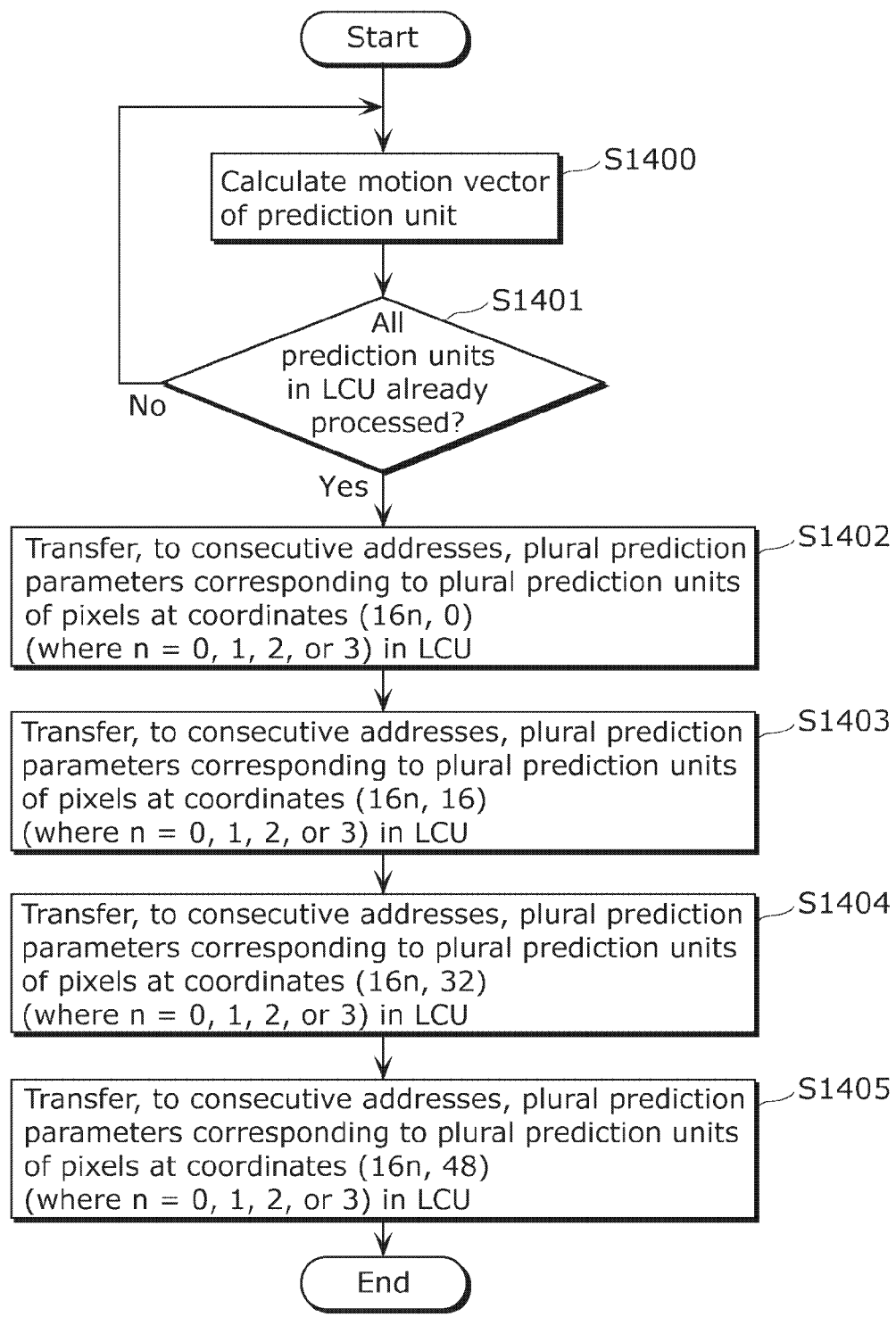
FIG. 21 is a flowchart of motion vector calculation according to Embodiment 4.

FIG. 21 is a flowchart of operations by a motion vector calculating unit 511 according to this embodiment. The motion vector calculating unit 511 according to this embodiment calculates a motion vector and stores the calculated motion vector onto a frame memory 502. At this time, more specifically, the motion vector calculating unit 511 stores prediction parameters including the calculated motion vector onto a motion vector storing unit 515. Under control of a DMA control unit 512, the motion vector calculating unit 511 transfers the prediction parameters from the motion vector storing unit 515 to a frame memory 502.

Hereinafter, operations by the motion vector calculating unit 511 according to this embodiment are described with reference to FIG. 21. Here, it is assumed that the size of the largest coding unit is 64×64 pixels defined by coordinates (0, 0) and coordinates (63, 63).

First, the motion vector calculating unit 511 calculates a motion vector for a current prediction unit (S1400). Next, the motion vector calculating unit 511 determines whether or not a motion vector is already calculated for each of all the prediction units included in the largest coding unit (S1401). When the calculation of motion vectors for all the prediction units in the largest coding unit is not yet completed (No in S1401), the motion vector calculating unit 511 calculates a motion vector of each prediction unit for which no motion vector is yet calculated (S1400).

When the calculation of motion vectors for all the prediction units in the largest coding unit is already completed (Yes in S1401), the motion vector calculating unit 511 transfers all the prediction parameters corresponding to the largest coding unit (S1402 to S1405). At this time, under control of the DMA control unit 512, the motion vector calculating unit 511 transfers the prediction parameters as indicated below.

First, the DMA control unit 512 collectively transfers four prediction parameters corresponding to coordinates on the first line in the largest coding unit to consecutive addresses in the frame memory 502 (S1402). More specifically, the DMA control unit 512 transfers the prediction parameter of the prediction unit including the pixel at the coordinates (0, 0) in the largest coding unit, the prediction parameter of the prediction unit including the pixel at the coordinates (16, 0), the prediction parameter of the prediction unit including the pixel at the coordinates (32, 0), and the prediction parameter of the prediction unit including the pixel at the coordinates (48, 0).

Next, the DMA control unit 512 collectively transfers four prediction parameters corresponding to coordinates on the second line in the largest coding unit to consecutive addresses in the frame memory 502 (S1403). More specifically, the DMA control unit 512 transfers the prediction parameter of the prediction unit including the pixel at the coordinates (0, 16) in the largest coding unit, the prediction parameter of the prediction unit including the pixel at the coordinates (16, 16), the prediction parameter of the prediction unit including the pixel at the coordinates (32, 16), and the prediction parameter of the prediction unit including the pixel at the coordinates (48, 16).

Next, the DMA control unit 512 collectively transfers four prediction parameters corresponding to coordinates on the third line in the largest coding unit to consecutive addresses in the frame memory 502 (S1404). More specifically, the DMA control unit 512 transfers the prediction parameter of the prediction unit including the pixel at the coordinates (0, 32) in the largest coding unit, the prediction parameter of the prediction unit including the pixel at the coordinates (16, 32), the prediction parameter of the prediction unit including the pixel at the coordinates (32, 32), and the prediction parameter of the prediction unit including the pixel at the coordinates (48, 32).

Next, the DMA control unit 512 collectively transfers four prediction parameters corresponding to coordinates on the fourth line in the largest coding unit to consecutive addresses in the frame memory 502 (S1405). More specifically, the DMA control unit 512 transfers the prediction parameter of the prediction unit including the pixel at the coordinates (0, 48) in the largest coding unit, the prediction parameter of the prediction unit including the pixel at the coordinates (16, 48), the prediction parameter of the prediction unit including the pixel at the coordinates (32, 48), and the prediction parameter of the prediction unit, including the pixel at the coordinates (48, 48).

The DMA control unit 512 stores, for a next current largest coding unit, a plurality of prediction parameters corresponding to a plurality of coordinates arranged in the horizontal direction to consecutive addresses in the frame memory 502.

At this time, the DMA control unit 512 stores the plurality of prediction parameters of the next current largest coding unit in the frame memory 502, continuously in the horizontal direction of the immediately-before current largest coding unit. For example, the DMA control unit 512 transfers the plurality of prediction parameters so that that the four prediction parameters corresponding to the first line of the current largest coding unit are consecutive to the four prediction parameters corresponding to the first line of the immediately-before largest coding unit in the frame memory 502.

At this time, the image processing apparatus collectively stores the plurality of prediction parameters used in predictive image generation for the plurality of prediction units spatially adjacent to each other. In this way, the number of times of memory access is reduced in storage of the motion vectors of the prediction units. Accordingly, the whole decoding is accelerated.

In addition, the image processing apparatus stores the prediction parameters corresponding to prediction units spatially adjacent to each other in consecutive addresses of the frame memory 502. In this way, the image processing apparatus is capable of obtaining prediction parameters without using information related to a processing order of a corresponding picture.

Figure 22:
FIG. 22 is a diagram showing an example of transfer of prediction parameters according to Embodiment 4.

FIG. 22 is a diagram showing an example of storage of prediction parameters in this embodiment. FIG. 22 shows operations in the case where a corresponding picture similar to the one in FIG. 11 is processed as a current picture. In the example of FIG. 22, when a motion vector is calculated for a prediction unit 0 included in the first current largest coding unit in the corresponding picture to be processed as the current picture, it is determined that all the motion vectors corresponding to the first current largest coding unit are already calculated.

Next, the DMA control unit 512 transfers four prediction parameters corresponding to coordinates (0, 0), (16, 0), (32, 0), and (48, 0) in the largest coding unit to consecutive addresses in the frame memory 502. In the example of FIG. 22, these four prediction parameters are prediction parameters corresponding to the prediction unit 0.

Next, the DMA control unit 512 transfers four prediction parameters corresponding to coordinates (0, 16), (16, 16), (32, 16), and (48, 16) in the largest coding unit to consecutive addresses in the frame memory 502. In the example of FIG. 22, these four prediction parameters are prediction parameters corresponding to the prediction unit 0.

Next, the DMA control unit 512 transfers four prediction parameters corresponding to coordinates (0, 32), (16, 32), (32, 32), and (48, 32) in the largest coding unit to consecutive addresses in the frame memory 502. In the example of FIG. 22, these four prediction parameters are prediction parameters corresponding to the prediction unit 0.

Next, the DMA control unit 512 transfers four prediction parameters corresponding to coordinates (0, 48), (16, 48), (32, 48), and (48, 48) in the largest coding unit to consecutive addresses in the frame memory 502. In the example of FIG. 22, these four prediction parameters are prediction parameters corresponding to the prediction unit 0.

Furthermore, in the example of FIG. 22, when motion vectors are calculated for prediction units 1 to 7 included in the second current largest coding unit of the corresponding picture, it is determined that all the motion vectors corresponding to the second current largest coding unit are already calculated.

Next, the DMA control unit 512 transfers four prediction parameters corresponding to coordinates (0, 0), (16, 0), (32, 0), and (48, 0) in the largest coding unit to consecutive addresses in the frame memory 502. These four prediction parameters are a prediction parameter of a prediction unit 1, a prediction parameter of a prediction unit 1, a prediction parameter of a prediction unit 2, and a prediction parameter of a prediction unit 3.

The DMA control unit 512 stores these four prediction parameters to consecutive addresses in the frame memory 502 next to the four prediction parameters corresponding to the coordinates (0, 0), (16, 0), (32, 0), and (48, 0) in the largest coding unit.

Next, the DMA control unit 512 transfers four prediction parameters corresponding to coordinates (0, 16), (16, 16), (32, 16), and (48, 16) in the largest coding unit to consecutive addresses in the frame memory 502. These four prediction parameters are the prediction parameter of a prediction unit 1, the prediction parameter of a prediction unit 1, the prediction parameter of a prediction unit 4, the prediction parameter of a prediction unit 5.

The DMA control unit 512 stores these four prediction parameters to consecutive addresses in the frame memory 502 next to the four prediction parameters corresponding to the coordinates (0, 16), (16, 16), (32, 16), and (48, 16) in the largest coding unit.

Next, the DMA control unit 512 transfers four prediction parameters corresponding to coordinates (0, 32), (16, 32), (32, 32), and (48, 32) in the largest coding unit to consecutive addresses in the frame memory 502. These four prediction parameters are the prediction parameter of a prediction unit 6, the prediction parameter of a prediction unit 6, the prediction parameter of a prediction unit 7, and the prediction parameter of a prediction unit 7.

The DMA control unit 512 stores these four prediction parameters to consecutive addresses in the frame memory 502 next to the four prediction parameters corresponding to the coordinates (0, 32), (16, 32), (32, 32), and (48, 32) in the largest coding unit.

Next, the DMA control unit 512 transfers four prediction parameters corresponding to coordinates (0, 48), (16, 48), (32, 48), and (48, 48) in the largest coding unit to consecutive addresses in the frame memory 502. These four prediction parameters are the prediction parameter of a prediction unit 6, the prediction parameter of a prediction unit 6, the prediction parameter of a prediction unit 7, and the prediction parameter of a prediction unit 7.

The DMA control unit 512 stores these four prediction parameters to consecutive addresses in the frame memory 502 next to the four prediction parameters corresponding to the coordinates (0, 48), (16, 48), (32, 48), and (48, 48) in the largest coding unit.

By repeating such an procedure, the plurality of prediction parameters corresponding to the plurality of prediction units are stored in the frame memory 502, as shown in a map of the corresponding picture shown in the lower part of FIG. 22.

In this way, the plurality of prediction parameters corresponding to the plurality of prediction units spatially adjacent to each other are consecutively stored in the consecutive addresses. Accordingly, it becomes easier to obtain later the plurality of prediction parameters corresponding to the plurality of prediction units spatially adjacent to each other. In addition, as shown in the lower part of FIG. 22, the prediction parameter corresponding to the first prediction unit is copied to generate a plurality of prediction parameters corresponding to the plurality of coordinate positions. In this way, it becomes easier to obtain later the prediction parameters according to the coordinate positions.

In addition, in the example of FIG. 22, the plurality of prediction parameters are stored for every 16×16 pixels. As shown in FIG. 7, when rounding is performed, it is only necessary that a single prediction parameter is stored for every 16×16 pixels. Accordingly, it is also good that the plurality of prediction parameters corresponding to the plurality of prediction units in every 16×16 pixels are integrated into one prediction parameter and the integrated one is transferred.

(4-4 Advantageous Effects)

In this way, the image processing apparatus collectively transfers (stores) a plurality of prediction parameters used in predictive image generation for a plurality of prediction units spatially adjacent to each other. This reduces the number of times of memory access for obtaining the prediction parameters of the corresponding prediction units. Accordingly, the whole decoding is accelerated.

In addition, the image processing apparatus stores the prediction parameters corresponding to prediction units spatially adjacent to each other in consecutive addresses irrespective of the processing order. In this way, the image processing apparatus is capable of obtaining prediction parameters without using information related to a processing order of a corresponding picture. Accordingly, the amount of calculation for referring to the prediction parameters is reduced.

(3-5 Notes)

In this embodiment, the number of prediction parameters to be transferred collectively is four. However, the number of prediction parameters to be transferred collectively may be two, three, or five.

In addition, the image processing apparatus according to this embodiment stores, in consecutive addresses, a plurality of prediction parameters used in predictive image generation for a plurality of prediction units spatially adjacent to each other. However, the plurality of prediction units may be a plurality of prediction units spatially adjacent to each other in a direction other than the horizontal direction. For example, the plurality of prediction units may be a plurality of prediction units spatially adjacent to each other in a vertical direction.

In this embodiment, the largest coding unit according to this embodiment has a size of 64×64 pixels. However, the largest coding unit size is not limited to this size and may be any possible size. For example, the largest coding unit size may be 32×32 pixels, 16×16 pixels, or 64×32 pixels.

In addition, in this embodiment, a data unit corresponding to the prediction parameter to be stored is 16×16 pixels. However, the data unit to be stored is not limited to 16×16 pixels, and may be any possible size. For example, the data unit to be stored may be 8×8 pixels or 4×4 pixels.

In addition, each of the structural elements may be partly or fully configured in the form of an exclusive hardware circuit, or may be realized by means of a program being executed by a processor.

In this embodiment, each of the frame memory 502, the motion vector storing unit 515, the reference image storing unit 513 and the predictive image storing unit 514 is indicated as a memory or a storing unit. Each of these may be configured as any data recording device, for example, as a memory, a flip-flop, or a register. Furthermore, a part of the memory area in a processor, or a part of a cache memory may be used as any one of the frame memory 502, the motion vector storing unit 515, the reference image storing unit 513, and the predictive image storing unit 514.

In addition, in this embodiment, the image processing apparatus is an image decoding apparatus. However, the image processing apparatus is not limited to the image decoding apparatus. The image coding apparatus which executes processing according to a procedure inverse to the decoding is also capable of transferring prediction parameters.

In this embodiment, motion compensation is described as an example. In the case of intra prediction, the image processing apparatus can also provide similar advantageous effects by executing similar processing. It is to be noted that, in this case, an intra prediction mode may be used instead of a motion vector. Other information used in predictive image generation may naturally be used. In this case, a spatially different picture such as a picture having a different view point may be used as a corresponding picture. Another picture may also be used as a corresponding picture.

The sizes and shapes of the coding units, prediction units, and transform units shown in this embodiment are examples. Thus, these sizes and shapes may be replaced by other possible sizes and shapes.

[Embodiment 5]

Embodiment 5 is a variation of Embodiment 4. An image processing apparatus according to this embodiment includes structural elements similar to those in Embodiment 4, and collectively transfers (stores) a plurality of prediction parameters used in predictive image generation for a plurality of prediction units from a motion vector storing unit 515 to a frame memory 502.

The image processing apparatus according to this embodiment collectively transfers the plurality of prediction parameters used in the predictive image generation for all the prediction units of a largest coding unit. In addition, the image processing apparatus according to this embodiment transfers, to consecutive addresses, the plurality of prediction parameters used in the predictive image generation for the plurality of prediction units which are consecutive in a processing order. Here, for example, this processing order may be a predetermined processing order like a processing order to be applied when the plurality of prediction units included in a picture has a predetermined fixed size.

Figure 23:
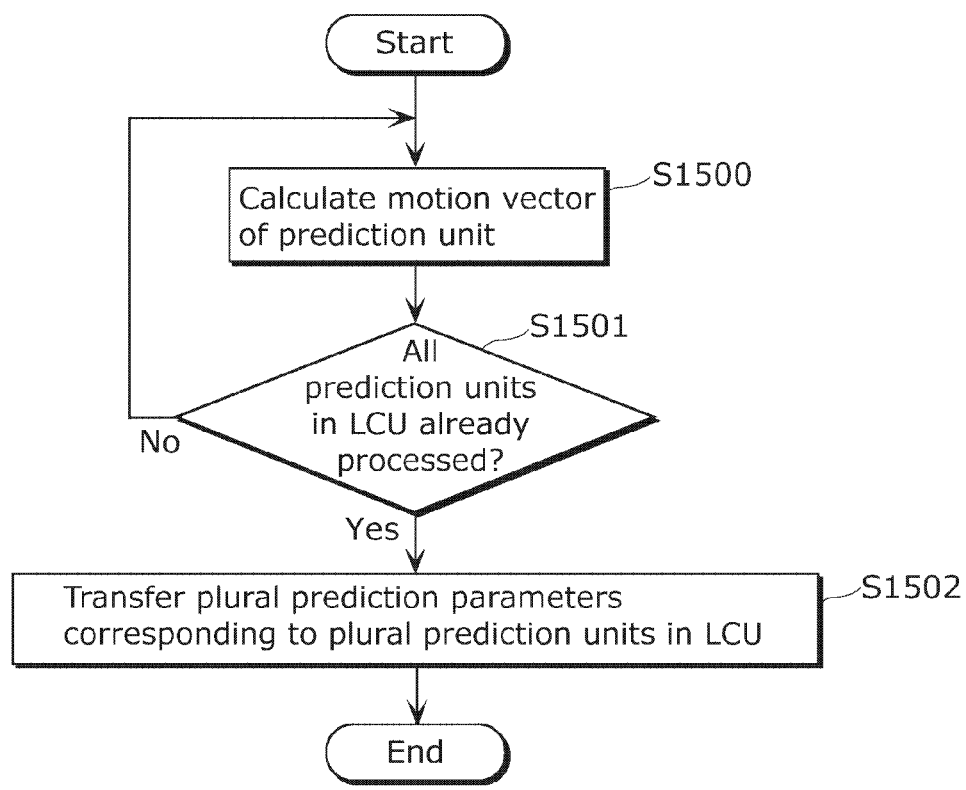
FIG. 23 is a flowchart of motion vector calculation according to Embodiment 5.

FIG. 23 is a flowchart of operations by a motion vector calculating unit 511 according to this embodiment. As in Embodiment 4, it is assumed here that the size of the largest coding unit is 64×64 pixels defined by coordinates (0, 0) and coordinates (63, 63).

First, the motion vector calculating unit 511 calculates a motion vector for a current prediction unit (S1500). Next, the motion vector calculating unit 511 determines whether or not a motion vector is already calculated for each of all the prediction units included in the largest coding unit (S1501). When the calculation of motion vectors for all the prediction units in the largest coding unit is not yet completed (No in S1501), the motion vector calculating unit 511 calculates a motion vector of each prediction unit for which no motion vector is yet calculated (S1500).

When the calculation of motion vectors for all the prediction units included in the largest coding unit is already completed (Yes in S1501), the motion vector calculating unit 511 transfers all the prediction parameters corresponding to the largest coding unit (S1502). At this time, under control of a DMA control unit 512, the motion vector calculating unit 511 transfers the plurality of prediction parameters corresponding to the plurality of prediction units which are consecutive in processing order to consecutive addresses in a frame memory 502.

More specifically, the DMA control unit 512 collectively transfers sixteen prediction parameters corresponding to 16 coordinates in the largest coding unit to the consecutive addresses in the frame memory 502. These 16 prediction parameters correspond to prediction units of coordinates (0, 0), (16, 0), (0, 16), (16, 16), (0, 32), (0, 48), (16, 32), (16, 48), (32, 0), (32, 16), (48, 0), (48, 16), (32, 32), (32, 48), (48, 32), and (48, 48).

The DMA control unit 512 transfers, for a next current largest coding unit, a plurality of prediction parameters corresponding to a plurality of prediction units which are consecutive in a processing order to consecutive addresses in the frame memory 502.

At this time, the DMA control unit 512 stores the plurality of prediction parameters of the current largest coding unit in the frame memory 502, next to the prediction parameters in the horizontal direction of the immediately-before current largest coding unit. For example, the DMA control unit 512 transfers the plurality of prediction parameters so that the prediction parameters corresponding to the coordinates (0, 0) of the current largest coding unit are consecutive to the prediction parameters corresponding to the coordinates (48, 48) in the immediately-before current largest coding unit in the frame memory 502.

FIG. 24 is a diagram showing an example of storage of prediction parameters in this embodiment, and shows a case where a corresponding picture similar to the one in FIG. 11 is processed as a current picture. When a motion vector is calculated for a prediction unit 0 included in the first current largest coding unit in the corresponding picture in FIG. 24, it is determined that all the motion vectors corresponding to the first current largest coding unit are already calculated.

More specifically, the DMA control unit 512 collectively transfers sixteen prediction parameters corresponding to 16 sets of coordinates in the largest coding unit to the consecutive addresses in the frame memory 502. In the example of FIG. 24, these sixteen prediction parameters are prediction parameters corresponding to the prediction unit 0.

Furthermore, in the example of FIG. 24, when motion vectors are calculated for prediction units 1 to 7 included in the second current largest coding unit of the corresponding picture in FIG. 24, it is determined that all the motion vectors corresponding to the second current largest coding unit are already calculated.

More specifically, the DMA control unit 512 collectively transfers sixteen prediction parameters corresponding to 16 sets of coordinates in the largest coding unit to the consecutive addresses in the frame memory 502. In the example of FIG. 24, these sixteen prediction parameters are prediction parameters corresponding to the prediction units 1, 1, 1, 1, 2, 3, 4, 5, 6, 6, 6, 6, 7, 7, 7, and 7.

The DMA control unit 512 stores these sixteen prediction parameters to consecutive addresses in the frame memory 502 next to the prediction parameters corresponding to the coordinates (48, 48) in the first current largest coding unit.

By repeating such an procedure, the plurality of prediction parameters corresponding to the plurality of prediction units are stored in the frame memory 502, as shown in a map of the corresponding picture shown in the lower part of FIG. 24.

Here, in this embodiment, a plurality of prediction parameters are transferred for each largest coding unit.

However, it is also good that a plurality of prediction parameters may be transferred for each finer data unit. Next, as shown in the map of the corresponding picture in FIG. 24, the prediction parameters may be transferred to consecutive addresses.

Figure 25:
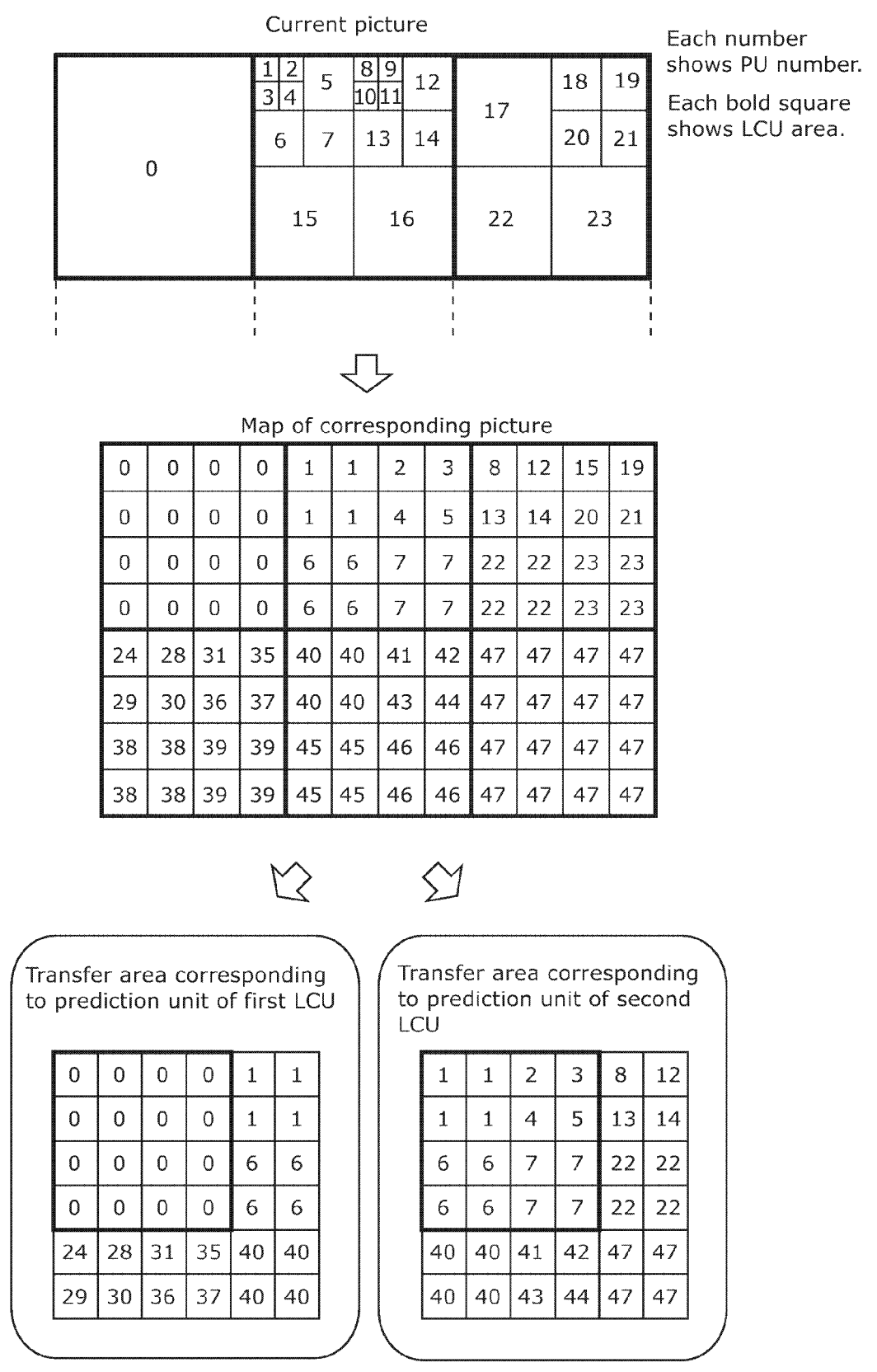

FIG. 25 is a diagram showing a first example of transfer of transfer areas according to this embodiment. FIG. 25 shows a plurality of prediction parameters to be transferred from the frame memory 502 in predictive image generation for prediction units in a current picture after the plurality of prediction parameters corresponding to the corresponding picture are transferred to the frame memory 502 according to the procedure in FIG. 23. It is to be noted that the current picture and the corresponding picture have structures similar to those in the examples of FIG. 19.

In the example of FIG. 25, when the image processing apparatus processes the prediction unit 1 of the current picture, it speculatively transfers prediction parameters corresponding to the prediction units 1 to 14, 22, 40 to 44, and 47 of the corresponding picture. The prediction units 1 to 14 are processed sequentially. In addition, the prediction units 40 to 44 are processed sequentially. Accordingly, these prediction parameters are stored in consecutive addresses in the frame memory 502. For this reason, the image processing apparatus can easily transfer these prediction parameters collectively from the frame memory 502.

Here, the image processing apparatus may skip transferring the prediction parameters to be transferred in the processing of the first current largest coding unit, from among the plurality of prediction parameters to be transferred in the processing of the second current largest coding unit.

Figure 26:
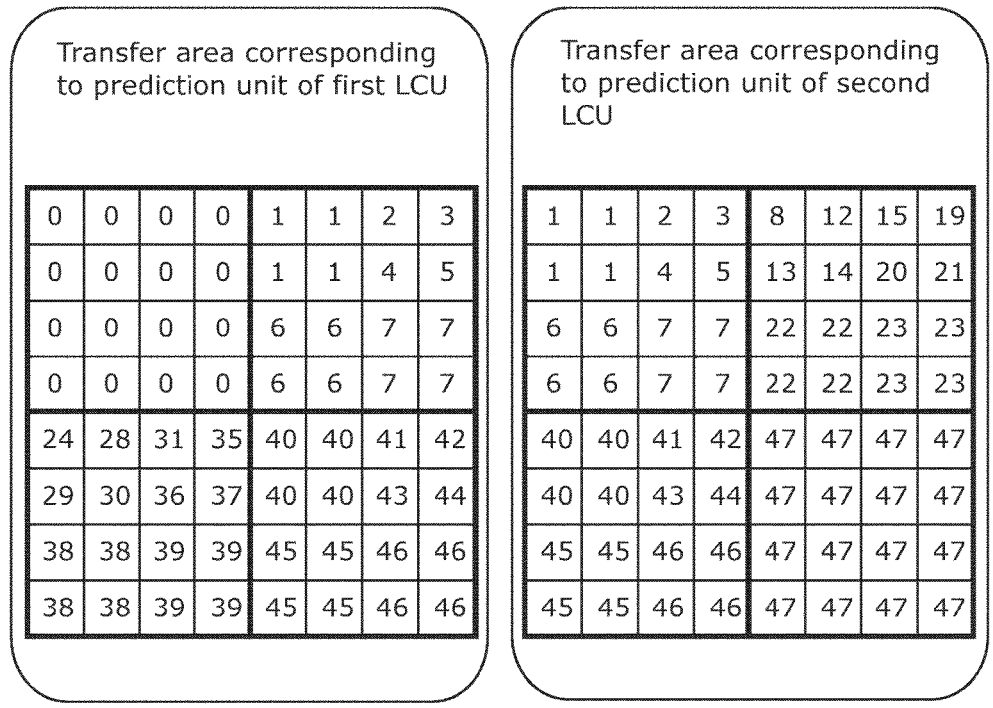
FIG. 26 is a diagram showing a second example of transfer of a transfer area according to Embodiment 5.

FIG. 26 is a diagram showing a second example of transfer of transfer areas according to this embodiment. The example of FIG. 26 is approximately the same as the example of FIG. 25. In the example of FIG. 26, the plurality of prediction parameters corresponding to the plurality of prediction units are transferred from the frame memory 502.

In the example of FIG. 26, when the image processing apparatus processes the prediction unit 1 of the current picture, it speculatively transfers prediction parameters corresponding to the prediction units 1 to 23, and 40 to 47 of the corresponding picture. The prediction units 1 to 23 are processed sequentially. In addition, the prediction units 40 to 47 are processed sequentially. Accordingly, these prediction parameters are stored in consecutive addresses in the frame memory 502. For this reason, the image processing apparatus can easily transfer these prediction parameters collectively from the frame memory 502.

In the example of FIG. 26, the image processing apparatus transfers, for each largest coding unit, a plurality of prediction parameters from the frame memory 502 to a motion vector storing unit 515, and transfers, for each largest coding unit, a plurality of prediction parameters from the motion vector storing unit 515 to the frame memory 502. In this way, the number of times of transfer is reduced, and the whole processing is accelerated.

Here, as in the example of FIG. 25, the image processing apparatus may skip transferring the prediction parameters to be transferred in the processing of the first current largest coding unit, from among the plurality of prediction parameters to be transferred in the processing of the second current largest coding unit.

As described above, the image processing apparatus according to this embodiment collectively transfers the plurality of prediction parameters used in the predictive image generation for all the prediction units of a largest coding unit. In this way, the number of times of transfer is reduced, and the whole processing is accelerated. In addition, the image processing apparatus according to this embodiment transfers, to consecutive addresses, the plurality of prediction parameters used in the predictive image generation for the plurality of prediction units which are consecutive in a processing order. In this way, it becomes easy to collectively obtain later the plurality of prediction parameters.

[Embodiment 6]

An image processing apparatus according to this embodiment includes unique structural elements according to the image processing apparatus shown in each of the aforementioned embodiments.

Figure 27A:
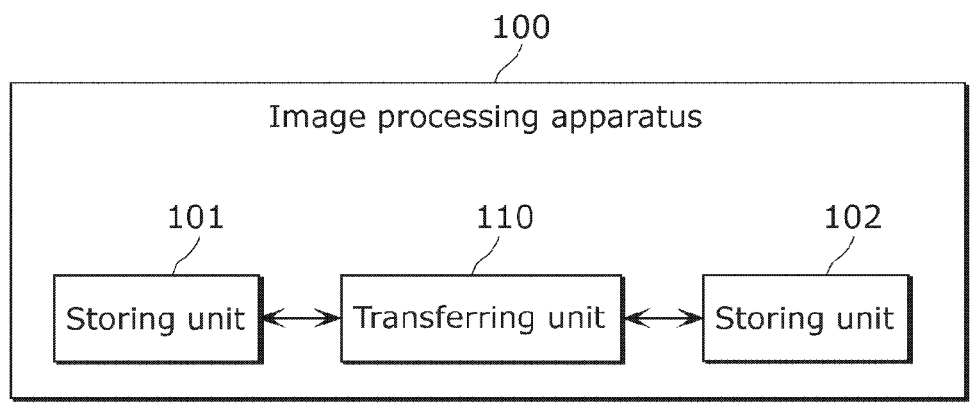
FIG. 27A is a diagram showing a structure of an image processing apparatus according to Embodiment 6.

FIG. 27A is a diagram showing a structure of the image processing apparatus according to this embodiment. The image processing apparatus 100 as shown in FIG. 27A performs predictive image generation for prediction units included in a picture different from a picture using prediction parameters used in predictive image generation for prediction units included in the latter picture. In addition, the image processing apparatus 100 includes two storing units 101, 102, and a transferring unit 110.

The storing unit 101 is a storing unit for storing a plurality of prediction parameters used in predictive image generation for a plurality of prediction units corresponding to at least a picture. The storing unit 101 may include a capacity for storing such plurality of prediction parameters. The storing unit 102 is a storing unit for storing two or more prediction parameters used in predictive image generation for two or more prediction units among the plurality of prediction units. The storing unit 102 may include a capacity for storing such two plurality of prediction parameters.

For example, the storing unit 101 corresponds to the frame memory 502 in FIG. 2, and the storing unit 102 corresponds to the motion vector storing unit 515 in FIG. 2. In addition, for example, a transferring unit 110 corresponds to a motion vector calculating unit 511 and a DMA control unit 512.

Figure 27B:
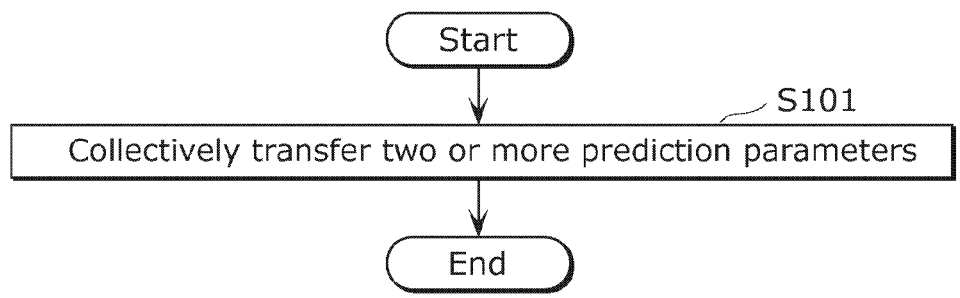
FIG. 27B is a flowchart of operations performed by the image processing apparatus according to Embodiment 6.

FIG. 27B is a flowchart showing operations by an image processing apparatus 100 shown in FIG. 27A. The transferring unit 110 collectively transfers the two or more prediction parameters for predictive image generation from the storing unit 101 to the storing unit 102 or the two or more prediction parameters for predictive image generation from the storing unit 102 to the storing unit 101 (S101).

This reduces the number of times of transferring information of prediction units. This reduces the processing load and processing delay involved in the transfer of information of prediction units.

For example, the transferring unit 110 may collectively transfer two or more prediction parameters each including motion vector information. The motion vector information may be information indicating that no motion vector is used. By the two or more prediction parameters each including such information being collectively transferred, the motion vector information is transferred efficiently. This reduces the processing load and processing delay in the case where the motion vector of another prediction unit is used.

For example, the transferring unit 110 collectively transfers the two or more prediction parameters for predictive image generation from the storing unit 101 to the storing unit 102. In this way, prediction parameters for predictive image generation are efficiently transferred. Accordingly, this reduces the processing load and processing delay in the transfer of the prediction parameters for predictive image generation.

For example, the transferring unit 110 may collectively transfer two or more prediction parameters each having a possibility of being used in predictive image generation for a prediction unit. In this way, iterations of transfer of prediction parameters are suppressed. This reduces the processing load and processing delay.

In addition, the transferring unit 110 may collectively transfer, to the storing unit 102, two or more prediction parameters including a prediction parameter of a second prediction unit and a prediction parameter of a third prediction unit. Here, the second prediction unit is a prediction unit (i) corresponding to the lower left position with respect to the first prediction unit for which predictive image generation is performed and (ii) included in the second picture different from the first picture including the first prediction unit. The third prediction unit is a prediction unit corresponding to the position of the first prediction unit and included in the second picture.

In this way, the prediction parameter corresponding to the lower right position and the prediction parameter corresponding to the corresponding position are collectively transferred at the same time. This reduces the number of times of transfer.

In addition, the transferring unit 110 may collectively transfer, to the storing unit 102, two or more prediction parameters including a prediction parameter having a possibility of being used in predictive image generation for a prediction unit and a prediction parameter not having a possibility of being used in predictive image generation for a prediction unit. In this way, a larger number of prediction parameters are transferred at one time of transfer. This reduces the number of iterations of transferring prediction parameters. This reduces the processing load and processing delay.

In addition, the transferring unit 110 may collectively transfer, to the storing unit 102, two or more prediction parameters for predictive image generation for each of all the prediction units included in a predetermined largest coding unit. In this way, the number of times of iterations of transfer is reduced in the predictive image generation for a plurality of prediction units included in the largest coding unit. This reduces the processing load and processing delay.

For example, the transferring unit 110 collectively transfers the two or more prediction parameters for predictive image generation from the storing unit 102 to the storing unit 101. In this way, prediction parameters used in the predictive image generation are efficiently transferred. This reduces the processing load and processing delay in the transfer of the prediction parameters used in the predictive image generation.

In addition, the transferring unit 110 may collectively transfer two or more prediction parameters used in predictive image generation for two or more prediction units spatially adjacent to each other from the storing unit 102 to the storing unit 101.

In this way, the plurality of prediction parameters are transferred collectively to the consecutive addresses. The plurality of prediction parameters transferred collectively correspond to a plurality of prediction units spatially adjacent to each other. Accordingly, this makes it easier to transfer collectively the plurality of prediction parameters corresponding to the plurality of prediction units spatially adjacent to each other as the plurality of prediction parameters for predictive image generation.

In addition, the transferring unit 110 may collectively transfer two or more prediction parameters used in predictive image generation for two or more prediction units spatially adjacent to each other in the horizontal direction from the storing unit 102 to the storing unit 101. Accordingly, this makes it easier to transfer collectively the plurality of prediction parameters corresponding to the plurality of prediction units spatially adjacent to each other in the horizontal direction as the plurality of prediction parameters for predictive image generation.

In addition, the transferring unit 110 may collectively transfer two or more prediction parameters used in predictive image generation for two or more prediction units spatially adjacent to each other in the vertical direction from the storing unit 102 to the storing unit 101. Accordingly, this makes it easier to transfer collectively the plurality of prediction parameters corresponding to the plurality of prediction units spatially adjacent to each other in the vertical direction as the plurality of prediction parameters for predictive image generation.

In addition, the transferring unit 110 may collectively transfer, to the storing unit 101, two or more prediction parameters for predictive image generation for all the prediction units included in a predetermined largest coding unit. In this way, the number of times of iterations of transfer is reduced in the predictive image generation for a plurality of prediction units included in the largest coding unit. This reduces the processing load and processing delay.

In addition, the transferring unit 110 may collectively transfer two or more prediction parameters used in predictive image generation for two or more prediction units which are consecutive in a processing order from the storing unit 102 to the storing unit 101. In this way, it becomes easy to transfer collectively later the plurality of prediction parameters corresponding to the plurality of prediction units which are consecutive in a processing order as the plurality of prediction parameters for predictive image generation.

In addition, the transferring unit 110 may generate a plurality of prediction parameters corresponding to a plurality of coordinate positions at equal intervals included in a prediction unit by copying the prediction parameter used in predictive image generation for a prediction unit. Next, the transferring unit 110 may collectively transfer each of the plurality of generated prediction parameters and another prediction parameter as two or more prediction parameters from the storing unit 102 to the storing unit 101.

In this way, it becomes easier to transfer later the prediction parameters located at a coordinate position included in a prediction unit as prediction parameters for predictive image generation.

[Embodiment 7]

In this embodiment, a new structural element is added to the image processing apparatus 100 shown in FIG. 27A.

Figure 28A:
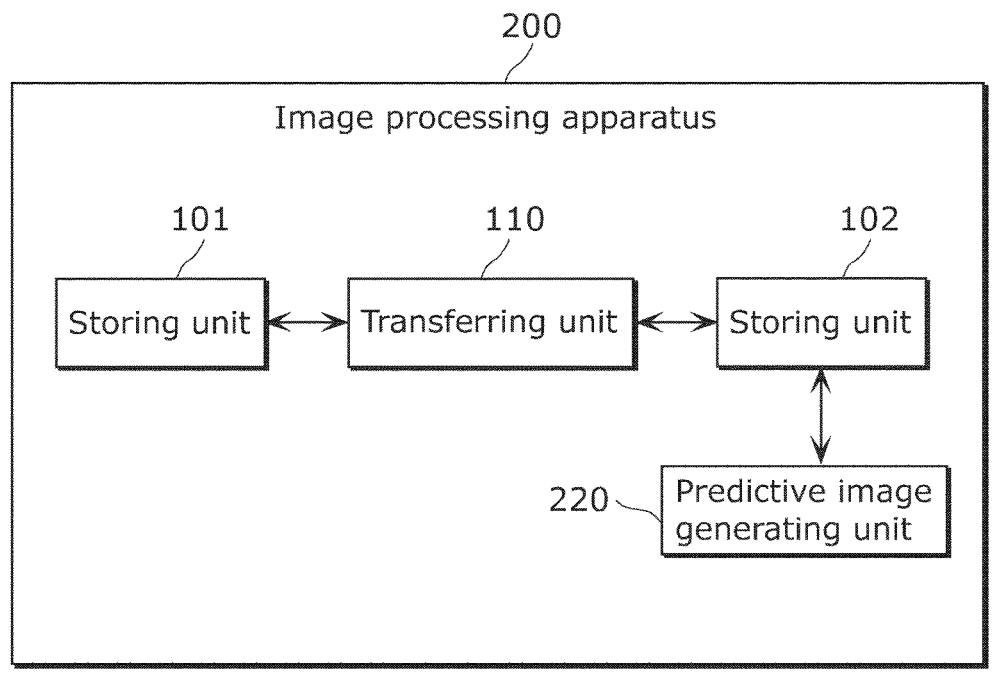
FIG. 28A is a diagram showing a structure of an image processing apparatus according to Embodiment 7.

FIG. 28A is a diagram showing a structure of the image processing apparatus according to this embodiment. An image processing apparatus 200 shown in FIG. 28A includes a predictive image generating unit 220 in addition to the structural elements of the image processing apparatus 100 shown in FIG. 27A. For example, a predictive image generating unit 220 corresponds to the motion vector calculating unit 511 and the motion compensating unit 506 in FIG. 2. The predictive image generating unit 220 may correspond to the intra predicting unit 507 in FIG. 1.

Figure 28B:
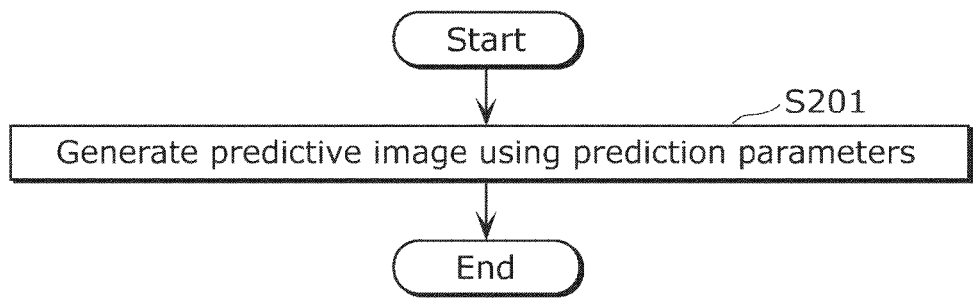
FIG. 28B is a flowchart of operations performed by the image processing apparatus according to Embodiment 7.

FIG. 28B is a flowchart showing operations by the image processing apparatus 200 shown in FIG. 28A. A predictive image generating unit 220 performs predictive image generation for a prediction unit using one of prediction parameters transferred from a storing unit 101 to a storing unit 102 (S201). In this way, prediction is properly performed using the transferred prediction parameters that are input prediction parameters.

For example, after a transferring unit 110 collectively transfers two or more prediction parameters for predictive image generation from a storing unit 101 to a storing unit 102, the predictive image generating unit 220 performs predictive image generation for a prediction unit using one of the prediction parameters transferred from the storing unit 101 to the storing unit 102.

In addition, for example, after the predictive image generating unit 220 performs predictive image generation for a prediction unit using one of the prediction parameters transferred to the storing unit 102, a transferring unit 110 collectively transfers two or more prediction parameters used in predictive image generation from the storing unit 102 to the storing unit 101.

It is to be noted that the predictive image generating unit 220 may perform predictive image generation for a prediction unit using one of the two or more predictive parameters collectively transferred from the storing unit 101 to the storing unit 102. In this way, the number of iterations of transfer is reduced by transferring collectively a plurality of prediction parameters even when one of the plurality of prediction parameters is selectively used. This reduces the processing load and processing delay.

It is to be noted that the structural elements in each of the above-described embodiments may be realized by being configured in the form of exclusive hardware or by executing one or more software programs suitable for the structural elements. The structural elements may be executed by the program executing unit such as a CPU or a processor reading out the one or more software programs recorded on a recording medium such as a hard disk or semiconductor memory and executing the read-out one or more software programs. Here, an exemplary one of the software programs for realizing the image processing apparatus etc. in one of the embodiments is indicated below.

The program causes a computer to execute an image processing method of performing, using a prediction parameter used in predictive image generation for a prediction unit included in a picture, predictive image generation for a prediction unit included in another picture, the image processing method including collectively transferring: (i) for predictive image generation, two or more of a plurality of prediction parameters from a first storing unit to a second storing unit, the first storing unit being for storing the plurality of prediction parameters used in predictive image generation for a plurality of prediction units corresponding in size to at least one picture, the second storing unit being for storing two or more prediction parameters used in predictive image generation for two or more prediction units among the plurality of prediction units; or (ii) the two or more prediction parameters used in the predictive image generation for the two or more prediction units from the second storing unit to the first storing unit.

Alternatively, the respective structural elements may be circuits. These circuits may be configured as a single circuit or separate circuits. These circuits may be general circuits or exclusive circuits.

The image processing apparatuses according to one or more aspects of the present invention have been described above based on embodiments, but the present invention is not limited to the embodiments. Various modifications may be made in these embodiments and other embodiments may be obtained by combining the structural elements of different embodiments without materially departing from the scope of the present invention, and thus such modifications and other embodiments are also included in the one or more aspects of the present invention.

For example, a process that is executed by a particular processing unit may be executed by another processing unit. In addition, the processing order of processes may be modified, or several processes may be executed in parallel.

Furthermore, the present invention can be realized not only as an image processing apparatus but also as a method including the steps corresponding to the processing units of the image processing apparatus. For example, these steps are executed by a computer.

The present invention can be realized as a program for causing the computer to execute the steps of the method. Furthermore, the present invention can be realized as a non-transitory computer-readable recording medium such as a CD-ROM etc. having the program recorded thereon.

In addition, the image processing apparatus and the image processing method according to the present invention are applicable to image coding apparatuses, image decoding apparatuses, image coding methods, and image decoding methods.

Furthermore, the structural elements included in the image processing apparatus may be realized as a Large Scale Integration (LSI) whish is an integrated circuit. These structural elements may be made as separate chips, or some or all of these may be integrated into a single chip. For example, the structural elements other than the memories may be integrated into a single chip. The name used here is LSI, but it may also be called as Integrated Circuit (IC), system LSI, super LSI, or ultra LSI, depending on the degree of integration.

Moreover, ways to achieve integration are not limited to the LSI, and special circuit or general purpose processor and so forth can also achieve the integration. Field Programmable Gate Array (FPGA) or a reconfigurable processor that allows re-configuration of the connection or configuration of LSIs or an LSI may be used.

Furthermore, when a circuit integration technology for replacing LSIs with new circuits appears in the future with advancement in semiconductor technology and derivative other technologies, the circuit integration technology may be naturally used to integrate the structural elements included in the image processing apparatus.

[Embodiment 8 ]

Furthermore, by recording a program, which realizes the image coding method and the image decoding method described in each of the embodiments, onto a recording medium, it is possible to easily perform the processing as described in each of the embodiments in an independent computer system. The recording medium may be a magnetic disc, an optical disc, a magnet-optical disc, an integrated circuit (IC) card, or a semiconductor memory, as far as the media can record the program.

Furthermore, applications of the image coding method and the image decoding method described in each of the above embodiments, and a system using such applications are described below.

Figure 29:
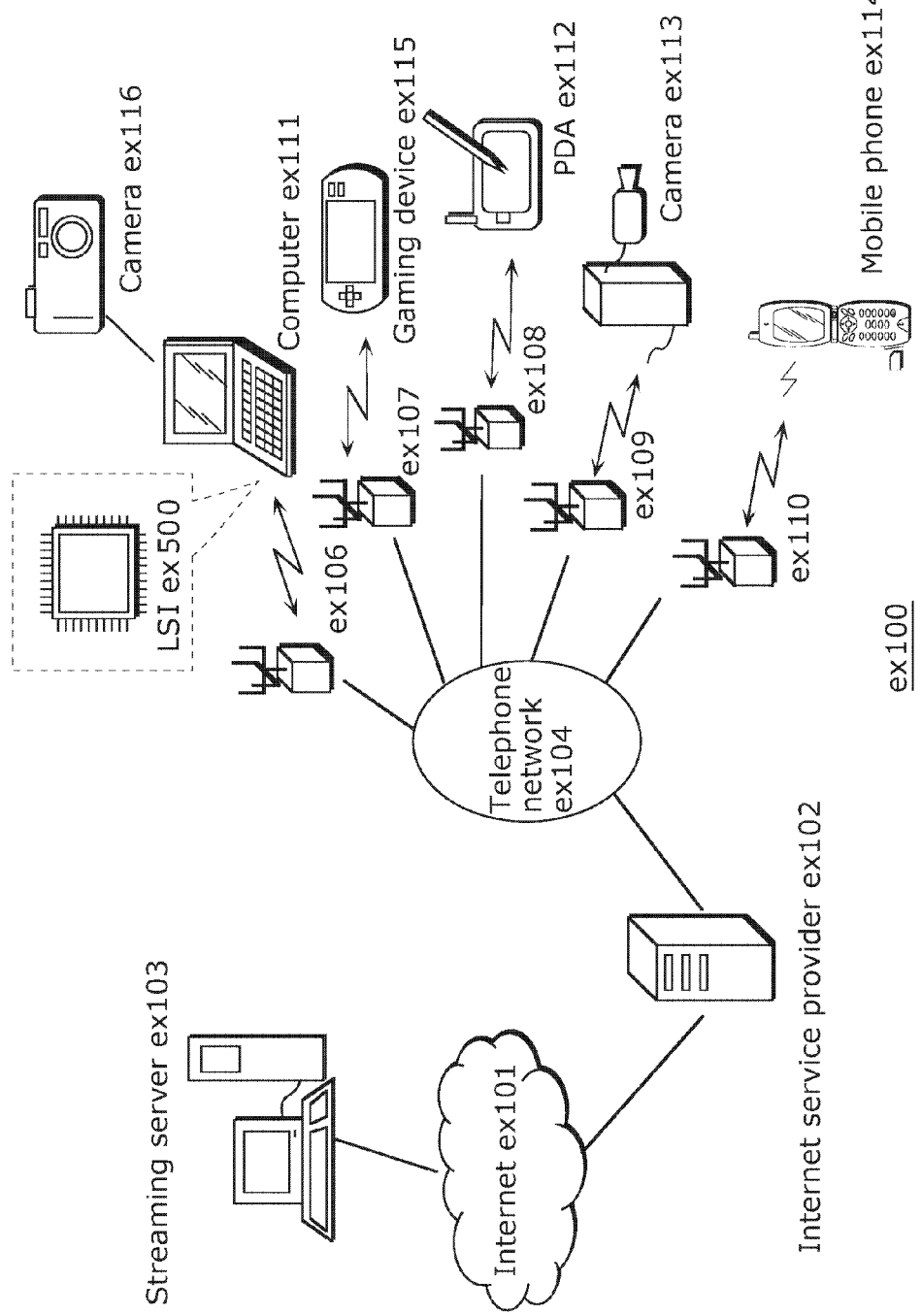
FIG. 29 is a structural diagram showing an overall configuration of a content providing system for implementing content distribution services.

FIG. 29 is a block diagram showing the overall configuration of a content providing system ex100 for realizing content distribution service. The area for providing communication service is divided into cells of a desired size, and base stations ex106 to ex110 which are fixed wireless stations are placed in the respective cells.

In this content providing system ex100, various devices such as a computer ex111, a Personal Digital Assistant (PDA) ex112, a camera ex113, a mobile phone ex114 and a gaming machine ex115 are connected to one another, via a telephone network ex104 and base stations ex106 to ex110. Furthermore, the various devices are connected to the Internet ex101 via an Internet service provider ex102.

However, the content providing system ex100 is not limited to the combination as shown in FIG. 29, and may include a combination of any of these devices which are connected to each other. In addition, each device may be connected directly to the telephone network ex104, not through the base stations ex106 to ex110 which are fixed wireless stations. Furthermore, the devices may be connected directly to one another via Near Field Communication (NFC) or the like.

The camera ex113 is a device such as a digital video camera capable of shooting moving images. The camera ex116 is a device such as a digital video camera capable of shooting still images and moving images. The mobile phone ex114 may be any of a mobile phone of a Global System for Mobile Communications (GSM, registered trademark) system, a Code Division Multiple Access (CDMA) system, a Wideband-Code Division Multiple Access (W-CDMA) system, a Long Term Evolution (LTE) system, a High Speed Packet Access (HSPA) system, a Personal Handy-phone System (PHS), and the like.

In the content providing system ex100, the camera ex113 is connected to a streaming server ex103 via the base station ex109 and the telephone network ex104, which realizes live distribution or the like. In the live distribution, the coding as described in the above embodiments is performed for a content (such as a video of a live music performance) shot by a user using the camera ex113, and the coded content is provided to the streaming server ex103. On the other hand, the streaming server ex103 makes steam distribution of the received content data to the clients at their requests. The clients include the computer ex111, the PDA ex112, the camera ex113, the mobile phone ex114, the gaming machine ex115, and the like, capable of decoding the above-mentioned coded data. Each device receiving the distributed data decodes the received data to be reproduced.

Here, the coding of the data shot by the camera may be performed by the camera ex113, the streaming server ex103 for transmitting the data, or the like. Likewise, either the client or the streaming server ex103 may decode the distributed data, or both of them may share the decoding. In addition, the still image and/or moving image data shot by the camera ex116 may be transmitted not only to the camera ex113 but also to the streaming server ex103 via the computer ex111. In this case, either the camera ex116, the computer ex111, or the streaming server ex103 may perform the coding, or all of them may share the coding.

It should be noted that the above-described coding and the decoding are performed by a Large Scale Integration (LSI) ex500 generally included in each of the computer ex111 and the devices. The LSI ex500 may be implemented as a single chip or a plurality of chips. It should be noted that software for encoding and decoding images may be integrated into any of various type of recording media (such as a CD-ROM, a flexible disc and a hard disk) that is readable by the computer ex111 or the like, so that the encoding and decoding are performed by using the software. Furthermore, if the mobile phone ex114 is a camera-equipped mobile phone, it may transmit generated moving image data. This moving image data is the data coded by the LSI ex500 included in the mobile phone ex114.

It should be noted that the streaming server ex103 may be implemented as a plurality of servers or a plurality of computers, so that data is divided into pieces to be processed, recorded, and distributed separately.

As described above, the content providing system ex100 enables the clients to receive and reproduce coded data. Thus, in the content providing system ex100, the clients can receive information transmitted by the user, then decode and reproduce it, so that the user without specific rights nor equipment can realize individual broadcasting.

Figure 30:
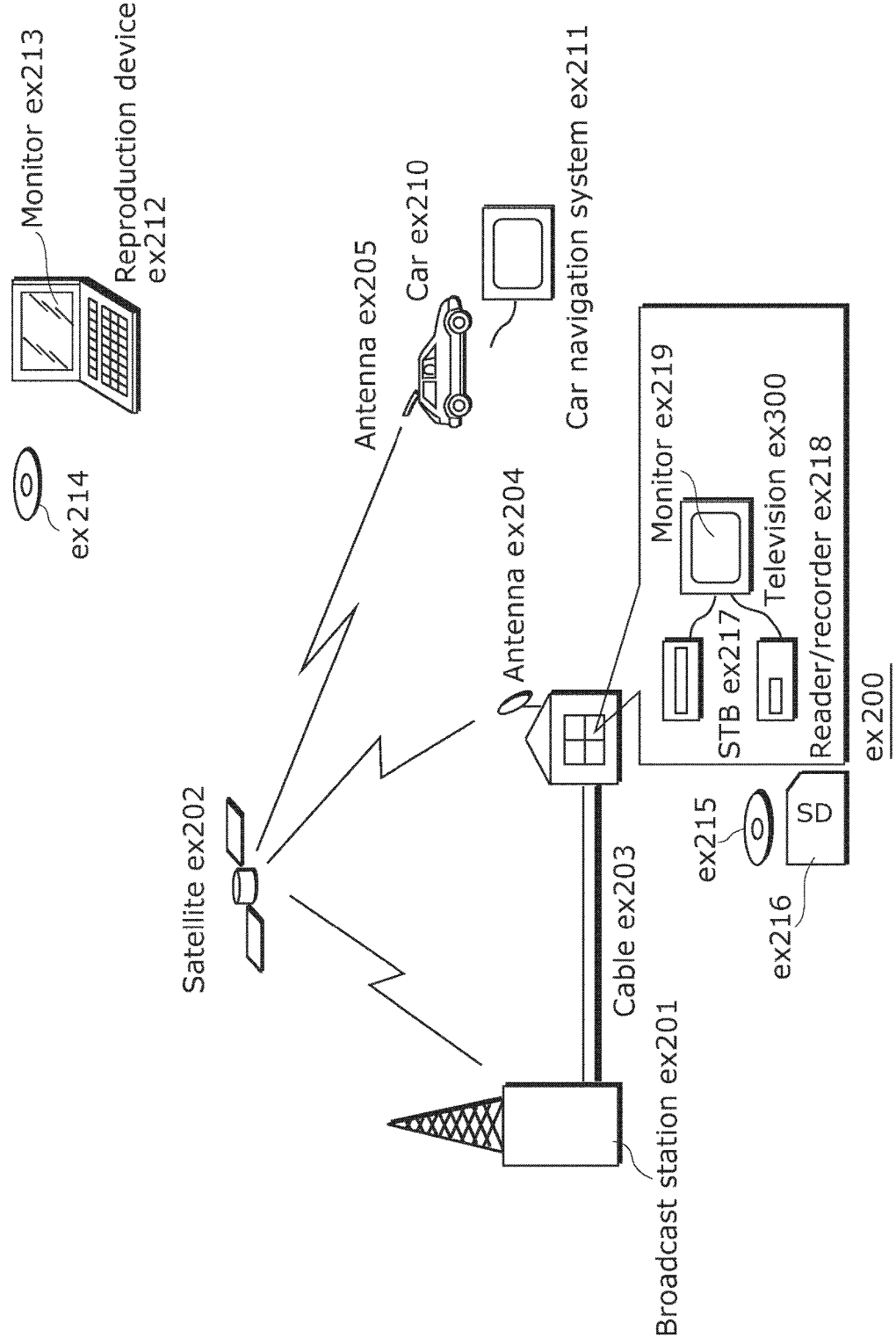
FIG. 30 is a structural diagram showing an overall configuration of a digital broadcasting system.

The present invention is not limited to the example of the content providing system ex100. An image processing apparatus in the above embodiments can be incorporated into the digital broadcast system ex200 as shown in FIG. 30. More specifically, a bit stream of video information is transmitted from a broadcast station ex201 to a communication or broadcast satellite ex202 via radio waves. The bitstream is a coded bitstream generated by the image coding method described in the above embodiments. Upon receipt of it, the broadcast satellite ex202 transmits radio waves for broadcasting, and a home antenna ex204 with a satellite broadcast reception function receives the radio waves. A device such as a television (receiver) ex300 or a Set Top Box (STB) ex217 decodes the coded bit stream for reproduction.

The image processing apparatus described in the above embodiments can be implemented in a reproduction device ex212 for reading and decoding a coded bit stream recorded on a recording medium ex214 such as a CD and DVD that is a recording medium. In this case, the reproduced video signals are displayed on a monitor ex213.

The image processing apparatus described in the above embodiments can be implemented in a reader/recorder ex218 for reading and decoding a coded bitstream recorded on a recording medium ex215 such as a DVD and a BD or for coding and writing video signals into the recording medium ex215. In this case, the reproduced video signals are displayed on a monitor ex219, and the recording medium ex215, on which the coded bitstream is recorded, allows a different device of system to reproduce the video signals. It is also conceived to implement the image processing apparatus in the set top box ex217 connected to a cable ex203 for cable television or the antenna ex204 for satellite and/or terrestrial broadcasting so as to reproduce them on a monitor ex219 of the television. The image processing apparatus may be incorporated into the television, not in the set top box.

Figure 31:
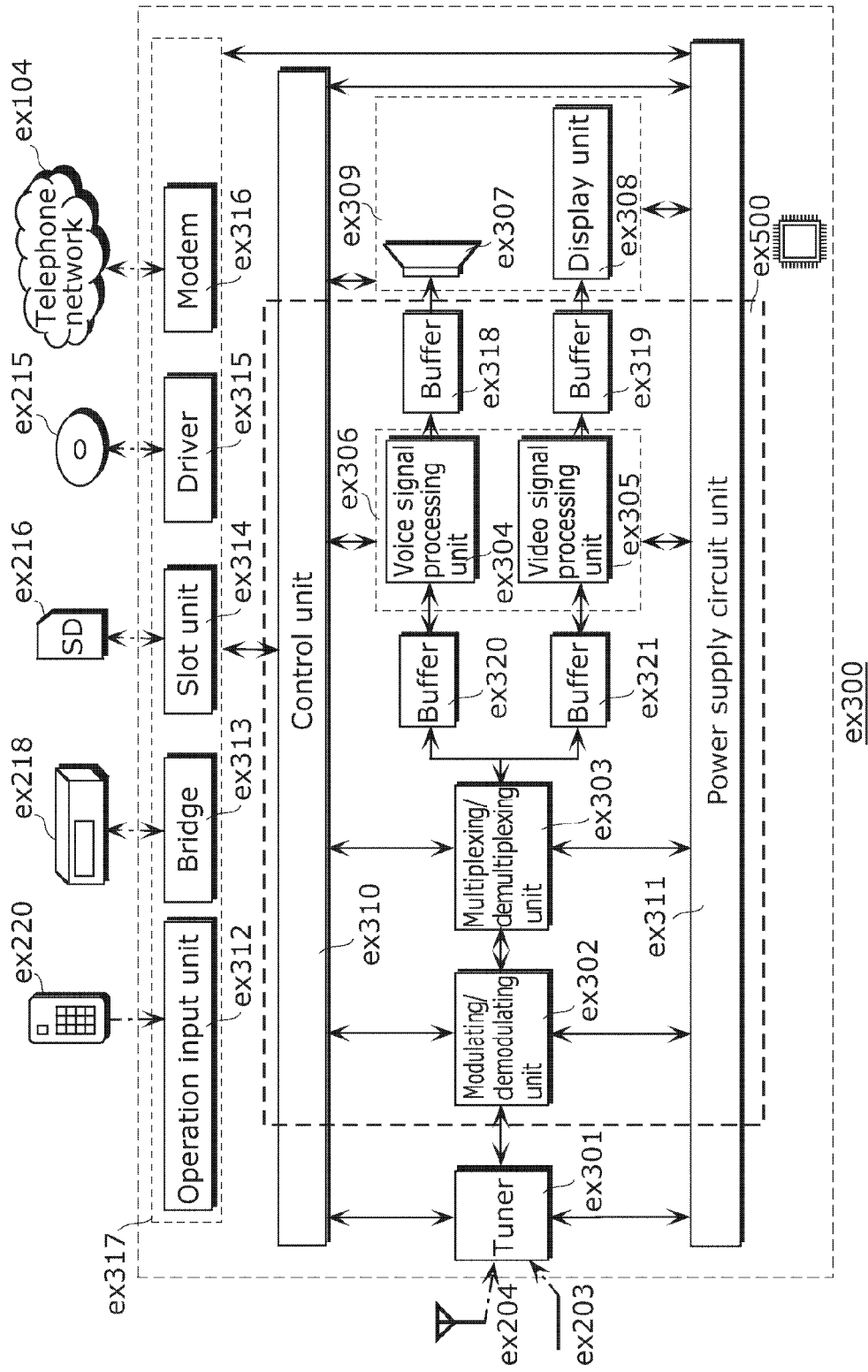
FIG. 31 is a block diagram showing an example of a configuration of a television.

FIG. 31 is a diagram showing a television (receiver) ex300 using the image decoding method described in the above embodiments. The television ex300 includes: a tuner ex301 that receives or outputs a bitstream of video information via the antenna ex204, the cable ex203, or the like that receives the above broadcasting; a modulating/demodulating unit ex302 that demodulates the received coded data or modulates generated coded data to be transmitted to the outside; and a multiplexing/demultiplexing unit ex303 that demultiplexes the modulated video data from the modulated audio data or multiplexes the coded video data and the coded audio data.

In addition, the television ex300 includes: a signal processing unit ex306 having (a) an audio signal processing unit ex304 that decodes or codes audio data and (b) a video signal processing unit ex305 that decodes or encodes video data; and an output unit ex309 having (c) a speaker ex307 that outputs the decoded audio signal and (d) a display unit ex308, such as a display, that displays the decoded video signal. Furthermore, the television ex300 includes an interface unit ex317 having an operation input unit ex312 that receives inputs of user operations, and the like. Moreover, the television ex300 includes: a control unit ex310 for the overall controlling of the respective units; and a power supply circuit unit ex311 that supplies the respective units with power.

In addition to the operation input unit ex312, the interface unit ex317 may include: a bridge ex313 connected to external devices such as the reader/recorder ex218; a slot unit ex314 enabling the recording medium ex216 such as an SD card to be attached to the interface unit ex317; a driver ex315 for connecting to an external recording medium such as a hard disk; a modem ex316 connected to a telephone network; and the like. It should be noted that the recording medium ex216 enables information to be electrically recorded on a stored nonvolatile/volatile semiconductor memory device.

The units in the television ex300 are connected to one another via a synchronous bus.

First, the description is given for the structure by which the television ex300 decodes and reproduces data received from the outside via the antenna ex204 or the like. The television ex300 receives a user operation from a remote controller ex220 or the like. Then, under control of the control unit ex310 having a CPU and the like, the television ex300 demodulates video data and audio data at the modulating/demodulating unit ex302, and demultiplexes the demodulated video data from the demodulated audio data at the multiplexing/demultiplexing unit ex303. In addition, the television ex300 decodes the demultiplexed audio data at the audio signal processing unit ex304, and decodes the demultiplexed video data at the video signal processing unit ex305 using the decoding method described in the above embodiments. The decoded audio signal and the decoded video signal are separately outputted from the output unit ex309 to the outside. When outputting the signals, the signals may be temporarily stored in, for example, buffers ex318 and ex319, so that the audio signal and the video signal are reproduced in synchronization with each other. Furthermore, the television ex300 may read the coded bitstream, not from broadcasting or the like but from the recording media ex215 and ex216 such as a magnetic/optical disc and a SD card.

Next, the description is given for the structure by which the television ex300 codes audio signal and video signal, and transmits the coded signals to the outside or writes them onto a recording medium or the like. The television ex300 receives a user operation from the remote controller ex220 or the like, and then, under control of the control unit ex310, codes audio signal at the audio signal processing unit ex304, and codes video data at the video signal processing unit ex305 using the coding method described in the above embodiments. The coded audio signal and the coded video signal are multiplexed at the multiplexing/demultiplexing unit ex303 and then outputted to the outside. When multiplexing the signals, the signals may be temporarily accumulated in, for example, buffers ex320 and ex321, so that the audio signal and the video signal are in synchronization with each other.

It should be noted that the buffers ex318 to ex321 may be implemented as a plurality of buffers as shown, or may share one or more buffers. It should also be noted that, besides the shown structure, it is possible to include a buffer, for example, between the modulating/demodulating unit ex302 and the multiplexing/demultiplexing unit ex303, so that the buffer serves as a buffer preventing system overflow and underflow, and thereby accumulate data in the buffer.

It should also be noted that, in addition to the structure for receiving audio data and video data from broadcasting, recording media, and the like, the television ex300 may also have a structure for receiving audio inputs from a microphone and a camera, so that the coding is preformed for the received data. Here, although it has been described that the television ex300 can perform the above-described coding, multiplexing, and providing to the outside, it is also possible that the television ex300 cannot perform all of them but can perform one of the coding, multiplexing, and providing to the outside.

It should be noted that, when the reader/recorder ex218 is to read or write a coded bitstream from/into a recording medium, either the television ex300 or the reader/recorder ex218 may perform the above-described decoding or encoding, or the television ex300 and the reader/recorder ex218 may share the above-described decoding or encoding.

Figure 32:
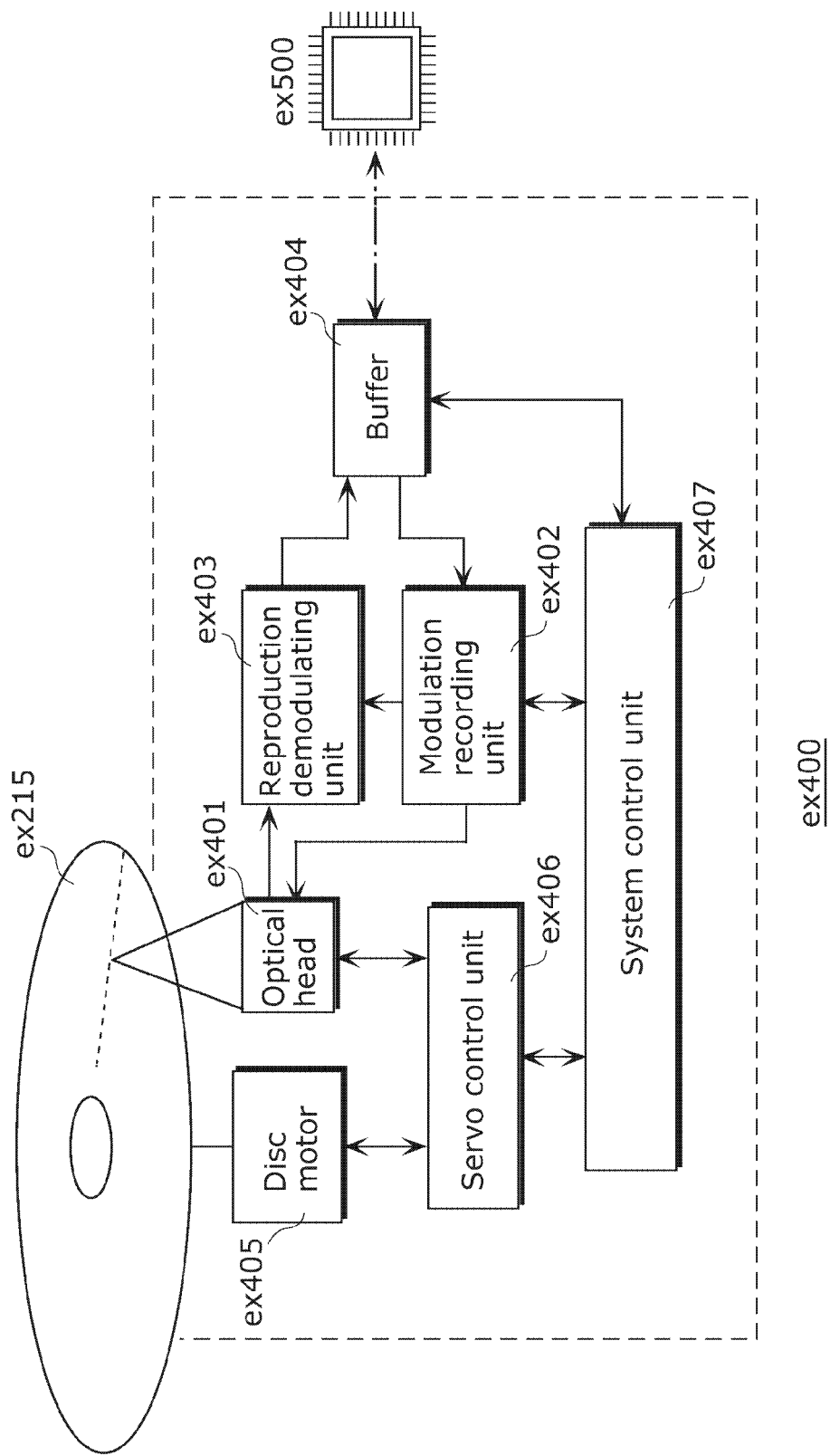
FIG. 32 is a block diagram illustrating an example of a configuration of an information reproducing/recording unit that reads and writes information from and on a recording medium that is an optical disc.

As an example, FIG. 32 shows a structure of an information reproducing/recording unit ex400 in the case where data is read from or written into an optical disc. The information reproducing/recording unit ex400 includes the following units ex401 to ex407.

The optical head ex401 writes information into the recording medium ex215 as an optical disc by irradiating laser spot on a recording surface of the recording medium ex215, and reads information from the recording medium ex215 by detecting light reflected on the recording surface of the recording medium ex215. The modulation recording unit ex402 electrically drives a semiconductor laser included in the optical head ex401, and thereby modulates laser light according to recorded data. A reproduction demodulating unit ex403 amplifies reproduction signal that is obtained by electrically detecting light reflected on the recording surface by a photo detector included in the optical head ex401, then demultiplexes and demodulates signal components recorded on the recording medium ex215, and reproduces necessary information. A buffer ex404 temporarily stores the information to be recorded onto the recording medium ex215, and the information reproduced from the recording medium ex215. A disc motor ex405 rotates the recording medium ex215. A servo control unit ex406 moves the optical head ex401 to a predetermined information track while controlling rotation driving of the disc motor ex405, thereby performing tracking processing of the laser spot.

The system control unit ex407 controls the overall information reproducing/recording unit ex400. The above-described reading and writing are realized when the system control unit ex407 records and reproduces information via the optical head ex401 while cooperating the modulation recording unit ex402, the reproduction demodulating unit ex403, and the servo control unit ex406, by using various information stored in the buffer ex404 and new information generated and added as needed. The system control unit ex407 includes, for example, a microprocessor, and performs the above processing by executing a reading/writing program.

Although it has been described above that the optical head ex401 irradiates laser spot, the optical head ex401 may perform higher-density recording by using near-field light.

Figure 33:
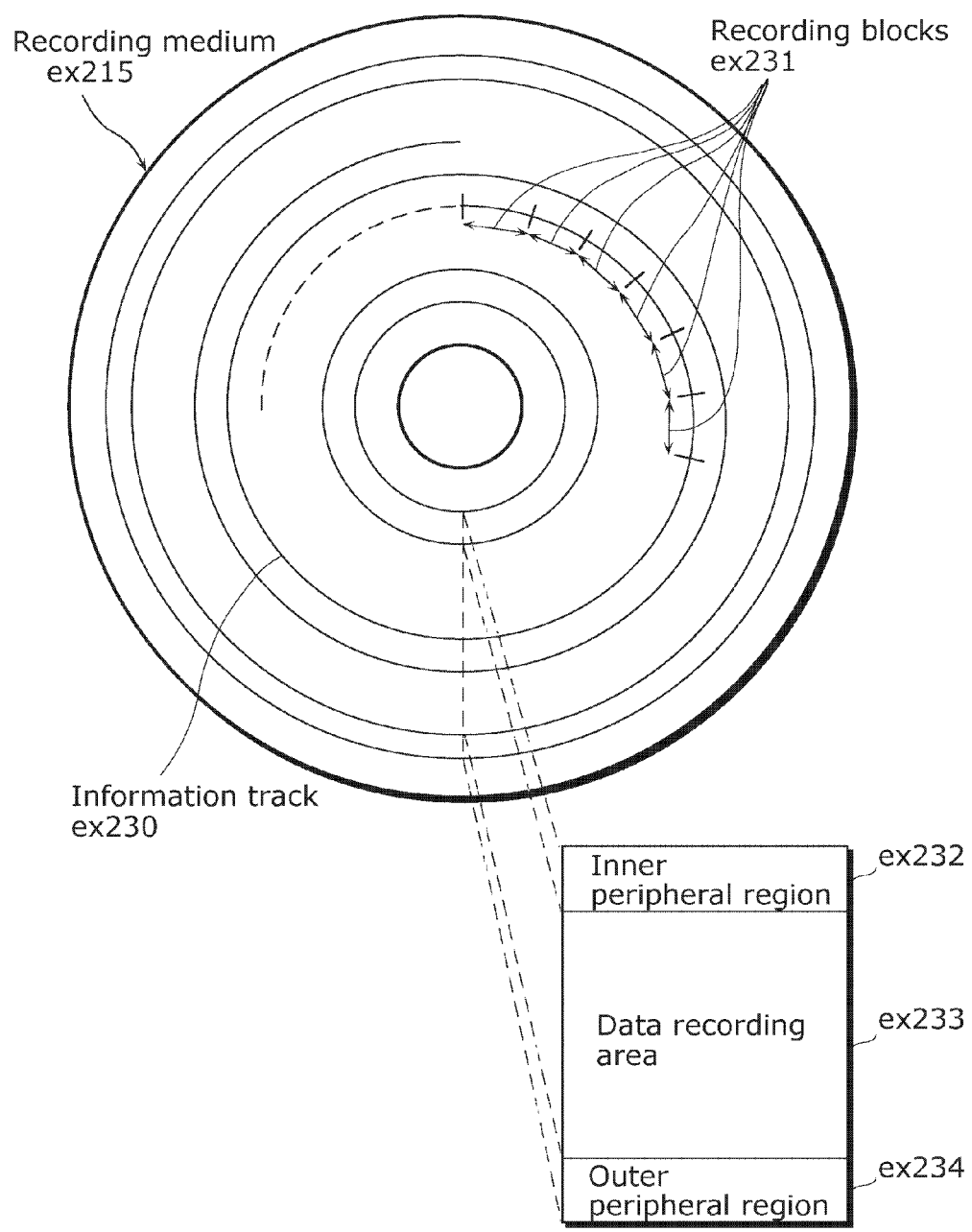
FIG. 33 is a diagram showing an example of a configuration of a recording medium that is an optical disc.

FIG. 33 shows a schematic diagram of the recording medium ex215 that is an optical disc. On the recording surface of the recording medium ex215, guide grooves are formed in a spiral shape, and on an information track ex230, address information indicating an absolute position on the disc is previously recorded using a change of the groove shape. The address information includes information for identifying a position of a recording block ex231 that is a unit for recording data, and a devise performing recording and reproduction is capable of specifying the recording block by reproducing the information track ex230 to read the address information. Moreover, the recording medium ex215 includes a data recording region ex233, an inner peripheral region ex232, and an outer peripheral region ex234. The data recording region ex233 is a region on which user data is recorded. The inner peripheral region ex232 and the outer peripheral region ex234 which are provided in the inner periphery and the outer periphery, respectively, of the data recording region ex233 are for specific uses except the user data recording.

The information reproducing/recording unit ex400 reads/writes coded audio data and video data or coded data generated by multiplexing them, from/into such data recording region ex233 of the recording medium ex215.

Although the above has been described giving the example of a one-layer optical disc such as a DVD or a BD, the optical disc is not limited to the above but may be a multi-layer optical disc so that data can be recorded onto other regions in addition to the surface. Furthermore, the optical disc may have a structure for multidimensional recording/reproducing, such as data recording using color lights having various different wavelengths on the same position of the disc, or recording of layers of different pieces of information from various angles.

It should also be noted that it is possible in the digital broadcasting system ex200 that the car ex210 having the antenna ex205 receives data from the satellite ex202 or the like, and reproduces moving images on the display device such as the car navigation system ex211 or the like in the car ex210. As for the configuration of the car navigation system ex211, a configuration added with a GPS receiving unit to the units as shown in FIG. 31, is conceivable. The same applies to the computer ex111, the mobile phone ex114 and others. Moreover, likewise the television ex300, three types of implementations can be conceived for a terminal such as the above-mentioned mobile phone ex114: a communication terminal equipped with both an encoder and a decoder; a sending terminal equipped with an encoder only; and a receiving terminal equipped with a decoder only.

Thus, the image coding method and the image decoding method described in the above embodiments can be used in any of the above-described devices and systems, and thereby the effects described in the above embodiments can be obtained.

It should be noted that the present invention is not limited to the above embodiments but various variations and modifications are possible in the embodiments without departing from the scope of the present invention.

[Embodiment 9]

Figure 34:
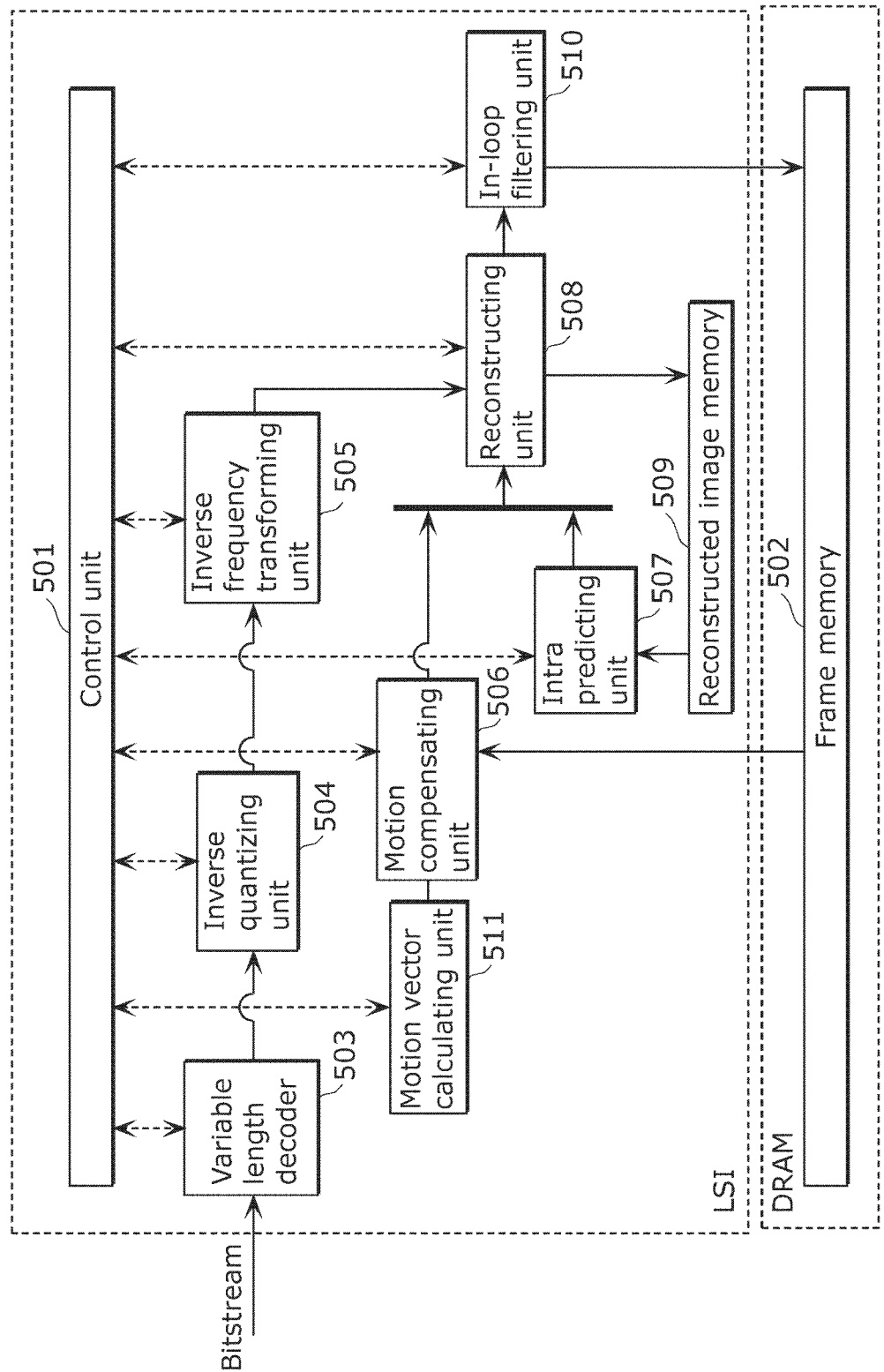
FIG. 34 is a structural diagram showing a configuration example of an integrated circuit which realizes image decoding.

In this embodiment, the image processing device according to Embodiment 1 is typically implemented into a Large Scale Integration (LSI) which is an integrated circuit. FIG. 34 shows this embodiment. A frame memory 502 is implemented into a DRAM and the other circuits and memories are implemented into the LSI. A stream buffer for storing a bitstream may be realized on the DRAM.

These structural elements may be integrated separately, or a part or all of them may be integrated into a single chip. Here, the integrated circuit is referred to as an LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements included in the image processing apparatus. Application of biotechnology is one such possibility.

Moreover, the semiconductor chip on which the image processing device according to the embodiments is combined with a display for drawing images to form an image drawing device depending on various applications. The present invention can thereby be used as an information drawing means for a mobile phone, a television set, a digital video recorder, digital camcorder, a vehicle navigation device, and the like. The display in the combination may be a cathode-ray tube (CRT), a flat display such as a liquid crystal display, a plasma display panel (PDP), or an organic light emitting display (OLED), a projection display represented by a projector, or the like.

It should also be noted that the LSI according to this embodiment may perform encoding and decoding in cooperation with a bitstream buffer on which coded streams are accumulated and a Dynamic Random Access Memory (DRAM) including a frame memory on which images are accumulated. The LSI according to this embodiment may be cooperated not with a DRAM, but with a different storage device such as an embedded DRAM (eDRAM), a Static Random Access Memory (SRAM), or a hard disk.

[Embodiment 10]

Figure 35:
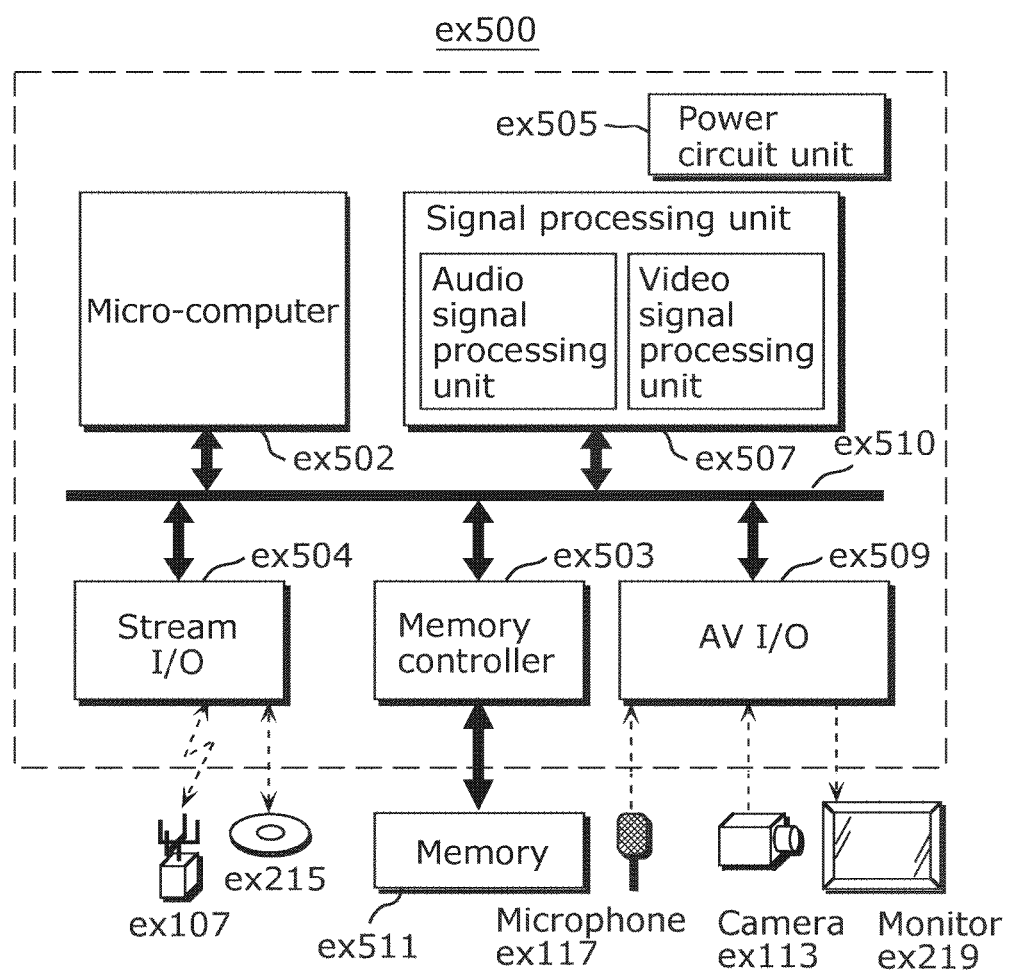
FIG. 35 is a structural diagram showing a configuration example of an integrated circuit which realizes image encoding and image decoding.

In this embodiment, the image coding device, the image decoding device, the image processing apparatus, the image coding method, and the image decoding method, and the image processing method which have been described in the above embodiments are typically implemented into a Large Scale Integration (LSI) which is an integrated circuit. As an example, FIG. 35 shows a structure of an LSI ex500 on which they are integrated into a single chip. The LSI ex500 includes the following units ex502 to ex509 which are connected to one another via a bus ex510. When a power source is ON, a power supply circuit unit ex505 supplies power to each of the units to activate them to be capable of operating.

For example, in the case of coding, the LSI ex500 receives input audio/visual (AV) signals from an AV I/O ex509 via the microphone ex117, the camera ex113, or the like. The input AV signals are temporarily stored in an external memory ex511 such as an SDRAM. The accumulated data is, for example, divided into a plurality of times depending on a processing amount and a processing speed, and eventually provided to a signal processing unit ex507. The signal processing unit ex507 performs coding of audio signal and/or coding of video signal. Here, the coding of video signal is the coding described in the above embodiments. Furthermore, the signal processing unit ex507 performs multiplexing of the coded audio data and the coded video data and other processing as needed, and provides the resulting data from a stream I/O ex504 to the outside. The output bitstream is transmitted to the base station ex107, or written to the recording medium ex215.

Moreover, for example, in the case of decoding, under the control of the microcomputer ex502, the LSI ex500 temporarily accumulates, to a memory ex511 or the like, coded data that is obtained using the stream I/O ex504 via the base station ex107, or coded data that is obtained by reading it from the recording medium ex215. Under control of the microcomputer ex502, the accumulated data is, for example, divided into a plurality of times depending on a processing amount and a processing speed, and eventually provided to the signal processing unit ex507. The signal processing unit ex507 performs decoding of audio signal and/or decoding of video signal. Here, the decoding of a video signal is the decoding described in the above embodiments. It is preferable that the decoded audio signal and the decoded video signal are temporarily stored in the memory ex511 or the like as needed, so that they can be reproduced in synchronization with each other. The decoded output signal is outputted from the AV I/O ex509 to the monitor ex219 or the like appropriately via the memory ex511 or the like. The access to the memory ex511 is actually performed via the memory controller ex503.

Although it has been described above that the memory ex511 is outside the LSI ex500, the memory ex511 may be included in the LSI ex500. It is possible that the LSI ex500 may be integrated into a single chip, or may be integrated separately.

Here, the integrated circuit is referred to as an LSI, but the integrated circuit can be called an IC, a system LSI, a super LSI or an ultra LSI depending on their degrees of integration.

Moreover, ways to achieve integration are not limited to the LSI, and a special circuit or a general purpose processor and so forth can also achieve the integration. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements included in the image processing apparatus. Application of biotechnology is one such possibility.

The present invention is applicable to various kinds of applications. For example, the present invention is applicable to and highly useful for high resolution display apparatuses or image capturing apparatuses, such as television sets, digital video recorders, car navigation systems, mobile phones, digital cameras, digital video cameras.

REFERENCE SIGNS LIST

100, 200 Image processing apparatus
101, 102 Storing unit
110 Transferring unit
220 Predictive image generating unit
501, ex310 Control unit
502 Frame memory
503 Variable length decoder
504 Inverse quantizing unit
505 Inverse frequency transforming unit
506 Motion compensating unit
507 Intra predicting unit
508 Reconstructing unit
509 Reconstructed image memory
510 In-loop filtering unit
511 Motion vector calculating unit
512 DMA control unit
513 Reference image storing unit
514 Predicted image storing unit
515 Motion vector storing unit
ex100 Content providing system
ex101 Internet
ex102 Internet service provider ex103 Streaming server
ex104 Telephone network
ex106, ex107, ex108, ex109, ex110 Base station
ex111 Computer
ex112 Personal Digital Assistant (PDA)
ex113, ex116 Camera
ex114 Mobile phone
ex115 Gaming machine
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction device
ex213, ex219 Monitor
ex214, ex215, ex216 Recording medium
ex217 Set Top Box (STB)
ex218 Reader/recorder
ex220 Remote controller
ex230 Information track
ex231 Recording block
ex232 Inner peripheral region
ex233 Data recording region
ex234 Outer peripheral region
ex300 Television (receiver)
ex301 Tuner
ex302 Modulating/demodulating unit
ex303 Mulitplexing/demultiplexing unit
ex304 Audio signal processing unit
ex305 Video signal processing unit
ex306, ex507 signal processing unit
ex307 Speaker
ex308 Display unit
ex309 Output unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction demodulating unit
ex405 Disc motor
ex406 Servo control unit
ex407 System control unit
ex500 LSI
ex502 Microcomputer
ex503 Memory controller
ex504 Stream I/O
ex509 AV I/O
ex510 Bus
ex511 Memory

The invention claimed is:

1. An image processing apparatus which performs, using a prediction parameter used in predictive image generation for a prediction unit included in a picture, predictive image generation for a prediction unit included in another picture, the image processing apparatus comprising:

a first storing unit for storing a plurality of prediction parameters used in predictive image generation for a plurality of prediction units corresponding in size to at least one picture;

a second storing unit for storing two or more prediction parameters used in predictive image generation for two or more prediction units among the plurality of prediction units; and a transferring unit configured to collectively transfer, for predictive image generation, (i) two or more of the prediction parameters from the first storing unit to the second storing unit or collectively transfer (ii) the two or more prediction parameters used in the predictive image generation for the two or more prediction units from the second storing unit to the first storing unit, wherein the transferring unit is configured to collectively transfer (i) the two or more of the prediction parameters for predictive image generation from the first storing unit to the second storing unit, the two or more of the prediction parameters including:

(i) a prediction parameter used in predictive image generation for a second prediction unit included in a second picture different from a first picture including a first prediction unit, the second prediction unit being located at a lower right position with respect to the first prediction unit for which predictive image generation is performed; and (ii) a prediction parameter used in predictive image generation for a third prediction unit included in the second picture, the third prediction unit corresponding in position to the first prediction unit.

2. The image processing apparatus according to claim 1, wherein the transferring unit is configured to collectively transfer (i) the two or more of the prediction parameters from the first storing unit to the second storing unit or collectively transfer (ii) the two or more prediction parameters from the second storing unit to the first storing unit, the prediction parameters of (i) and (ii) each including motion vector information.

3. The image processing apparatus according to claim 1, wherein the transferring unit is configured to collectively transfer (i) the two or more of the prediction parameters, the two or more of the prediction parameters including a prediction parameter having a possibility of being used for predictive image generation for a prediction unit and a prediction parameter not having a possibility of being used for predictive image generation for the prediction unit.

4. The image processing apparatus according to claim 1, wherein the transferring unit is configured to collectively transfer two or more of the prediction parameters for predictive image generation for each of all prediction units included in a predetermined largest coding unit.

5. The image processing apparatus according to claim 1, wherein the transferring unit is configured to collectively transfer (ii) the two or more prediction parameters used in the prediction image generation for the two or more prediction units from the second storing unit to consecutive addresses in the first storing unit, the two or more prediction units being spatially adjacent to each other.

6. The image processing apparatus according to claim 5, wherein the transferring unit is configured to collectively transfer (ii) the two or more prediction parameters used in the prediction image generation for the two or more prediction units from the second storing unit to consecutive addresses in the first storing unit, the two or more prediction units being spatially adjacent to each other in a horizontal direction.

7. The image processing apparatus according to claim 5, wherein the transferring unit is configured to collectively transfer (ii) the two or more prediction parameters used in the prediction image generation for the two or more prediction units from the second storing unit to consecutive addresses in the first storing unit, the two or more prediction units being spatially adjacent to each other in a vertical direction.

8. The image processing apparatus according to claim 1, wherein the transferring unit is configured to collectively transfer (ii) the two or more prediction parameters used in the prediction image generation for the two or more prediction units from the second storing unit to consecutive addresses in the first storing unit, the two or more prediction units being continuous in a processing order.

9. The image processing apparatus according to claim 1, wherein the transfer unit is configured to:
generate a plurality of prediction parameters corresponding to a plurality of sets of coordinates arranged at equal intervals in a prediction unit by copying a prediction parameter used in prediction image generation for the prediction unit; and
collectively transfer the generated prediction parameters as (ii) the two or more prediction parameters from the second storing unit to the first storing unit.

10. The image processing apparatus according to claim 1, further comprising
a predictive image generating unit configured to perform predictive image generation for a prediction unit using a prediction parameter transferred from the first storing unit to the second storing unit.

11. The image processing apparatus according to claim 1, further comprising
a predictive image generating unit configured to perform predictive image generation for a prediction unit using a prediction parameter among (i) the two or more of the prediction parameters, the two or more of the prediction parameters being collectively transferred from the first storing unit to the second storing unit.

12. An image processing method of performing, using a prediction parameter used in predictive image generation for a prediction unit included in a picture, predictive image generation for a prediction unit included in another picture, the image processing method comprising
collectively transferring:
(i) for predictive image generation, two or more of a plurality of prediction parameters from a first storing unit to a second storing unit, the first storing unit being for storing the plurality of prediction parameters used in predictive image generation for a plurality of prediction units corresponding in size to at least one picture, the second storing unit being for storing two or more prediction parameters used in predictive image generation for two or more prediction units among the plurality of prediction units; or
(ii) the two or more prediction parameters used in the predictive image generation for the two or more prediction units from the second storing unit to the first storing unit,
wherein, in the collectively transferring, (i) the two or more of the prediction parameters for predictive image generation is collectively transferred from the first storing unit to the second storing unit, the two or more of the prediction parameters including:
(i) a prediction parameter used in predictive image generation for a second prediction unit included in a second picture different from a first picture including a first prediction unit, the second prediction unit being located at a lower right position with respect to the first prediction unit for which predictive image generation is performed; and
(ii) a prediction parameter used in predictive image generation for a third prediction unit included in the second picture, the third prediction unit corresponding in position to the first prediction unit.

13. A non-transitory computer-readable recording medium having a program stored thereon for causing a computer to execute the image processing method according to claim 12.

14. An integrated circuit which performs, using a prediction parameter used in predictive image generation for a prediction unit included in a picture, predictive image generation for a prediction unit included in another picture, the integrated circuit comprising:
a first storing unit for storing a plurality of prediction parameters used in predictive image generation for a plurality of prediction units corresponding in size to at least one picture;
a second storing unit for storing two or more prediction parameters used in predictive image generation for two or more prediction units among the plurality of prediction units; and
a transferring unit configured to collectively transfer, for predictive image generation, (i) two or more of the prediction parameters from the first storing unit to the second storing unit or collectively transfer (ii) the two or more prediction parameters used in the predictive image generation for the two or more prediction units from the second storing unit to the first storing unit,
wherein the transferring unit is configured to collectively transfer (i) the two or more of the prediction parameters for predictive image generation from the first storing unit to the second storing unit, the two or more of the prediction parameters including:
(i) a prediction parameter used in predictive image generation for a second prediction unit included in a second picture different from a first picture including a first prediction unit, the second prediction unit being located at a lower right position with respect to the first prediction unit for which predictive image generation is performed; and
(ii) a prediction parameter used in predictive image generation for a third prediction unit included in the second picture, the third prediction unit corresponding in position to the first prediction unit.

15. The image processing apparatus according to claim 1, wherein the transferring unit is configured to collectively transfer, according to a one-time direction, (i) the two or more of the prediction parameters for predictive image generation from the first storing unit to the second storing unit or (ii) the two or more prediction parameters used in the predictive image generation for the two or more prediction units from the second storing unit to the first storing unit.

16. An image processing apparatus which performs, using a prediction parameter used in predictive image generation for a prediction unit included in a picture, predictive image generation for a prediction unit included in another picture, the image processing apparatus comprising:
a processor; and
a non-transitory memory storing thereon executable instructions, which when executed by the processor, cause the processor to perform:
storing, in a first memory, a plurality of prediction parameters used in predictive image generation for a plurality of prediction units corresponding in size to at least one picture;

storing, in a second memory, two or more prediction parameters used in predictive image generation for two or more prediction units among the plurality of prediction units; and collectively transferring, for predictive image generation, (i) two or more of the prediction parameters from the first memory to the second memory or collectively transferring (ii) the two or more prediction parameters used in the predictive image generation for the two or more prediction units from the second memory to the first memory, wherein the transferring collectively transfer (i) the two or more of the prediction parameters for predictive image generation from the first memory to the second memory, the two or more of the prediction parameters including:

(i) a prediction parameter used in predictive image generation for a second prediction unit included in a second picture different from a first picture including a first prediction unit, the second prediction unit being located at a lower right position with respect to the first prediction unit for which predictive image generation is performed; and (ii) a prediction parameter used in predictive image generation for a third prediction unit included in the second picture, the third prediction unit corresponding in position to the first prediction unit.

* * * * *